(12) United States Patent
Baugh et al.

(10) Patent No.: US 7,402,642 B2
(45) Date of Patent: Jul. 22, 2008

(54) LINEAR FUNCTIONAL COPOLYMERS OF ETHYLENE WITH PRECISE AND MINIMUM RUN LENGTH DISTRIBUTIONS AND METHOD OF MAKING THEREOF

(75) Inventors: Lisa S. Baugh, Ringoes, NJ (US); Stephen E. Lehman, Jr., Chandler, AZ (US); Kenneth B. Wagener, Gainesville, FL (US); Donald N. Schulz, Annandale, NJ (US); Enock Berluche, Phillipsburg, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/962,086

(22) Filed: Oct. 8, 2004

(65) Prior Publication Data

US 2005/0137369 A1    Jun. 23, 2005

Related U.S. Application Data

(60) Provisional application No. 60/532,250, filed on Dec. 23, 2003.

(51) Int. Cl.
*C08F 216/36* (2006.01)
(52) U.S. Cl. .................. 526/316; 526/318; 526/337; 526/348
(58) Field of Classification Search .............. 526/330, 526/331, 315, 316, 317.1, 318, 337, 348
See application file for complete search history.

(56) References Cited

U.S. PATENT DOCUMENTS 5,684,108 A    11/1997   Muller et al. ............... 526/312

FOREIGN PATENT DOCUMENTS

| DE | 4341528 A1 | 12/1993 |
|---|---|---|
| EP | 0108240 A1 | 9/1983 |
| KR | 10-2001-0036073 | 5/2001 |
| WO | WO03078499 A2 | 9/2003 |
| WO | WO 2003078499 A2 * | 9/2003 |

OTHER PUBLICATIONS

Schwendeman et al., Functionalized Polyethylene Synthesis via Admet Chemistry, NATO Sci Ser. 11 (Math Phys Chem) vol. 56, pp. 307-319.*
Partick M. O'Donnell, Kenneth B. Wagener; "Graft Copolymers by Acyclic Diene Metathesis and Atom Transfer Radical Polymerization Techniques," Journal of Polymer Science: Part A: Polymer Chemistry, vol. 41, pp. 2816-2827 (2003).
Hongli Yang, Manirul Islan, Charles Budee, Stuart J. Rowan; "Ring-Opening Metathesis Polymerization as a Rout to Controlled Copolymers of Ethylene and Polar Monomers: Synthesis of Ethylene-Vinyl Chloride-Like Copolymers," Journal of Polymer Science: Part A: Polymer Chemistry, vol. 41, pp. 2107-2116, (2003).
Bob R. Maughon and Robert H. Grubbs, "Synthesis and Controlled Cross-Linking of Polymers Derived from Ring-Opening Metathesis Polymerization (ROMP)," Macromolecules, vol. 29, No. 18, Aug. 26, 1996.
S. Ramakrishnan and T.C. Chung, "Poly(5-hydroxyoctenylene) and Its Derivatives: Synthesis via Metathesis Polymerization of an Organoborane Monomer," 6019 Macromolecules, 23 Oct. 15, 1990, No. 21, Washington, D.C.
Albert Demonceau, et al., "Novel Ruthenium-Based Catalyst Systems for the Ring-Opening Metathesis Polymerization of Low-Strain Cyclic Olefins" 1997 American Chemical Society, Macromolecules, vol. 30, No. 11, Jun. 2, 1997 (pp. 3127-3136).
Lynda Johnson, et al., "Copolymerization of Ethylene and Acrylates by Nickel Catalysts" Polymeric Materials: Science & Engineering 2002, 86, 319.
Artur Michalak et al., "Theoretical Studies on the Polymerization and Co-Polymerization Processes Catalyzed by the Late-Transition-Metal Complexes" Polymeric Materials: Science & Engineering 2002, 86, 316.

(Continued)

*Primary Examiner*—Robert D. Harlan
(74) *Attorney, Agent, or Firm*—Robert A. Migliorini

(57) ABSTRACT

The present invention is related to a linear functional polymer having repeating units A, B and D. Unit A represents —CH$_2$—, unit B represents

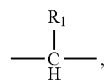

and unit D represents

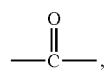

where $R_1$ represents a polar functional group. There are at least four A units separating each B unit, each D unit, and each B and D unit. The value y represents the total number of B units and is an integer greater than or equal to 1. The total number of D units is represented by h and is an integer greater than or equal to 0. And x represents the total number of A units and is an integer sufficient that the molar fraction of the B and D units in the linear functional polymer is represented by a value j defined by the equation:

$$j = \frac{y+h}{x+y+h} \leq 0.032.$$

The present invention is also directed to a method for preparing such linear functional polymers by copolymerizing a first polar substituted monomer and a second non-polar unsubstituted monomer.

30 Claims, 3 Drawing Sheets

OTHER PUBLICATIONS

Oren A. Scherman, et al. "Synthesis of Regioregular and Stereoregular Ethylene vinyl Alcohol CoPolymers Via Romp of a Protected Cyclooctene-5,6-(CIS and TRANS)-Diol" Polymer Preprints 2003, 44(1), 952.

Kurt Breitenkamp, et al., "Pegylated Poly(Cyclooctene) and Polyethylene" Polymer Preprints 2002, 43(2), 725.

Andreas W. Stumpf, et al. "Ruthenium-based Catalysts for the Ring Opening Metathesis Polymerisation of Low-strain Cyclic Olefins and of Functionalised Derivatives of Norbornene and Cyclooctene" J. Chem. So., Chem. Commun., 1995 (pp. 1127-1128).

T. C. Chung, "Synthesis of Alternating Vinyl Alcohol Copolymers" Polymer, 1991, vol. 32, No. 7 (pp. 1336-1339).

T.C. Chung, "Synthesis of Functional Polymers via Borane Monomers and Metathesis Catalysts" Journal of Molecular Catalysis, 76 (1992) pp. 15-31.

J.E. Schwendeman et al. "Functionalized Polyethylene Synthesis via Admet Chemistry" NATO Sci Ser. 11 (Math Phys Chem) vol. 56, pp. 307-319 (2002).

T.C. Chung et al. "Organoborane-Mediated Synthesis of Functional Polymers: A Review" Heteroatom Chemistry, vol. 1, No. 5, 1991 (pp. 545-552).

K. B. Wagener et al. "Precisely Branched Polyethylene and Other Very Regular Polymer Structures via Admet Chemistry" ACS Polymer Preprints 1998, 38(1), pp. 719-720.

S. J. McLain, et al. "New Routes to Ester and Acid Functionalized Polyethylene" Polymeric Materials Science & Eng. (1997), 76, 246-247.

Dominick J. Valenti et al. "Acyclic Diene Metathesis (ADMET), Polymerization of Alcohol functionalized Olefins" Polymer Preprints (Amer. Chem. Soc.) 1996, 37(2) 325-326.

Elite Drent et al. "Palladium Catalysed CoPolymerisation of ethane with alkylacrylates: Polar Comonomer built into the Linear Polymer Chain" The Royal Soc. of Chemistry 2002, Chem. Commun. 2002, 744-745.

A.F. Noels et al. "Metathesis of Low-Strain Olefins and functionalized Olefins with New Ruthenium-Based Catalyst Systems" NATO ASI Series, Ser. C. Math. & Phys. Sciences (1998), 506 (Metathesis Polymerization of Olefins andPolymerization of Alkynes) 29-46.

C.H. Stephens, "Characterization of Polyethylene with Partially Random Chlorine Substitution" Journal of Polymer Science: Part B, Polymer Physics, vol. 41, 2062-2070 (2003).

John C. Sworen et al., "Modeling Random Methyl Branching in Ethylene/Propylen Copolymers Using Metathesis Chemistry: Synthesis and Thermal Behavior" J. Am. Chem. Soc. 2003, 2228-2240.

Yavuz Imamoglu, "Metathesis Polymerization of Olefins and Polymerization of Alkynes" NATO ASI Series. Ser. C: Math & Phys. Scien. vol. 506, pp. 277-296 (1998).

* cited by examiner

LINEAR FUNCTIONAL COPOLYMERS OF ETHYLENE WITH PRECISE AND MINIMUM RUN LENGTH DISTRIBUTIONS AND METHOD OF MAKING THEREOF

This application claims the benefit of U.S. Provisional Application No. 60/532,250 filed Dec. 23, 2003.

BACKGROUND OF THE INVENTION

1. Field of the Invention

The present invention is directed to linear functional polymers, especially linear functional polymers having randomly repeating units. The present invention is further directed to processes for making these linear functional polymers.

2. Description of the Related Art

Polyethylene is the synthetic polymer produced in the highest volume and is better considered a class of polymers rather than a single polymer, since the types of polyethylene produced in different ways offer an enormous range of physical properties. Altering the size and distribution of alkyl branches and incorporating polar functional groups into the polymer are two common methods of controlling the properties of polyethylene.

Alkyl branches in polyethylene can consist of both long-chain branches (LCB), which are branches of sufficient length (typically six or more carbon atoms) such that they cannot be distinguished by $^{13}C$ nuclear magnetic resonance, and short chain branches (SCB), which are branches having typically less than six carbon atoms. While long chain alkyl branching can be beneficial for the processing of polyethylenes, certain alkyl branches—particularly SCB—can negatively affect critical properties such as melting point ($T_m$), glass transition ($T_g$) temperature, crystallinity, strength, thermal stability, and optical clarity. Conversely, the presence of polar functional groups as sidechains in the polymer can improve desired properties such as impact strength, adhesion, dyeability, printability, solvent resistance, melt strength, miscibility with other polymers, and gas barrier properties.

However, when short chain branching is present in functional polyethylenes, SCB effects tend to dominate certain polymer properties, for example $T_m$. Thus, the fundamental effects of the polar substituents themselves are not well understood and cannot be independently exploited. It is therefore desirable to prepare polyethylenes that contain polar functional groups but lack alkyl branching, particularly SCB. It is also desirable that the functional groups be attached as sidechains directly, or as closely as possible, to the polymer backbone, rather than being separated from the polymer backbone by long alkyl branches or chains. At low levels of polar functional groups, the physical properties of high-density polyethylene (HDPE), including rigidity, high modulus and strength, would be expected to be retained while adding the benefits of polar functional groups. Conversely, at higher polar functional group levels, the polymer structure is disrupted by the polar groups and has physical properties that differ more from those of polyethylene.

Copolymers of ethylene with olefin monomers bearing a polar functional group substituent (i.e., $H_2C=CHR$, where R is a polar functional group; hereafter referred to as "polar vinyl monomers") have traditionally been prepared by high-temperature, high-pressure free radical polymerization processes similar to those employed to produce low-density polyethylene (LDPE). Such high-temperature free radical polymerization of ethylene and polar vinyl monomers always produces short- and long-chain alkyl branching, due to the same mechanisms which lead to branching for the free radical homopolymerization of ethylene to LDPE, and other mechanisms involving the functional comonomer.

In high-pressure free-radical copolymerization, functional polyethylenes are prepared by the copolymerization of ethylene (E), $CH_2=CH_2$, with a polar vinyl monomer (V), $CH_2=CHR_1$. Each E unit contributes two $CH_2$ groups to the polymer structure. Each V unit contributes one $CH_2$ group and one $CHR_1$ group to the polymer structure. For a polar vinyl monomer $CH_2=CHR_1$, the olefinic carbon of the $=CHR_1$ group is referred to as the "head" (H) of the molecule, while the olefinic $=CH_2$ carbon is referred to as the "tail" (T) of the molecule.

The copolymerization of ethylene and polar vinyl monomers produces polymer structures in which any sequential combination of E and V units is possible. These include structures in which two V units are attached directly to each other ("VV dyad"), as well as structures wherein V units are separated from each other by some intervening number, k, of E units. Both types of structures may be present in one polymer. Additionally, the polar vinyl monomer may be connected through either its "head" or "tail," such that the polymer structures produced are of the type:

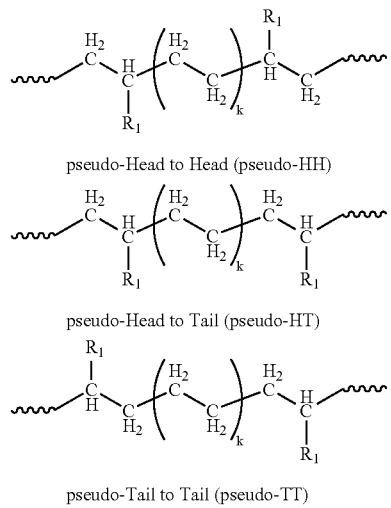

pseudo-Head to Head (pseudo-HH)

pseudo-Head to Tail (pseudo-HT)

pseudo-Tail to Tail (pseudo-TT)

where k equals an integer greater than or equal to 0. All of these structures may be present in one polymer.

For the case of a VV dyad (k=0), connectivity occurring between the V units through two $=CHR_1$ carbons is referred to as a "head to head" linkage. Connectivity occurring between a=$CHR_1$ carbon and a=$CH_2$ carbon is referred to as a "head to tail" linkage. Connectivity occurring between two =$CH_2$ carbons is referred to as a "tail to tail" linkage. For the general case where k is greater than or equal to 1, these three patterns are referred to herein as pseudo-head-to-head (HH), pseudo-head-to-tail (HT), and pseudo-tail-to-tail (TT) linkages, respectively.

The run length, r, is defined as the number of $CH_2$ units intervening between each —$CH(R_1)$— unit in the polymer. The possible values of this quantity may be mathematically represented by three formulas corresponding to the pseudo-head-to-head, pseudo-head-to-tail, and pseudo-tail-to-tail connectivity of the polar vinyl monomer units:

$r_{HH}=2k$ $r_{HT}=2k+1$ $r_{TT}=2k+2$ where k is an integer greater than or equal to 0.

The allowed values for r are thus:

$r_{HH}$=0, 2, 4, 6, 8, 10 . . .

$r_{HT}$=1, 3, 5, 7, 9, 11 . . .

$r_{TT}$=2, 4, 6, 8, 10, 12 . . .

Since all of these structures may be present in one polymer, the overall allowed values for r, $r_{total}$, are:

$r_{total}=r_{HH}+r_{HT}+r_{TT}$ therefore, r=0, 1, 2, 3, 4, 5, 6 . . .

Copolymers of ethylene and polar vinyl monomers prepared by free-radical copolymerization thus possess a continuous run length distribution, in which the run lengths, r, present in any one polymer vary, and can equal any integer greater than or equal to 0. The actual values of r present in a polymer are statistically determined by monomer feed and reactivity ratios.

Certain metal-based catalysts are known to copolymerize ethylene with polar vinyl monomers via a coordination-insertion mechanism to yield functional polyethylenes having different branching patterns and polar functional group placements than polymers produced by free-radical copolymerization. For example, nickel diimine complexes developed by Johnson, et al., *Polym. Mat. Sci. Eng.* 2002, 86, 319, are capable of copolymerizing ethylene and methyl acrylate. However, the polymers formed are not linear and contain up to 95 alkyl branches per 1000 carbons. Copper bis-benzimidazole complexes discovered by Stibrany, et al. in U.S. Pat. No. 6,417,303 can also copolymerize ethylene with acrylates or vinyl ethers to give "substantially linear" copolymers having up to 17 $C_1$–$C_6$ alkyl branches per 1000 carbons. For these coordination-insertion copolymers, any sequential combination of E and V units is possible, including VV dyads. The copolymers possess a continuous run length distribution in which the run lengths, r, present in any one polymer vary, and can equal any integer greater than or equal to 0.

Drent, et al., *Chem. Commun.* 2002, 744, have reported phosphine-ether-ligated palladium copolymerization catalysts that can be used to produce linear ethylene/acrylate copolymers. These polymers also possess a continuous run length distribution in which the run lengths, r, may vary, except that no double acrylate-acrylate insertions (VV dyads) are observed as determined by nuclear magnetic resonance. Thus, for these polymers, the permitted run lengths are:

$r_{HH}$=2k $r_{HT}$=2k+1

$r_{TT}$=2k+2 where k is an integer greater than or equal to 1; and the overall allowed values for r are:

r=2, 3, 4, 5, 6 . . . .

These VV-dyad-free copolymers disclosed in the art, thus, possess a continuous run length distribution in which r is an integer greater than or equal to 2.

Free-radical and coordination-insertion copolymerization techniques, therefore, provide methods for producing substantially linear polymers having continuous run length distributions. These techniques allow for the adjustment of composition (mole percent polar vinyl monomer present in the copolymers) by the technique of varying monomer feed ratios and reaction variables such as temperature and pressure. However, free-radical and coordination-insertion copolymerization techniques do not provide a method to produce linear functional polymers in which the minimum value of r is an integer greater than 2. These techniques also only provide statistical control of run length.

Although great progress has been made in tailoring polyolefin properties by control of composition, branching and tacticity, current catalyst technology does not allow for similar manipulations of run length distributions. Run length distribution effects play an important role for determining polymer crystallinity and, therefore, mechanical properties such as modulus and melting point. For example, in an ethylene-propylene copolymer, the methyl substituent of an isolated propylene unit incorporated into the polymer chain may fit into the polymer's crystal lattice, producing no adverse effect on crystallinity. However, a larger branch structure formed by the two proximal methyl substituents of a propylene-propylene dyad may not fit into the crystal, causing a reduction in crystallinity and melting point. See Ke, B., *J. Polym. Sci.*, 1962, 61, 47. In general, polyethylenes having longer run lengths show higher crystallinity. Thus, it is desired to control run length distributions such that polymers with longer run lengths are produced. It is also desired to control run lengths in a non-statistical manner such that polymers completely free from dyads and other short run length sequences can be obtained.

Another desirable feature is to produce a polyethylene having not only large run lengths, but a narrow run length distribution. By this it is meant, for example, a polymer having an average run length of 40 but containing a small range of run lengths distributed around this average value, e.g., from 38 to 42 (r=40±2). Conversely, a polymer having an average run length of 40 but with a broad run length distribution would possess run lengths from, for example, 10 to 70 (r=40±30). Polymers having continuous run length distributions are a subset of polymers having broad run length distributions.

Polymers in which only one run length is present (i.e., r=40) are referred to as having monodisperse run length distributions. Polymers in which the only run lengths present are multiples of a single value (i.e., 40, 80, 120, etc.) are referred to as having periodic monodisperse run length distributions. Polymers in which a small distribution of run lengths are present (i.e., r=40±2) are referred to as having narrow run length distributions. Polymers in which the only run lengths present are multiples of narrow distributions (i.e., r=40±2, 80 ±2, 120±2 . . . ) are referred to as having periodic narrow run length distributions.

Polymers having monodisperse, narrow, and periodic run length distributions, collectively referred to as polymers with regular run length distributions, possess different properties compared with polymers having less regular distributions, because the former's regular structures can be used to control crystalline morphology. For polyolefins having broad run length distributions, morphology (i.e., lamella size) is controlled by the kinetics of the crystallization process. However, for polymers with more regular architectures, morphology can instead be dictated by microstructure. For example, polymers with regular run length distributions are likely to form lamellae with thicknesses equivalent to the run length, in which each branch can be efficiently accommodated at the surface of the lamella (in a hairpin turn of the chain) rather than having some branches separated by shorter run lengths forced inside the lamella as defects. See Ungar, G., Zeng, X. B., *Chem. Rev.*, 2001, 101, 4157. Thus, control of run length allows for control of crystalline morphology, and, therefore, for control of polymer physical properties.

Control of run length distribution is an important issue for aliphatic polyolefins, but it is even more critical for functionalized polyethylenes. This is due to the influences that the polar functional groups can exert on polymer crystallinity. For example, polymers possessing hydroxyl substituents might be expected to undergo hydrogen bonding of these groups in the polymer crystal structure. Hydrogen bonding may be more facile for polymers with regular run length distributions (in which the hydroxyl substituents are present at regularly spaced distances), and thus may exert a greater influence on properties than for polymers with a broader distribution of hydroxyl groups. This is particularly true for linear functional polyethylenes, in which the influences of the functional groups are not overshadowed by influences of alkyl branches.

Polyethylenes having monodisperse run length distributions of polar functional group substituents have been prepared using acyclic diene metathesis (ADMET) polymerization. See Valenti, et al., *Polym. Prepr. Am. Chem. Soc. Div. Polym. Chem.*, 1996, 37(2), 325; Valenti, et al, *Macromolecules,* 1998, 31, 2764; Wagener, et al., *Polym. Prepr. Am. Chem. Soc. Div. Polym. Chem.,* 1998, 38(1), 719; Watson, et al., *Macromolecules,* 2000, 33, 5411; Watson, et al., *Macromolecules,* 2000, 33, 8963; Watson, et al., *Macromolcules,* 2000, 33, 3196; Schwendeman, et al., *NATO Sci. Ser. II. Math., Phys., Chem.,* 2002, 56, 307, all of which are incorporated by reference herein. This technique involves the metathesis homopolymerization of an acyclic α,ω-diene having a central, symmetrically placed polar functional group substituent, followed by hydrogenation of the olefins in the resultant polymers. The functional polyethylenes produced are rigorously linear in that they possess zero alkyl branches in the chain structure. Polymers bearing acetate, ketone, hydroxyl, —$CO_2CH_3$, and —$CO_2CH_2CH_3$ groups with run lengths of 18, 20, 22, and 26 are known. These polymers have compositions analogous to linear copolymers of ethylene and polar vinyl monomers (e.g., vinyl acetate, vinyl alcohol, methyl acrylate, ethyl acrylate, among others) containing 7.4 mol % and above of the polar vinyl monomer. For this technique, control of polymer composition can only be achieved by varying the size of the functional acyclic α,ω-diene monomer used. No copolymers with less than 7.4 mol % polar have been prepared in the art. At the composition range of 7.4 mol % polar vinyl monomer and greater, the ADMET polymers with monodisperse run length distributions possess much lower melting points than alkyl-branched copolymers with similar compositions prepared by free radical polymerization processes. This is disadvantageous because many uses of polyethylene in the art typically favor high melting points.

A variety of rigorously linear polyethylenes and polyalkenamers (i.e., polyethylenes containing olefinic groups in the main chain) having narrow run length distributions of polar functional group substituents have been prepared using ring opening metathesis polymerization (ROMP). See McLain, et al., *Polym. Mat. Sci. Eng.,* 1997, 76, 246; Stumpf, et al., *J. Chem. Soc. Chem. Commun.,* 1995, 1127; Noels, et al., *NATO ASI Ser. C: Math., Phys. Sci.,* 1998, 506, 29; Hillmyer, et al., *Macromolecules,* 1995, 28, 6311; Korean Patent No. KR349626 and Korean Application No. KR2001036073 to Cho, et al.; International Patent Application Number PCT WO03/078499 to Weaver, et al.; and International Application Number PCT WO00/18579 and U.S. Pat. No. 6,203,923, both to Bansleben, et al., all of which are incorporated by reference herein. This process involves the homopolymerization of cyclooctene monomers having a polar functional group substituent at the 5-position, and subsequent hydrogenation or reduction of the olefins in the resultant polymer, which has a composition equivalent to 25 mol % polar vinyl monomer. The 5-substituted cyclooctene monomer can bond in a head-to-head (r=6), head-to-tail (r=7), or tail-to-tail (r=8) fashion, giving overall allowed run lengths of r=6, 7, 8 carbons. Cho, et al. (Korean Pat. No. KR349626 and Korean Appln. No. KR2001036073) have also disclosed the ROMP homopolymerization of cyclododeca-4,8-dienyl acetate to produce polyethylenes containing 16.6 mol % vinyl alcohol or vinyl acetate.

ROMP homopolymerization of 5,6-disubstituted cyclooctenes can be similarly carried out to produce linear polyethylenes having vicinal dihydroxyl substituents (—CH(OH)CH(OH)— structures) equivalent to head-to-head vinyl alcohol dyads. See International Application Numbers PCT WO99/50331 and PCT WO00/18579 and U.S. Pat. Nos. 6,153,714, 6,506,860 and 6,203,923, all to Bansleben, et al.; Scherman, et al., *Polym. Prepr. Am. Chem. Soc. Div. Polym. Chem.,* 2003, 44(1), 952, all incorporated by reference herein. These polymers have a composition equivalent to 50 mol % vinyl alcohol and a monodisperse run length distribution, with a six carbon run length separating each —CH(OH)CH(OH)— structure (r=6).

Many other ROMP homopolymerization processes giving polymers with greater than 25 mol % polar vinyl content are known. However, ROMP homopolymerization to produce linear functional polymers having polar vinyl contents of less than 16.6 mol % are not exemplified in the art. ROMP of large cyclic monomers bearing polar functional substituents in the appropriate positions to produce polymers with narrow run length distributions are also not known in the art. Rigorously linear functional polyethylenes containing 16.6 mol %, and higher, polar vinyl contents can also be prepared by functionalization of preformed polyoctenamers and polydodecenamers. McLain, et al., *Polym. Mat. Sci. Eng.,* 1997, 76, 246.

The ROMP copolymerization of substituted cyclooctenes with cycloalkenes has been used in a few instances to produce substituted polyethylenes or polyalkenamers. Breitenkamp, et al., *Macromolecules,* 2002, 35, 9249, and *Polym. Prepr. Am. Chem. Soc. Div. Polym. Chem.* 2002, 43(2), 725, have copolymerized cyclooctene with a substituted cyclooctene bearing a long-chain polyethylene glycol substituent. Maughton and Grubbs, *Macromolecules,* 1996, 29, 5765, copolymerize cyclooctadiene with 5-methacryloyl-1-cyclooctene to give methacryloyl-substituted polyalkenamers that can be cross-linked through the pendant vinyl functionality of the methacryloyl group. These polymers are also susceptible to incidental, unwanted cross-linking during the polymerization and purification process. Stevens, et al., *Ann. Tech. Conf.—Soc. Plastics Eng.,* 2002, 60(2), 1854; Yang, et al., *J. Polym. Sci. A: Polym. Chem.,* 2003, 41, 2107; and Stevens, et al., *J. Polym. Sci. B: Polym. Phys.,* 2003, 41, 2062, all incorporated by reference herein, have copolymerized chlorocyclooctenes with cyclooctene to give chloro-substituted linear polyethylenes and polyalkenamers.

Thus, there is a need in the art to prepare polyethylenes containing polar functional groups which lack alkyl branching, particularly short-chain branching. There is also a need for rigorously linear functional polymers that are free of polar VV dyads. A further need exists for a method to control run length distributions in a non-statistical manner to make such dyad-free polymers having large, narrow run length distributions. Lastly, there is a need to make a polymer containing less than 7.4 mole % polar functionality.

BRIEF SUMMARY OF THE INVENTION

In one embodiment, the present invention is directed to a linear functional polymer having repeating units A, B and D. Unit A represents CH$_2$—, unit B represents

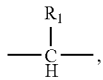

and unit D represents

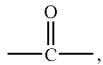

wherein R$_1$ represents a polar functional group. The relationship between the repeating units is such that there are at least four A units separating each B unit, each D unit, and each B and D unit.

Moreover, y represents the total numbers of B units and is an integer greater than or equal to 1. The total number of D units is represented by h and is an integer greater than or equal to 0. And x represents the total number of A units and is an integer sufficient that the molar fraction of the B and D units in the linear functional polymer is represented by a value j defined by the equation:

$$j = \frac{y+h}{x+y+h} \leq 0.032.$$

The value j is preferably less than or equal to 0.03, and most preferably less than or equal to 0.025.

The polar functional group R$_1$ is a nitrogen- or oxygen-containing functionality having 8 or fewer non-hydrogen atoms and an absence of olefinic unsaturation. Specifically, R$_1$ is selected from the group consisting of hydroxy; alkyl ethers having 7 or fewer carbon atoms; acetate; carboxylic acid; sodium carboxylate; alkyl esters having 6 or fewer carbon atoms; nitrile; OSiMe$_3$; CO$_2$SiMe$_3$; sulfonate; alkyl amine having 7 or fewer carbon atoms, amides having 6 or fewer carbon atoms; aldehyde; alkyl ketones having 7 or fewer carbon atoms, and mixtures of any of the foregoing groups.

In this embodiment, the linear functional polymer has end groups R$_2$ and R$_3$ which are independently directly attached to two A units. Each of R$_2$ and R$_3$ is independently selected from hydrogen, C$_1$–C$_{20}$ linear alkyl, C$_1$–C$_{20}$ branched alkyl, C$_1$–C$_{20}$ cycloalkyl, aryl and phenyl. It is most preferred that each of R$_2$ and R$_3$ is selected from methyl and hydrogen.

Further in this embodiment, the linear functional polymer has a run length, r, that represents the number of A units separating each occurrence of a B or D unit. This run length, r, conforms at each independent occurrence thereof to one of the following equations:

$r = (e+e) + zd;$      (i)

$r = (e+f) + zd;$      (ii) and $r = (f+f) + zd.$      (iii)

The value z is any integer greater than or equal to 0. The values e and f are predetermined integers greater than or equal to 2. And the value d is a predetermined integer greater than or equal to 4.

In another embodiment of the present linear functional polymer, the value h is such that there are no D units therein. Instead, a randomly repeating unit E is in the polymer chain with the repeating A and B units. Unit E represents —CH═CH—, and there is at least one E unit separating each B unit, at least one A unit separating each E unit, and at least one A unit separating each B and E unit. The total number of E units is represented by the value m and is an integer greater than or equal to 2. In this instance, the number of A units, x, is an integer sufficient that the molar fraction of functional units in the polymer is represented by a value q defined by the equation:

$$q = \frac{y}{x+y+2m} \leq 0.032.$$

The value q is preferably less than or equal to 0.03, and most preferably less than or equal to 0.025.

In this instance, the linear functional polymer has end groups R$_2$ and R$_3$ which are each independently directly attached to an E unit. Each of R$_2$ and R$_3$ is independently selected from hydrogen, C$_1$–C$_{20}$ linear alkyl, C$_1$–C$_{20}$ branched alkyl, C$_1$–C$_{20}$ cycloalkyl, aryl, phenyl and C$_1$–C$_{20}$ alkenyl. It is most preferred that each of R$_2$ and R$_3$ is selected from methyl and hydrogen.

In yet another embodiment of the present invention, a method is disclosed for preparing linear functional polymers having randomly repeating —CH$_2$— units, —CH═CH— units, and units having polar functional substituents. The method comprises the step of copolymerizing a first polar substituted monomer with a second non-polar unsubstituted monomer in the presence of a catalyst having the formula:

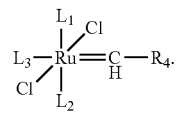

In this catalyst, L$_1$ and L$_2$ are independently selected from the group consisting of alkyl phosphine, aryl phosphine, 1,3-dimesitylimidazol-2-ylidene, 1,3-di(2,6-diisopropylphenyl)imidazol-2-ylidene, 1,3-diarylimidazol-2-ylidene, 1,3-dimesitylimidazolidin-2-ylidene, 1,3-di(2,6-diisopropylphenyl)imidazolidin-2-ylidene, 1,3-diphenyltriazine, and pyridine; L$_3$, if present, is pyridine and is identical to L$_2$; and R is selected from the group consisting of hydrogen, C$_1$–C$_{20}$ linear alkyl, C$_1$–C$_{20}$ branched alkyl, C$_1$–C$_{20}$ cycloalkyl, C$_1$–C$_{20}$ alkenyl, aryl and phenyl. It is preferred that L$_1$ is 1,3-dimesitylimidazolidin-2-ylidene, L$_2$ is tricyclohexylphosphine, R$_4$ is methyl and L$_3$ is absent. It is alternatively preferred that L$_1$ and L$_2$ both are tricyclohexylphosphine, R$_4$ is phenyl and L$_3$ is absent.

In this method, the first polar substituted monomer is selected from one of: (i) substituted α,ω-diene monomers having the formula:

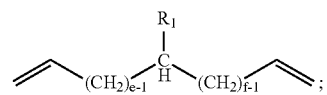

I (ii) substituted cyclic olefins having the formula:

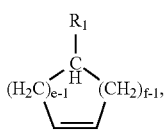

II wherein e and f are integers greater than or equal to 2, and $R_1$ represents a polar functional group. $R_1$ is the same as described above, but preferably is selected from one of OH, acetate, $CO_2Me$, $CO_2C(CH_3)_3$ and $CO_2H$.

The second non-polar unsubstituted monomer is selected from one of: (iii) unsubstituted α,ω-diene monomers having the formula:

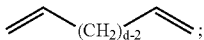

III (iv) unsubstituted cyclic olefins having the formula:

IV wherein d is an integer greater than or equal to 4.

Further, in this method, the ratio of the first polar substituted monomer to the second non-polar monomer is such that the units having polar functional substituents in the linear functional polymer is an amount no greater than about 3.2 mole % of the total number of the combined units on a methylene, or $C_1$, basis. This ratio is preferred to be no greater than about 3.0 mole % on a methylene basis, and most preferred to be no greater than about 2.5 mole % on a methylene basis.

In another embodiment of this invention, the first polar substituted monomer comprises a substituted linear acyclic α,ω-diene monomer and the second non-polar unsubstituted monomer comprises an unsubstituted linear acyclic α,ω-diene monomer. It is preferred that the substituted linear acyclic α,ω-diene monomer comprises either docosa-1,21-dien-11-ol or acetic acid 1-(dec-9-enyl)-dodec-11-enyl ester. It is preferred that the unsubstituted linear acyclic α,ω-diene monomer comprises 1,9-decadiene.

In yet another embodiment of the present method, the first polar substituted monomer comprises a substituted cyclic olefin and the second non-polar unsubstituted monomer comprises an unsubstituted cyclic olefin. The preferred substituted cyclic olefin is selected from cyclooct-4-en-1-ol, cyclooct-4-enyl acetate, cyclooct-4-ene carboxylic acid, and t-butyl cyclooct-4-ene carboxylate. It is also preferred that the substituted cyclic olefin comprises methyl cyclooct-4-ene carboxylate, methyl cyclooct-3-ene carboxylate or a mixture thereof. The preferred unsubstituted cyclic olefin is cyclooctene.

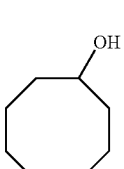

cyclooct-4-en-1-ol

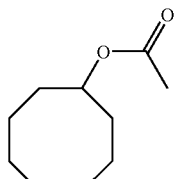

cyclooct-4-enyl acetate

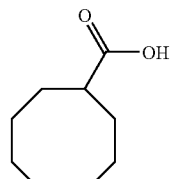

cyclooct-4-ene carboxylic acid

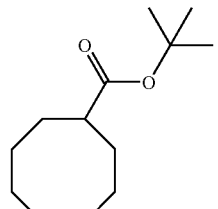

t-butyl cyclooct-4-ene carboxylate

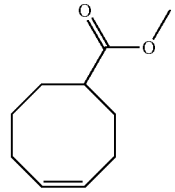

methyl cyclooct-4-ene carboxylate

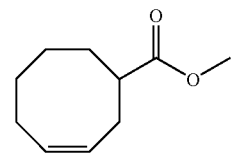

methyl cyclooct-3-ene carboxylate

In still another embodiment of the method, the first polar substituted monomer comprises a substituted linear acyclic α,ω-diene monomer and the second non-polar unsubstituted monomer comprises an unsubstituted cyclic olefin. The preferred substituted linear acyclic α,ω-diene monomer is

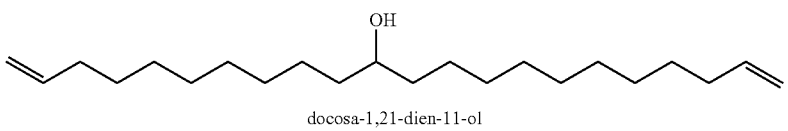

docosa-1,21-dien-11-ol

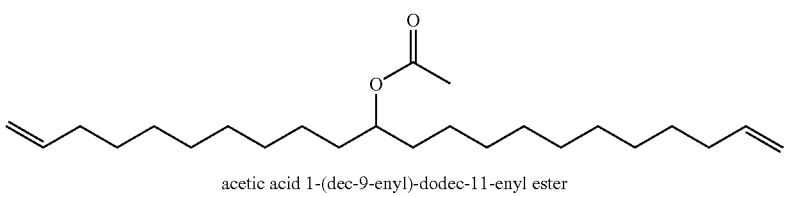

acetic acid 1-(dec-9-enyl)-dodec-11-enyl ester selected from 2-(5-hexenyl)-7-octenoic acid, 2-(4-pentenyl)-6-heptenoic acid, 2-(dec-9-enyl)-tridec-12-enoic acid, and acetic acid 1-(dec-9-enyl)-dodec-11-enyl ester. And the preferred unsubstituted cyclic olefin is cyclooctene.

linear functional polymer between and exclusive of the end groups, identified herein as $R_2$ and $R_3$ end groups. Such end groups may be linear or branched, as is discussed in more detail hereinbelow.

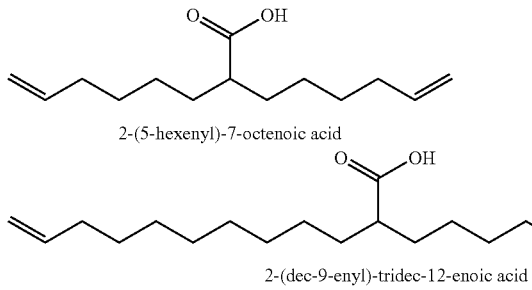

2-(5-hexenyl)-7-octenoic acid

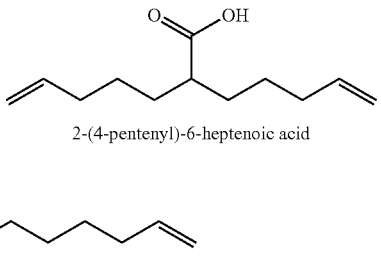

2-(4-pentenyl)-6-heptenoic acid 2-(dec-9-enyl)-tridec-12-enoic acid

It is also anticipated that another embodiment of the instant method includes using a substituted cyclic olefin as the first polar substituted monomer and an unsubstituted linear acyclic α,ω-diene monomer as the second non-polar unsubstituted monomer.

Additionally, a further embodiment of the method includes an additional step of reducing the prepared linear functional polymer to reduce at least a portion of the —CH=CH— units in the polymer. Another embodiment of the instant method includes reducing the prepared linear functional polymer to reduce substantially all of the —CH=CH— units in the polymer.

DETAILED DESCRIPTION OF THE INVENTION

Figure 1:
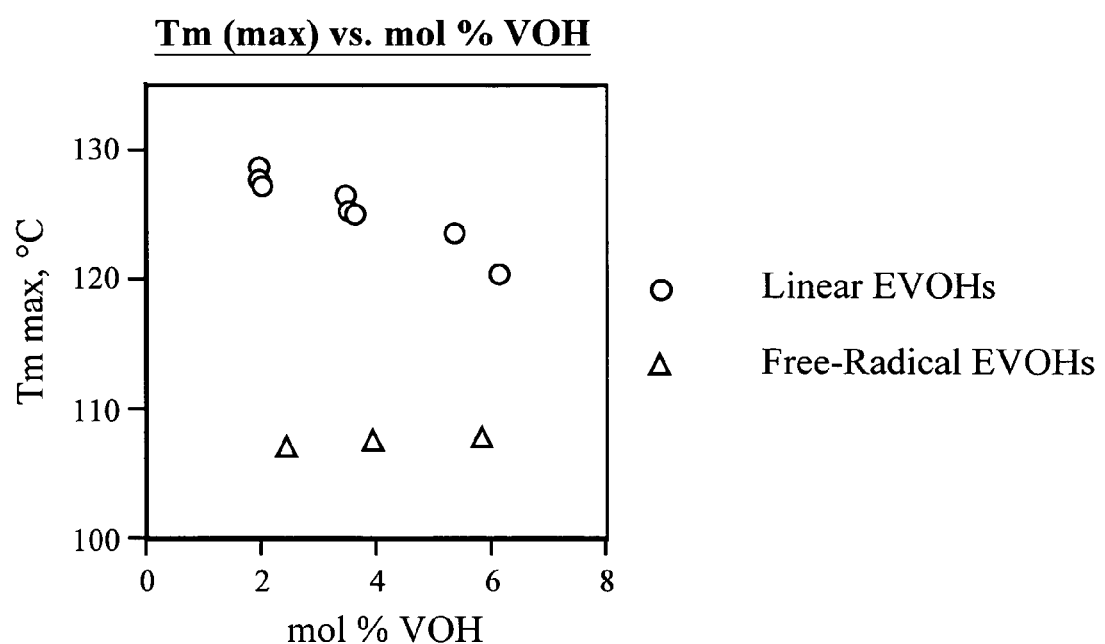
FIG. 1 illustrates a comparison of melt transition temperature ($T_m$ max) for linear and branched alcohol-functionalized polyethylenes at low alcohol contents (<~7 mol % vinyl alcohol).

The present invention is for linear functional polymers having randomly repeating units and methods for making such polymers. These polymers possess the benefits of having polar functional groups pendant from the polymer backbone without the detriments of alkyl branching, particularly short chain branching. Specifically, such polymers have low levels of polar functional content, which results in the favorable physical properties related to high-density polyethylene, such as rigidity, high storage modulus and improved strength. Moreover, these linear functional polymers have longer run lengths, thus leading to higher crystallinities and melting points, and are substantially free from unfavorable polar clusters (e.g., dyads and triads) and shorter run length sequences, especially when compared with conventional free-radically prepared functional copolymers. Another advantage of the instant polymers is that they can have periodic narrow and periodic monodisperse run length distributions.

By linear or "rigorously linear" polymer, it is meant that there is an absence of branching in the main chain of the polymer. The term "main chain" refers to the portion of a The polar functional groups and polar vinyl monomers utilized in the instant method should imbue the polyolefin with the beneficial effects of polarity, while minimizing unwanted steric or reactivity effects that would degrade the linear nature of the parent polyolefin. For purposes of this invention, "polar functional groups" are thus defined as the following: nitrogen- or oxygen-containing substituents containing 8 or fewer non-hydrogen atoms and no olefinic unsaturation. Groups having 8 or fewer non-hydrogen atoms are specified because larger substituents can be considered as providing a nonlinear (comb-type) polymer structure. Groups having no olefinic unsaturation are specified so that the polar functional group is chemically distinct from the vinyl group, and therefore not susceptible to co-participation in any processes undergone by ethylene or the vinyl group of the polar vinyl monomer.

The first embodiment of the instant invention relates to the synthesis of low polar content, rigorously linear functional polyethylenes and polyalkenamers by a metathesis copolymerization process. This technique allows for the precise tailoring of polar content by manipulating the ratios of comonomers used. Specifically, this embodiment discloses a method for preparing such linear functional polymers having randomly repeating —CH$_2$— units and units having polar functional substituents. Such polymers may also have olefinic units, or —CH=CH— units, randomly dispersed therein. The novel method comprises the step of copolymerizing a first polar substituted monomer with a second non-polar unsubstituted monomer in the presence of a catalyst to form the linear functional alkenamer. This copolymerizing step is conducted so that the ratio of the first polar substituted monomer to the second non-polar unsubstituted monomer is such that the units having polar functional substituents in the main chain of the linear functional alkenamer comprise an amount no greater than about 3.2 mole %, preferably 3.0 mole % and most preferably 2.5 mole %, of the total number of the units therein on a methylene or $C_2$ basis as described hereinbelow. The method may also comprise reducing the —CH=CH— units of the linear functional alkenamer to produce a linear functional polyethylene.

The first polar substituted monomer is selected from one of: (i) substituted α,ω-diene monomers having the formula:

I

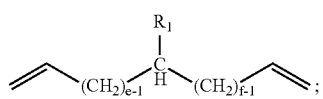

(ii) substituted cyclic olefins having the formula:

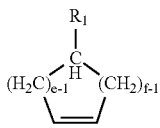
II

In equations I and II above, e and f are integers greater than or equal to 2; $e \leqq f$; and $R_1$ represents a polar functional group having a nitrogen- or oxygen-containing functionality with 8 or fewer non-hydrogen atoms and no olefinic unsaturation (an absence of —CH=CH—). Specifically, $R_1$ represents a polar functional group selected from the group consisting of hydroxy; an alkyl ether having 7 or fewer carbon atoms; an acetate; a carboxylic acid; a sodium carboxylate; an alkyl ester having 6 or fewer carbon atoms; a nitrile; an $OSiMe_3$; a $CO_2SiMe_3$; a sulfonate; an alkyl amine having 7 or fewer carbon atoms, an amide having 6 or fewer carbon atoms; an aldehyde; an alkyl ketone having 7 or fewer carbon atoms, and mixtures of any of the foregoing groups. In particular, $R_1$ is preferably selected from one of OH, acetate, $CO_2Me$, $CO_2C(CH_3)_3$ and $CO_2H$.

For a polar substituted α,ω-diene monomer having formula I or a polar substituted cyclic olefin having the formula II, and in the case where e<f, the tertiary olefinic =CH— carbon bound to the sequence —$(CH_2)_{e-1}$— is referred to as the "head" (H) of the monomer molecule, whereas the tertiary olefinic =CH— carbon bound to the sequence —$(CH_2)_{f-1}$— is referred to as the "tail" (T) or the monomer molecule. For the case where e=1, these designations do not apply.

The second non-polar unsubstituted monomer is selected from the group consisting of: (iii) unsubstituted α,ω-diene monomers having the formula:

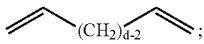
III

In equations III and IV above, d represents an integer greater than or equal to 4.

The catalyst used in the copolymerizing step of this method has the formula:

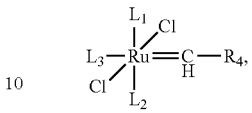

wherein $L_1$ and $L_2$ are independently selected from the group consisting of alkyl phosphine, aryl phosphine, 1,3-dimesityl-imidazol-2-ylidene, 1,3-di(2,6-diisopropylphenyl)imidazol-2-ylidene, 1,3-diarylimidazol-2-ylidene, 1,3-dimesitylimidazolidin-2-ylidene, 1,3-di(2,6-diisopropylphenyl)imidazolidin-2-ylidene, 1,3-diphenyltriazine, and pyridine; $L_3$, if present, is pyridine and is identical to $L_2$; and $R_4$ is selected from the group consisting of hydrogen, $C_1$–$C_{20}$ linear alkyl, $C_1$–$C_{20}$ branched alkyl, $C_1$–$C_{20}$ cycloalkyl, $C_1$–$C_{20}$ alkenyl, aryl and phenyl.

This process produces polymer structures in which each incorporated functional cycloolefin or functional α,ω-diene is either bound directly to another functional cycloolefin or functional α,ω-diene, or polymer structures in which each functional cycloolefin or functional α,ω-diene is separated from the next occurrence of such unit by some intervening number of unbranched cycloolefin or unbranched aliphatic α,ω-diene units. Both types of structures may be present in one polymer. Additionally, the functional cycloolefin or functional α,ω-diene may be connected through pseudo-head-to-head (HH), pseudo-head-to-tail (HT), and pseudo-tail-to-tail (TT) linkages, such that the polymer structures produced are of the type:

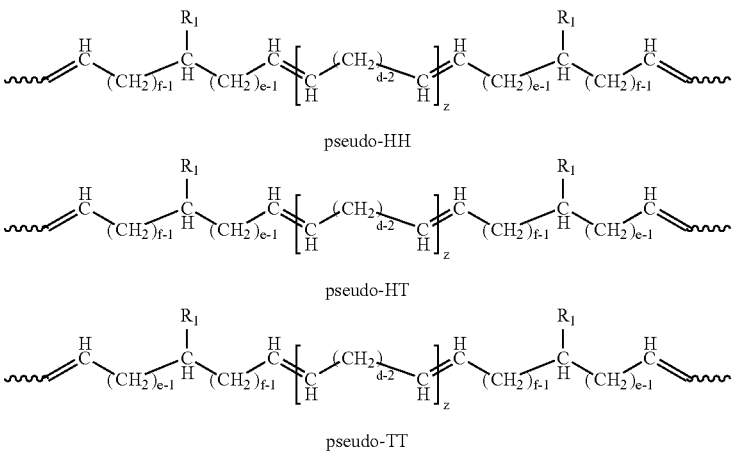

pseudo-HH pseudo-HT pseudo-TT (iv) unsubstituted cyclic olefins having the formula:

IV where z is an integer or 0 or greater. All of these structures may be present in one polymer. For the case where e=f, these three structures are equivalent. The term "pseudo" is conventionally used herein to mean that the HH, HT, and TT linkages are not strictly head-to-head, head-to-tail and tail-to-tail, but rather are formed in a very similar fashion thereto.

When hydrogenation or another chemical reduction process is used to convert the polymer's —CH=CH— (olefin) groups into —CH$_2$CH$_2$— groups, the above polymer structures become the following:

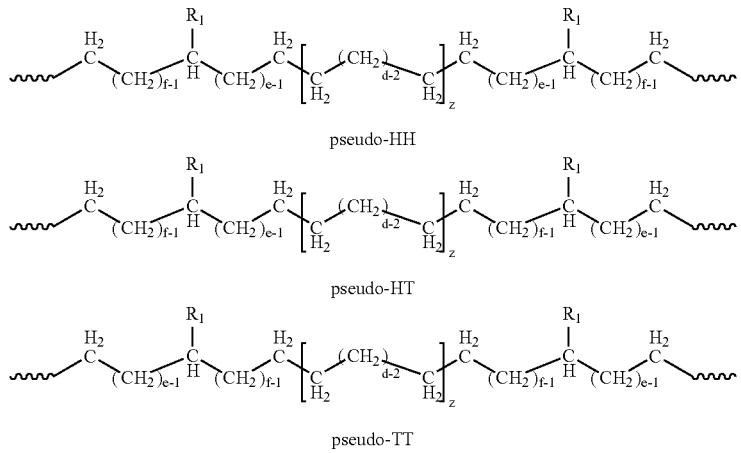

which is equivalent to:

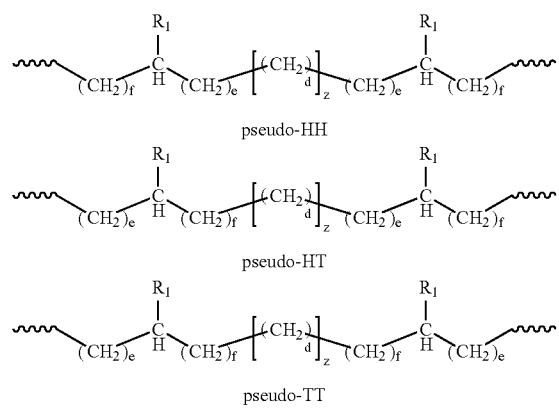

All of these structures may be present in one polymer. For the case where e=1, these three structures are equivalent. The instant invention thus provides a method for producing linear functional polyethylenes without alkyl branches.

The run length distribution of the polymer can be represented by the run length, r, defined as the number of CH$_2$ units intervening between each occurrence of the —CH(R$_1$)— unit. For these polymers, the quantity r may thus take on only a certain range of values, referred to as a periodic narrow run length distribution, defined by the equations:

$$r_{HH}=(e+e)+zd;\qquad\text{(i)}$$

$$r_{HT}=(e+f)+zd;\qquad\text{(ii) and}$$

$$r_{TT}=(f+f)+zd.\qquad\text{(iii)}$$

Since all of these structures may be present in one polymer, the overall allowed values for r, $r_{total}$, are:

$$r_{total}=r_{HH}+r_{HT}+r_{TT}$$

For the case where e=1, these three structures are equivalent, giving a periodic monodisperse run length distribution, and the overall allowed values for r, $r_{total}$, are:

$$r_{total}=(e+f)+zd$$

Since e and f are integers greater than or equal to 2, the smallest possible run length r present in the polymers is 4. The present invention thus provides a method to produce linear functional polyethylenes having periodic narrow or periodic monodisperse run length distributions in the main chain with minimum value r=4. Run length distributions of functional polyethylenes in the prior art possess continuous run length distributions with minimum r values of 0 (polymers containing polar VV dyads) or 2 (polymers without polar VV dyads). The invention thus provides a method to produce functional polyethylenes having longer minimum run lengths than known in the art. This is advantageous because longer polyethylene run lengths are associated with higher crystallinities, and therefore, with improved mechanical properties.

For example, a copolymer for which d=8, e=9, and f=10 would have run lengths of $$r_{total}=18+8z,\ 19+8z,\ 20+8z,$$

in which z is an integer greater than or equal to 0, such that:

$$r_{total}=18,\ 19,\ 20,\ 26,\ 27,\ 28,\ 34,\ 35,\ 36,\ 42,\ 43,\ 44\ldots$$

The alkenamers and polyethylenes prepared in the present invention possess end groups. One end of the linear functional polymer terminates in an R$_2$ end group, while the other end of the polymer terminates in an R$_3$ end group. For the alkenamers, each of the R$_2$ and R$_3$ end groups are independently directly attached to a —CH=CH— unit. For the polyethylenes obtained from reduction of the alkenamer olefin groups, each of the R$_2$ and R$_3$ end groups is independently directly attached to a sequence of two CH$_2$ units. R$_2$ and R$_3$ are preferably independently selected from the group consisting of hydrogen, C$_1$–C$_{20}$ linear alkyl, C$_1$–C$_{20}$ branched alkyl, C$_1$–C$_{20}$ cycloalkyl, aryl and phenyl. For the alkenamers, R$_2$ and R$_3$ may also preferably comprise C$_1$–C$_{20}$ alkenyl. It is most preferred that each of R$_2$ and R$_3$ is selected from methyl or hydrogen.

When the copolymerization is carried out using only functional and unbranched α,ω-dienes, the polymer end groups R$_2$ and R$_3$ both are hydrogen. However, when the copolymerization is carried out using functional and unbranched cycloolefins, or a mixture of an α,ω-diene and a cycloolefin, the polymer end groups R$_2$ and R$_3$ may comprise hydrogen and/or one other unit selected from the group consisting of C$_1$–C$_{20}$ linear alkyl, C$_1$–C$_{20}$ branched alkyl, C$_1$–C$_{20}$ cycloalkyl, aryl or phenyl. The non-hydrogen end group units for the alkenamers may also comprise $C_1$–$C_{20}$ alkenyl. The identity of the non-hydrogen end group units are determined by the structure of the $R_4$ substituent of the catalyst:

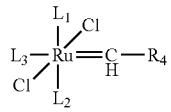

wherein $R_4$ is selected from the group consisting of hydrogen, $C_1$–$C_{20}$ linear alkyl, $C_1$–$C_{20}$ branched alkyl, $C_1$–$C_{20}$ cycloalkyl, $C_1$–$C_{20}$ alkenyl, aryl and phenyl.

When $R_4$ comprises a linear alkyl or linear alkenyl, the polymer formed will have linear end groups. Thus, the invention also comprises the use of a polymerization catalyst that produces polymers with linear end groups; specifically, a catalyst in which $R_4$ is methyl will give polymers in which $R_2$ or $R_3$ are methyl or hydrogen.

The effect of end groups on crystallinity and mechanical properties is typically not significant for polyethylenes of sufficiently high molecular weight. However, end group effects can be significant for polyethylenes with lower molecular weights, as is known by one skilled in the art. Therefore, to achieve the maximum beneficial effects of the linear functional structures of the polymers of the invention, it is desirable to form end groups that are linear.

It was further found that upon the use of hydrogenation or another chemical reduction process to convert the polymer's —CH═CH— (olefin) groups into —CH$_2$CH$_2$— groups, some fraction of CHR$_1$ units, particularly CHOH units, may be simultaneously converted into ketone (C═O) units, if desired. The presence of ketone units in polyethylenes is advantageous because these groups provide a number of useful and unusual properties, such as photodegradability and increased mechanical strength and crystallinity (Sen, A., *Adv. Polym. Sci.*, 1986, 125). Additionally, the ketone units can be easily transformed into other functionalities or used as cross-linking sites, as is known to one skilled in the art. The polymer sequences present in this case can be represented by:

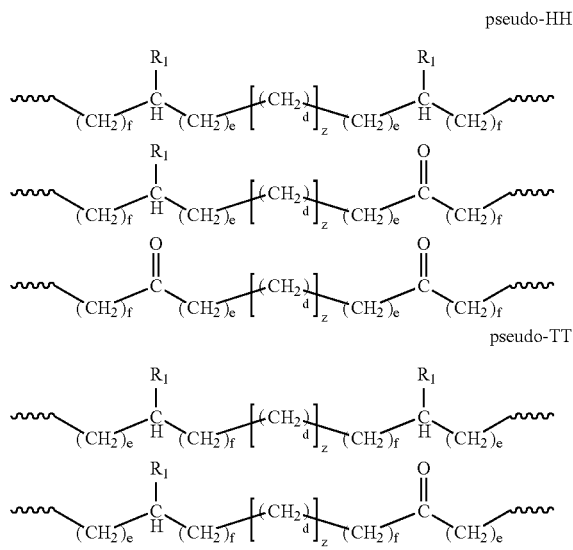

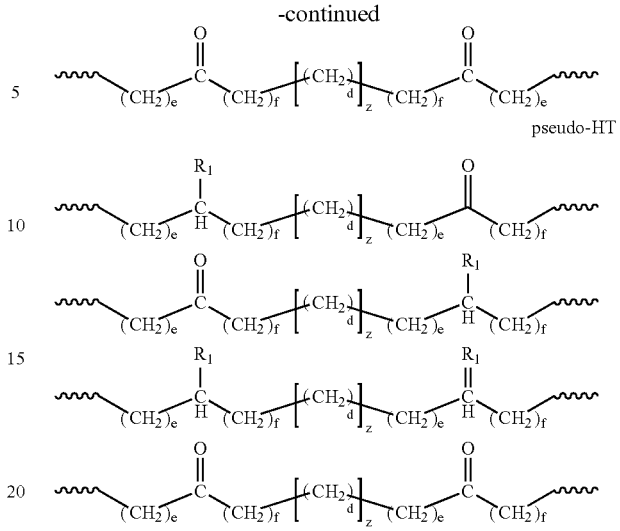

All of these sequences may be present in one polymer. The run length distribution, r, in this case is defined as the number of CH$_2$ units intervening between each occurrence of the —CH(R$_1$)— unit, between each occurrence of the C═O unit, or between each occurrence of —CH(R$_1$)— and C═O units. The quantity r is mathematically unchanged from previous definitions.

In another embodiment of the instant method, the first polar substituted monomer comprises a substituted linear acyclic α,ω-diene monomer and the second non-polar unsubstituted monomer comprises an unsubstituted linear acyclic α,ω-diene monomer. This method is comparable to the ADMET polymerization processes described in the art. In this embodiment, the preferred substituted linear acyclic α,ω-diene monomer is selected from one of docosa-1,21-dien-11-ol and acetic acid 1-(dec-9-enyl)-dodec-11-enyl ester. And the preferred unsubstituted linear acyclic α,ω-diene monomer is 1,9-decadiene.

In yet another embodiment of the present method, the first polar substituted monomer comprises a substituted cyclic olefin and the second nonpolar unsubstituted monomer comprises an unsubstituted cyclic olefin. This process is comparable to the ROMP processes disclosed in the art. In this instance, the preferred substituted cyclic olefin is selected from one of cyclooct-4-en-1-ol, cyclooct-4-enyl acetate, cyclooct-4-ene carboxylic acid, t-butyl cyclooct-4-ene carboxylate, methyl cyclooct-4-ene carboxylate, methyl cyclooct-3-ene carboxylate, or a mixture of the last two compounds. And the preferred unsubstituted cyclic olefin is cyclooctene.

In still another embodiment of the instant method, the first polar substituted monomer comprises a substituted linear acyclic α,ω-diene monomer and the second non-polar unsubstituted monomer comprises an unsubstituted cyclic olefin. The preferred substituted linear acyclic α,ω-diene monomer is selected from one of 2-(5-hexenyl)-7-octenoic acid, 2-(4-pentenyl)-6-heptenoic acid, 2-(dec-9-enyl)-tridec-12-enoic acid and acetic acid 1-(dec-9-enyl)-dodec-11-enyl ester. And the preferred unsubstituted cyclic olefin is cyclooctene.

In a final alternative embodiment of the instant method, the first polar substituted monomer is substituted cyclic olefin and the second non-polar unsubstituted monomer is an unsubstituted linear acyclic α,ω-diene monomer.

An applicable name for the last two methods just described is ring opening acyclic diene metathesis (or ROADMET) polymerization. This nomenclature distinguishes these two embodiments of the instant method from the ADMET and ROMP embodiments described above.

As for the general copolymerizing step, it can be conducted either neat or in a solvent. The preferred solvents are dichlorobenzene, toluene, dichloromethane, and tetrahydrofuran.

One embodiment in performing the copolymerization step involves copolymerizing at a temperature of from about 45° C. to about 120° C., and preferably is between about 60° C. and about 90° C. Another embodiment of the copolymerization step is conducted at a temperature range of from about 0° C. to about 44° C., and preferably from about 10° C. to about 25° C.

It was discovered that by selecting the time, temperature, and choice of catalyst used for the polymerization process, the positions and connectivity of the olefins in the alkenamers, and thus the numerical values of e, f, z and d in the derived functional polyolefins, may be altered such that the run length distribution present is broadened and is no longer described by the previously given equations for r. This may be accomplished by choosing a polymerization catalyst that is capable of also performing olefin migration and cross-metathesis reactions.

It is known for catalysts having the structure:

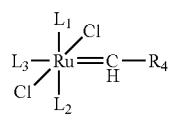

that, when $L_3$ is absent; $L_2$ is selected from the group consisting of triphenylphosphine and tricyclohexyl phosphine; and $L_1$ is selected from the group consisting of 1,3-dimesitylimidazol-2-ylidene, 1,3-di(2,6-diisopropylphenyl)imidazol-2-ylidene, 1,3-diarylimidazol-2-ylidene, 1,3-dimesitylimidazolidin-2-ylidene, and 1,3-di(2,6-diisopropylphenyl)imidazolidin-2-ylidene, the catalyst is capable of performing olefin migration and cross-metathesis reactions (resulting in isomerization) when the conditions comprise a temperature above approximately 45° C. and a reaction time of approximately at least one hour (Lehman, S. E.; Jr.; et al., *Inorg. Chim. Acta* 2003, 345, 190; Schwendeman, J. E.; et al., *Polym. Prepr., Am. Chem. Soc. Div. Polym. Chem.* 2003, 44(1), 947). It is more preferred that the conditions comprise a temperature in the range of from about 45° C. to about 120° C. and a reaction time of about 1 hour or longer. It is most preferred that the conditions comprise a temperature range between about 60° C. and 90° C. and a reaction time of about one hour or longer. Thus, when a copolymerization of polar substituted and unsubstituted cycloolefins and/or α,ω-dienes is carried out with these catalysts above 45° C. and for longer than 1 hour, the polyalkenamers formed are subject to olefin migration and cross-metathesis reactions.

In the olefin migration process, the —CH=CH— group may be moved from its original position along the alkenamer backbone chain to any position between two $CHR_1$ units, two other —CH=CH— units, or a $CHR_1$ unit and another —CH=CH— unit. Although this process changes the relative positions of the $CH_2$ and —CH=CH— units separating the $CHR_1$ units, the total number of $CH_2$ and —CH=CH— units between $CHR_1$ units is unchanged. However, in the subsequent cross-metathesis process, these olefins may react with one another, giving polymer chains in which the number of $CH_2$ and —CH=CH— units between each $CHR_1$ unit is scrambled. Olefins attached directly to $CHR_1$ groups (formed through olefin migration) do not participate in cross-metathesis. In this instance, the total number of $CH_2$ and —CH=CH— units between each $CHR_1$ unit for structures formed through olefin migration/cross-metathesis may take on any value equal to or greater than a minimum of one —CH=CH— unit and two $CH_2$ units.

In this case, the polymer structures formed may be represented by:

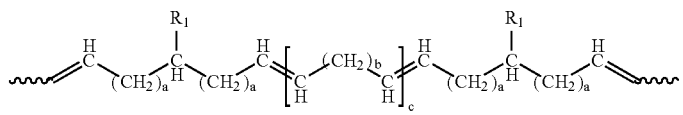

where a can, at each occurrence in the polymer, independently be any integer greater than or equal to 1, b can be any integer greater than or equal to 1, and c may be any integer greater than or equal to 0.

The structure with the shortest separation between —CH($R_1$)— units (a=1 in each occurrence and c=0) can be represented by:

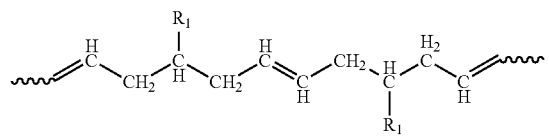

Upon hydrogenation or use of another chemical reduction process to convert the alkenamer's —CH=CH— groups into —CH$_2$CH$_2$— groups, this minimum structure can be represented by:

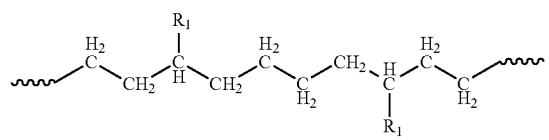

Thus, a linear functional polyethylene having a continuous run length distribution, r, of 4 or greater is produced. The instant invention therefore provides not only a method to synthesize functional polyethylenes with a minimum run length r=4 having periodic narrow or periodic monodisperse run length distributions, but also functional polyethylenes with a minimum run length r=4 having broader run length distributions. The type of polymer can be chosen by selecting catalysts and reaction conditions that allow for, or do not allow for, olefin migration and cross-metathesis to occur.

The low polar contents present in these materials can be stated as compositions equivalent to copolymers of ethylene and polar vinyl monomers, in which the polar vinyl monomer ($H_2C=CHR_1$) represents 6.4 mole percent or less of the sum total of polar vinyl monomer ($H_2C=CHR_1$) and ethylene ($H_2C=CH_2$) units present in the main chain of the polymer. This representation of this composition is known as vinyl, or $C_2$, basis ($l_{C2}$=mole percent calculated on a vinyl basis). This composition can also be described on a methylene, or $C_1$, basis as a polymer in which —$CHR_1$— units represent 3.2 mole percent or less of the total —$CHR_1$— and —$CH_2$— units present in the polymer ($l_{C1}$=mole percent calculated on a methylene basis), according to the following formula:

$$l_{C1} = \frac{\text{number of } CHR_1 \text{ units}}{[\text{number of } CHR_1 \text{ units} + \text{number of } CH_2 \text{ units}]} \leq 0.032.$$

The copolymers of the invention are derived from rigorously linear functional polyalkenamers also having a methylene-basis composition of 3.2 mole percent or less of the polar vinyl monomer. Since the alkenamers contain olefin (—CH=CH—) groups in addition to $CH_2$ and $CHR_1$ groups, the composition of the polyalkenamer can be represented by the following formula:

$$l_{C1} = \frac{\text{number of } CHR_1 \text{ units}}{[\text{number of } CHR_1 \text{ units} + \text{number of } CH_2 \text{ units} + (2)(\text{number of } CH=CH \text{ units})]} \leq 0.032.$$

Rigorously linear functional polyethylenes containing low polar functional group contents are desirable because, at low polar contents, the physical properties of high-density polyethylene would be expected to be retained while adding the benefits of polar functional groups. This is because small amounts of polar functionality are not as disruptive to the polymer crystal structure as larger amounts. Linear functional copolymers having regular run length distributions are additionally desirable due to the greater predicted benefits of these run length distributions with polar substituents in the absence of alkyl branching. Yet, rigorously linear functional polyolefins containing less than 7.4 mol % of polar vinyl monomers, either with or without regular run length distributions, have heretofore not been disclosed in the art.

The linear functional polymers of the instant invention have 6.4 mole % or less polar groups on a vinyl basis (3.2 mol % or less on a methylene basis) and typically have higher melting point temperatures, crystallization temperatures, and storage moduli than existing alkyl-branched copolymers with similar compositions. Rigorously linear ADMET functional polymers having 7.4 or greater mole % polar groups on a vinyl basis, as described in the art, have lower melting point temperatures than alkyl-branched copolymers with similar compositions. Thus, the composition range embodied by the invention presents physical property improvements over the linear functional polymers of the art having higher polar contents, in addition to presenting physical and mechanical property improvements over free-radically prepared, alkyl-branched functional polymers having 3.2 or less mol % polar groups on a methylene basis.

In another embodiment of the instant invention, the randomly repeating units of the linear functional polymer comprise A, B and D. The A unit represents —$CH_2$—, and the total number of A units is represented by x. The B unit represents

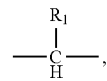

wherein $R_1$ represents a polar functional group, and the total number of B units is represented by y, which is an integer greater than or equal to 1. The D unit represents

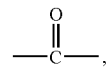

and the total number of D units is represented by h, which is an integer greater than or equal to 0.

The relationship between the randomly repeating units is such that there are at least four A units separating each B unit, each D unit, and each B and D unit. Moreover, the total number of A units, x, is an integer sufficient that the molar fraction of the B and D units in the polymer is represented by a value j defined by the equation:

$$j = \frac{y+h}{x+y+h} \leq 0.032.$$

The above equation defining j indicates that there is at most 3.2 mole % of the B and D units in the linear functional polymer on a methylene, or $C_1$, basis. The value j is preferably at most 3.0 mole % and most preferably at most 2.5 mole %.

As described previously, the polar functional group $R_1$ represents a nitrogen- or oxygen-containing functionality with 8 or fewer non-hydrogen atoms and no olefinic unsaturation (an absence of —CH=CH—). Specifically, $R_1$ represents a polar functional group selected from the group consisting of hydroxy; an alkyl ether having 7 or fewer carbon atoms; an acetate; a carboxylic acid; a sodium carboxylate; an alkyl ester having 6 or fewer carbon atoms; a nitrile; an $OSiMe_3$; a $CO_2SiMe_3$; a sulfonate; an alkyl amine having 7 or fewer carbon atoms, an amide having 6 or fewer carbon atoms; an aldehyde; an alkyl ketone having 7 or fewer carbon atoms, and mixtures of any of the foregoing groups. In particular, $R_1$ is preferably selected from one of OH, acetate, $CO_2Me$, $CO_2C(CH_3)_3$ and $CO_2H$.

In this embodiment, one end of the linear functional polymer terminates in an $R_2$ end group, while the other end of the polymer terminates in an $R_3$ end group. Each of the $R_2$ and $R_3$ end groups is independently directly attached to two A units. $R_2$ and $R_3$ are preferably independently selected from the group consisting of hydrogen, $C_1$–$C_{20}$ linear alkyl, $C_1$–$C_{20}$ branched alkyl, $C_1$–$C_{20}$ cycloalkyl, aryl and phenyl. It is most preferred that each of $R_2$ and $R_3$ is selected from methyl or hydrogen.

In one embodiment of the linear functional polymers described in the second embodiment, the number of A units separating each B or D unit is defined as a run length, r. The run length, r, conforms at each independent occurrence thereof to one of the following equations:

$$r = (e+e) + zd; \quad \text{(i)}$$

$$r = (e+f) + zd; \quad \text{(ii) and}$$

$$r = (f+j) + zd, \quad \text{(iii)}$$

wherein z is any integer greater than or equal to 0; e and f are predetermined integers greater than or equal to 2; and d is a predetermined integer greater than or equal to 4.

Yet another embodiment of the present invention is directed to a linear functional polymer having randomly repeating units A, B and E. Units A and B are the same as disclosed in the first embodiment, but unit E represents —CH=CH—. The total number of E units is represented by m, which is an integer greater than or equal to 2. In this instance, the relationship between the randomly repeating units is such that there is at least one E unit separating each B unit, at least one A unit separating each E unit, and at least one A unit separating each B and E unit. Moreover, the number of A units, x, is an integer sufficient that the molar fraction of the B units in the polymer is represented by a value q defined by the equation:

$$q = \frac{y}{x + y + 2m} \le 0.032.$$

In a similar manner to the above embodiment of the linear functional polymer, this equation indicates that there is at most 3.2 mole % of the B units in the linear functional polymer on a methylene, or $C_1$, basis. The value q is preferably at most 3.0 mole % and most preferably at most 2.5 mole %.

In this embodiment, the end groups $R_2$ and $R_3$ are each independently directly attached to an E unit. The $R_2$ and $R_3$ end groups disclosed in this embodiment are independently selected from $C_1$–$C_{20}$ alkenyl in addition to the same groups of compounds as disclosed in the previous linear functional polymer embodiment. Additionally, the polar functional group, $R_1$, of the B unit for this embodiment is the same as the polar functional group, $R_1$, of the B unit for the above embodiment.

EXAMPLES

All organic manipulations were conducted using standard organic techniques. Air and moisture sensitive reactions were conducted using standard Schlenk techniques under argon. The following materials were purified before use by distillation from $CaH_2$ and degassing: $CH_2Cl_2$ (if required), pentane, benzene, 1,9-decadiene, 11-bromoundecene, cyclooct-4-en-1-ol, and cyclooct-4-enyl acetate (both prepared according to Hillmyer, M. A., et al., *Macromolecules*, 1995, 28, 6311, and distilled at 105–108° C./100 torr and 95° C./100 torr, respectively), 1,3-dimethyl-3,4,5,6-tetrahydro-2(1H)-pyrimidinone (DMPU; 135° C./~40 torr; stored in a Schlenk tube over activated 3 Å molecular sieves), cyclooctene (obtained from Aldrich Chemical Co. in 95% purity with balance cyclooctane; molar amounts were corrected for purity as given by supplier or determined by $^1H$ NMR or gas chromatography). Undecylenic aldehyde was purified by vacuum distillation from $Na_2SO_4$ and stored over molecular sieves in a refrigerator. Dodec-11-enoic acid was synthesized according to Watson, M. D.; Wagener, K. B., *Macromolecules*, 2000, 33, 8963. Bis(tricyclohexylphosphine)benzylidene Ru(IV) dichloride, $RuCl_2(PCy_3)_2CHPh$, was obtained from Fluka ($\ge$97%) or Materia Co. Benzylidene[1,3-dimesitylimidazolidin-2-ylidene](tricyclohexylphosphine) Ru(IV) dichloride, $RuCl_2(PCy_3)(SIMes)CHPh$, was obtained from Strem or synthesized according to Trnka, T. M., et al., *J. Am. Chem. Soc.*, 2003, 125, 2546. 3-Methylbut-2-ene-1-ylidene[1,3-dimesitylimidazolidin-2-ylidene](tricyclohexylphosphine) Ru(IV) dichloride, $RuCl_2(PCy_3)(SIMes)CHCH=C(CH_3)_2$, was synthesized according to Chatterjee, A. K., et al., *J. Am. Chem. Soc.*, 2000, 122, 3783. The intermediate 3-methylbut-2-ene-1-ylidene[1,3-dimesitylimidazolidin-2-ylidene](pyridine)$_2$ Ru(IV) dichloride, $RuCl_2(py)_2(SIMes)CHCH=C(CH_3)_2$ (Example 66), was synthesized according to the method of Sanford, M. S., et al., *Organometallics*, 2001, 20, 5314. Benzylidene[1,3-di(2,6-diisopropylphenyl)imidazolidin-2-ylidene](tricyclohexylphosphine) Ru(IV) dichloride, $RuCl_2(PCy_3)(IPrH_2)CHPh$, was synthesized according to Fürstner, A., et al., *Chem. Eur. J.*, 2001, 7, 3236. Bulk ruthenium catalysts were stored in a dry box; small aliquots were periodically removed and stored in a dessicator for polymerization use. Wilkinson's catalyst, $Cl(PPh_3)_3Rh(I)$, was obtained from Strem and handled under atmospheric conditions. Toluene was dried when required by passage through columns of A-2 alumina and Engelhard Q-5 copper catalyst (Pangborn, A. B., et al., *Organometallics*, 1996, 15, 1518). Diethyl ether and THF were purified and dried by passage through activated alumina. $CDCl_3$, toluene-$d_8$, $CD_2Cl_2$, $C_6D_6$, tetrachloroethane-$d_2$ (TCE-$d_2$), and $d_4$-1,2-dichlorobenzene (ODCB-$d_4$) were distilled, degassed by three freeze-pump-thaw cycles, and stored in a glovebox when necessary. BHT (2,6-di-t-butyl-4-methylphenol) was optionally sublimed before use. $CeCl_3.(H_2O)_7$ was dried as described in Imamoto, T., et al., *J. Am. Chem. Soc.*, 1989, 111, 4392. Hydrogen and CO were obtained from Matheson. Ethyl vinyl ether was purchased pre-stabilized with KOH. All other materials were purchased from Aldrich Chemical Co., Fisher Scientific, J. T. Baker, or Acros and used as received.

Molecular weights reported versus polystyrene were determined by gel permeation chromatography (GPC) using either a simple differential refractive index (DRI) detector or a multi-detector system on one of the following two instruments: (a) a Waters Associates gel permeation chromatograph equipped with three Polymer Laboratories mixed bed Type D columns, an internal DRI detector, and Peak Pro software, using uninhibited THF as the mobile phase at 30° C. (1.0 mL/minute flow rate; typical sample concentration 2.5 mg/mL; sulfur added as a flow marker); (b) a Waters Associates GPCV2000 liquid chromatography system equipped with two Waters Styragel HR-5E columns (10 microns PD, 7.8 mm ID, 300 mm length), an internal differential refractive index detector (DRI), an internal differential viscosity detector (DP), and a Precision 2 angle light scattering detector (LS), using HPLC grade tetrahydrofuran as a mobile phase at 45° C. (1.0 mL/minute flow rate; 0.05–0.07% w/v sample concentration using a 322.5 μl injection volume). The columns were calibrated with polystyrene standards (Polymer Laboratories, Amherst, Mass., or American Polymer Standards Corporation, Mentor, Ohio). All standards were selected to produce $M_p$ or $M_w$ values well beyond the expected polymer's range. Molecular weights measured by two-angle light scattering (GPC-LS) were obtained using instrument (b). The light scattering signal was collected at a 15 degree angle, and the three in-line detectors were operated in series in the order of LS-DRI-DP. The Precision LS was calibrated using a narrow polystyrene standard having an $M_w$=65,500 g/mol.

Molecular weights reported versus polyethylene were determined by GPC using either a simple DRI detector or a multi-detector system on one of the following three instruments: (a) a Waters Associates 150 C High Temperature gel permeation chromatograph equipped with three Polymer Laboratories mixed bed Type B columns (10μ PD, 7.8 mm inner diameter, 300 mm length) in 1,2,4-trichlorobenzene (degassed and inhibited with 1.5 g/L of BHT, 2,6-di-t-butyl-4-methylphenol) at 135° C. using an internal DRI detector (1.0 mL/min solvent flow rate; typical sample concentration 2 mg/mL; 300 μL injection loop); (b) a similar Waters Associates 150 C High Temperature gel permeation chromatograph and column suite, equipped with in-line triple detection (in order of detection: Precision Detector 15° fixed-angle light scattering; Viscotek high-temperature differential viscometer; internal Waters 150 C high-temperature DRI) using an 0.5 ml/min solvent flow rate (typical sample concentration 2 mg/mL; typical sample injection mass 0.550–0.80 mg using a 300 μL injection loop); (c) a similar Polymer Laboratories High Temperature gel permeation chromatograph and column suite, equipped with in-line triple detection (Wyatt three-angle mini-DAWN light scattering; Viscotek high-temperature differential viscometer; internal high-temperature DRI) using an 0.5 mL/min solvent flow rate (typical sample concentration 1–2 mg/mL). Samples were filtered through a 0.7 μm glass pre-filter and subsequently through a 0.1 μM Teflon™ filter. Polystyrene standards (17 in total) were used for instrument calibration, and a polyethylene calibration curve was then generated via a universal calibration software program (Sun, T., et al., *Macromolecules*, 2001, 34, 6812) using the Mark-Houwink coefficients for polystyrene and polyethylene.

Molecular weights measured by light scattering (GPC-LS) at 135° C. in 1,2,4-trichlorobenzene were determined using instruments (b) and (c). For instrument (b), the low angle was used for light scattering and the term $P(\theta)$ was approximated as 1; for instrument (c), data were fit using all three light scattering angles. The triple detector system was calibrated using two narrow polystyrene standards (Polymer Laboratories), three narrow and one broad polyethylene standards (NIST), and one broad PP standard (ExxonMobil PP-3445) of known $M_w$, intrinsic viscosity, and injection mass. The inter-detector volumes were determined using a narrow polystyrene standard and shifted to obtain the best overlap of the three normalized signals. The detector response factors used to convert the raw data into molecular weights were calculated using all seven polymer standards and an EXCEL optimization macro. The DRI response factor was determined by optimizing agreement between polymer concentrations (calculated from the integrated peak areas) and injection masses for the seven standards. The light scattering and intrinsic viscosity response factors were determined by optimizing the agreement between literature and calculated $M_w$ values for the five narrow standards.

For acetate- and methyl ester-containing polymers, a composition-specific input dn/dc value for each polymer was electronically estimated via interpolation from known dn/dc values for polyethylene, poly(vinyl acetate), and poly(methyl acrylate). For this calculation, the composition of each polymer was measured as weight percent vinyl acetate or methyl acrylate by treating the polymer as an ethylene/vinyl acetate or ethylene/methyl acrylate copolymer of identical composition. Since no dn/dc values were available for poly(vinyl alcohol), poly(ketene), or poly(acrylic acid), interpolation to give composition-specific values for polymers containing alcohol, ketone, and acid groups could not be performed. These functional groups were treated as either acetate units (for alcohols and ketones) or methyl ester units (for acids) in the following manner: the weight percent content of vinyl acetate, ketene, or acrylic acid in a polyethylene copolymer of identical composition was determined, and these weight percent values were treated as weight percent vinyl acetate or methyl acrylate. These values were either used for the dn/dc interpolation calculation (for polymers containing only alcohol or acid units) or added to the weight percents of other functionalities appearing in the polymer and using this total for the dn/dc calculation. In cases where limited polymer solubility prevented an accurate composition measurement, the nominal wt % of polar comonomer (given by the supplier) was used to determine dn/dc.

The quantity g' was calculated using the Mark-Houwink parameters for polyethylene. These values are only approximate, as the Mark-Houwink parameters for functional group-containing polymers may differ significantly from those of polyethylene, and vary with composition. The Mark-Houwink parameters, and derived g' values, are therefore only comparable between polymers of similar composition. This relative comparison is valid, although the g's themselves may not be accurate. These values are given only to illustrate general differences between the polymers synthesized in the Examples and comparative commercial materials C–DD with similar compositions.

Solution $^1$H and $^{13}$C NMR spectroscopy of alkenamer polymer samples, monomers and catalysts were conducted using Varian Gemini 300, VXR 300, Mercury 300, Unity Inova 300, UnityPlus 500, or Inova 500 spectrometers. Reported chemical shifts are referenced to residual protio solvents or tetramethylsilane. Solution $^{13}$C NMR of hydrogenated/reduced copolymers was carried out in 1,1,2,2-tetrachloroethane-d$_2$ (TCE-d$_2$) or 1,2-dichlorobenzene (ODCB-d$_4$) at 120° C. using an INOVA 300 instrument equipped with a 10 mm broadband probe. Chromium tris-acetylacetonate, Cr(acac)$_3$, was usually added as a relaxation agent at a concentration of 15 mg/mL and typically 11,000–16,000 co-added transients were collected. $^1$H NMR of hydrogenated/reduced polymers was conducted in tetrachloroethane-d$_2$ or o-dichlorobenzene at 120° C. without relaxation agent using a Varian UnityPlus 500 instrument equipped with a 5 mm switchable probe; 160 co-added transients were collected. Solid-state $^{13}$C NMR (1 pda Bloch decay and cp4 cross-polarization) was conducted with a Varian CMX-200 instrument equipped with a 4 mm pencil probe, using a rotor spinning speed of 8 kHz. A total of 1392 (Bloch decay) or 3308 (cross-polarization) co-added transients were collected.

IR spectra were collected on a Bruker 200 spectrometer, a Mattson Galaxy Series 5000 spectrometer running FIRST software, or a Mattson Polaris spectrometer running WinFirst software. Polymer samples were either cast as thin films onto NaCl plates by slow evaporation of a tetrachloroethane solution at ~130° C. in a covered Petri dish, analyzed as neat thin films on NaCl plates (for oils), or analyzed as powders in KBr pellets, as indicated. HRMS-FAB and electrospray ionization mass spectroscopy spectroscopies were conducted using a FINNIGAN MAT95 Q instrument. Elemental analysis was conducted by Atlantic Microlab (Norcross, Ga.). Melting points were determined visually in capillary tubes using a Thomas Hoover oil bath apparatus. HPLC was conducted on a Rainin HPLC system consisting of Dynamax SD-1 solvent pumps with 200 mL heads. C18-modified silica columns (10 mm or 41.6 mm width, 250 mm length, 8 μm particle size, 60 Å pore volume) were used and detection was achieved with Dynamax UV-1 and Varian Star 9042 R$_1$ detectors connected in series.

Differential scanning calorimetry (DSC) was carried out on a TA Instruments 2920 calorimeter or a Perkin-Elmer DSC 7 using a scan rate of 10 degrees per minute. A three-point calibration using either cyclohexane (−87.05° C. and 6.55° C.), In (156.61° C.) and Sn (231.95° C.), or cyclohexane, naphthalene (80.27° C.) and In onsets was employed for the TA instrument; a two-point calibration using n-octane (−56.8° C.) and In was used for the Perkin-Elmer instrument. Heats of fusion ($\Delta H_f$) are referenced to that of In. Melting point ($T_m$) maxima and onset values and $\Delta H_f$s are derived from second or third heats. Crystallization point ($T_c$) maxima and onset values and $\Delta H_f$s are derived for first coolings for the hydrogenated/reduced polymers and second coolings for alkenamer polymers. Small low-temperature shoulders to the main $T_c$ peak were typically observed for the hydrogenated/reduced copolymers. Glass transition temperatures ($T_g$) taken via DSC are midpoint, rather than onset, values. Crystallinities associated with melting and crystallization transitions were calculated by dividing the $\Delta H_f$ value by 293 J/g (Wunderlich, B., The Defect Crystal, *Macromolecular Physics*, 1, Academic Press Inc.: New York, 1973, Vol. 1, 401).

Polymer samples were compression-molded into rectangular DMTA test bars measuring 38 mm×13 mm×1.8 mm (dimensions for ASTM D1693-95) using a PHI company QL-433-6-M2 model hydraulic press equipped with separate heating and cooling platforms and a 10-hole stainless steel mold. The multistage procedure described below was used. The upper and lower press plates were covered with Teflon™-coated aluminum foil, and halocarbon aerosol mold release agent (Miller-Stephenson MS-122DF) was typically sprayed onto the mold and press plates, prior to pressing. The bars were carefully removed from the mold holes by carefully pulling on the excess flashing (subsequently trimmed away) or by gentle pressure using a knockout tool, avoiding flexion. Bars with bubbles were discarded, or re-pressed as described below when necessary to conserve material. The mold and press plates were then wiped or scraped to remove residual mold release and polymer. Free-radical comparative polymer samples C–DD (pellets or powders) were loaded into the mold (ca. 1 g of material per hole) as received, as were samples 22 and 27. All other samples required a pre-melt treatment due to their fibrous or low-density powdery forms, which made it difficult to load enough sample into the mold holes for successful pressing. The pre-melt treatment was performed by shredding the polymer samples, placing the samples in thin layers on a watch glass, and heating under $N_2$ flow in an oven at 15–40° C. above the end of the second melt transition for 5–30 minutes (minimal heat and time until softening was observed). The samples were then quickly removed from the oven and compressed while hot with a metal spatula, allowed to cool, and re-shredded into small dense pieces which were then loaded into the mold holes. In some cases, the resultant bars showed bubbles or cavities due to insufficient material or incomplete melting. The bars were re-loaded into the press holes (intact or, in some cases, re-shredded into small pieces) along with additional pre-melted polymer material and re-pressed. The samples were pressed at 15–30° C. above the end of the second melt transition using the following multistage procedure: (1) 3–5 minutes at desired temperature with a slight overpressure (1–2 tons) followed by release; (2) 60 seconds at desired temperature and 10 tons followed by release; (3) 60 seconds at desired temperature and 20 tons followed by release; (4) 60 seconds at desired temperature and 30 tons followed by release; (5) 3–4 minutes at desired temperature and 30 tons followed by release; (6) 3 minutes at 7° C. (cooling platform) and 30 tons followed by release.

Three-point bend mode DMTA (dynamic mechanical thermal analysis) was carried out using a TA Instruments DMA 2980 V1.5B (Universal V3.1E) fitted with a liquid $N_2$ cooling accessory. Compression-molded bars were analyzed using a 3-point bending mode assembly from −135° C. or −90° C. to 40° C.–80° C. to measure the relaxation in the viscoelastic region. The conditions for the dynamic experiment were: frequency, 1 Hz; amplitude, 20 µm; heating rate, 3° C./minute. A pre-load force of 0.01 N and an autostrain (Force track) of 150% were used. Onset of glass transition ($T_g$) values were obtained from the extrapolated tangent to the peak of the tan delta curve, or from the extrapolated onset of storage modulus drop from the E' curve (intersection of two linearly fitted regions). In cases where the tan Δ glass transition was broad and an automatic extrapolation appeared to give anomalous $T_g$ values, the first deviation from linearity was used to approximate the beginning of relaxation in the glassy region. Tensile mode DMTA was carried out using a Rheometrics Scientific DMTA V fitted with a liquid $N_2$ cooling accessory and Orchestrator 6.5.8 software. Bars were analyzed using a tensile mode assembly from −100° C. to 80° C.–150° C. The conditions used were: frequency, 1 Hz (6.28 rad/s); strain amplitude, 0.01%; heating rate, 3° C./minute. The autotension option on the DMTA V (maximum displacement 3.0 mm, maximum rate 0.01 mm/sec) was utilized to prevent the sample from buckling during testing. An initial static force of 5 g (0.05 N) was used and the static force was maintained at 20% greater than the dynamic force throughout each test. In both modes, two bars were typically analyzed for each polymer sample, and data obtained from the bar showing the highest storage modulus (fewest physical defects) is reported.

Mole % composition on a vinyl basis for alcohol and ketone-containing polymers 1–8, 21–25, and C–E is reported as the average of $^1$H and $^{13}$C NMR measurements. $^1$H NMR composition was quantified by comparison of the alcohol C$\underline{H}$(OH) and ketone C$\underline{H}_2$C=O integrals versus the total aliphatic integral, which was attributed to ethylene after correction for aliphatic protons arising from vinyl alcohol and ketene units. $^{13}$C NMR composition was quantified using the α and β $\underline{CH}_2$ resonances to the alcohol CH(OH) and ketone C=O groups, and optionally the ketone C=O versus the corrected aliphatic integral. Mole % composition on a vinyl basis for acetate and alcohol-containing polymers 9–11, 26–27, and F–M is reported as the average of $^1$H and $^{13}$C NMR measurements. $^1$H NMR composition was quantified by comparison of the acetate C$\underline{H}$(O$_2$CMe) and alcohol C$\underline{H}$(OH) resonances and the acetate O$_2$C$\underline{Me}$ resonance versus the corrected aliphatic integral. $^{13}$C NMR composition for polymers 9–11 and 26–27 was quantified using the α and β $\underline{CH}_2$ resonances to the alcohol CH(OH) and acetate CH(O$_2$CMe) groups, the acetate C=O, and the O$_2$C$\underline{Me}$ resonances versus the corrected aliphatic integral. The spectra were deconvoluted/integrated using the NutsPro NMR data processing package from AcornNMR. The peaks were fitted with an 85/15 Lorentzian/Gaussian profile. $^{13}$C NMR composition for polymers F–M was accomplished similarly, except that the acetate α and β $\underline{CH}_2$ resonances were not used and deconvolution was not performed. Mole % composition on a vinyl basis for methyl ester-containing polymers 15–17 and N–T is reported as the average of $^1$H and $^{13}$C NMR measurements. $^1$H NMR composition was quantified by comparison of the acrylate ester OMe group versus the corrected aliphatic integral, assuming the absence of hydrolyzed ester units (acids). $^{13}$C NMR composition for polymers 15–17 was quantified using the α and β $\underline{CH}_2$ resonances to the ester $\underline{C}$H(CO$_2$Me) group, the ester C=O and OMe resonances, and the hydrolyzed acid C=O resonance (to quantify acid content; present only in trace quantities) versus the corrected aliphatic integral. $^{13}$C NMR composition for polymers N–T was accomplished similarly except that the ester α and β $\underline{CH}_2$ resonances were not used. Mole % composition on a vinyl basis for t-butyl ester-containing polymers 12–14 was quantified via $^{13}$C NMR, using the ester C=O, OCMe$_3$, and CH(CO$_2$tBu) resonances versus the corrected aliphatic integral. Mole % composition for acid-, alcohol- and ketone-containing polymers 18–19 is reported as the average of $^1$H and $^{13}$C NMR measurements. $^1$H NMR composition was quantified by comparison of the acid CH(CO$_2$H), alcohol CH(OH) and ketone CH$_2$C=O integrals versus the corrected aliphatic integral. $^{13}$C NMR composition was quantified without use of Cr(acac)$_3$ relaxation agent using the acid CH(CO$_2$H) resonance and the α and β CH$_2$ resonances to the alcohol CH(OH) and ketone C=O versus the corrected aliphatic integral. A similar methodology was used for polymers 28–30 and X–BB except that Cr(acac)$_3$ relaxation agent was used for $^{13}$C NMR spectra. Exchange between polymer carbonyl groups and acac ligands at Cr resulted in the presence of free acac resonances (191.5, 100.6 ppm). Correction was made for this exchange by quantification of the free acac content and addition of this value to the acid content of the polymer at a ratio of one acid group per acac ligand. Mole % composition for polymers U–W was quantified via $^{13}$C NMR using the methodology described for polymers 28–30 and X–BB. Mole % composition for acid-containing polymer 20 was quantified using solid-state Bloch Decay (1 pda) $^{13}$C NMR using the acid C=O resonance versus the total corrected aliphatic integral. Mole % composition for carboxylate salt-containing polymers 31, CC, and DD is reported as the average of $^1$H and $^{13}$C NMR measurements using the methodology described for polymers 28–30 and X–BB.

Quantification of branching for free-radically prepared comparative polymers C–DD was performed by $^{13}$C NMR. Each of the following branch types was measured and compared to the total spectral integral to give the number of branches per 1000 total carbons. Ethyl branches were measured by the 1B$_2$ methyl resonance (8–13 ppm). Amyl and longer branches were measured by the 2s methylene resonance (22.9 ppm) or the average of the 2s and 3s (32.2) methylene resonances. This value includes chain ends. Propyl and butyl branches were measured by subtracting the integral of the amyl and longer branches. These four combined branch types are reported as "C$_2$+branches per 1000 total carbons." Methyl (C$_1$) branches were measured by the 1B$_1$ methyl resonance (16–20 ppm).

Mole % composition on a vinyl basis for olefin-containing (non-hydrogenated)polymers was quantified via $^1$H NMR using the ratio of the functionality branch point methine proton (CHOH, CHO$_2$CMe, CHCO$_2$H, CHCO$_2$Me, or CHCO$_2$tBu) resonances versus the combined olefin resonances. For vinyl acetate-containing polymers, the OCH$_3$ resonance was sometimes used instead of the CHO$_2$CMe peak. Cis: trans ratios were quantified by $^{13}$C NMR using ratios for the relevant olefinic resonances given in the Examples.

Example 1

Synthesis of RuCl$_2$(PCy$_3$)(SIMes)CHCH$_3$

RuCl$_2$(PCy$_3$)(SIMes)CHPh (127 mg, 0.150 mmol) was placed in a 25 mL flask with 10 mL of reagent-grade benzene and degassed by bubbling argon through the solution for 25 minutes. The flask was then immersed in a 60° C. oil bath and 2-butene (mixture of cis and trans) was then bubbled rapidly through the solution for 15 minutes, resulting in a color change from purple to dark orange. The solution was then frozen and freeze-dried overnight under high vacuum at room temperature to give 110 mg (93.4%) RuCl$_2$(PCy$_3$)(SIMes)CHCH$_3$. $^1$H NMR (299.631 MHz, CDCl$_3$): δ 18.54 (d, Ru=CH, J$_{HH}$=7 Hz, 1H), 6.98, 6.93 (s, aryl H, 1H, 1H), 3.90 (m, NCH$_2$CH$_2$N, 4H), 2.62, 2.44, 2.31, 2.30 (s, mesityl CH$_3$, 6H, 6H, 3H, 3H), 2.1–2.3 (br, PCy$_3$, 3H) 1.4–1.7 (br, PCy3 and RuCHCH$_3$, 33H) ppm. $^{13}$C NMR (75.357 MHz, CDCl$_3$): δ 315.15, 219.90 (J$_{CP}$=74.9 Hz), 138.82, 138.37, 138.02, 137.99, 137.37, 129.77, 129.33, 51.85 (J$_{CP}$=2.8 Hz), 51.53 (J$_{CP}$=2.3 Hz), 46.43, 31.49 (J$_{CP}$=16.6 Hz), 29.09, 27.58 (J$_{CP}$=10.2 Hz), 26.18, 21.05, 20.97, 19.63, 18.54 ppm. HRMS-FAB: Theoretical: 786.3143; Found: 751.3400 [M-Cl]$^+$. Analysis calculated for C$_{44}$H$_{49}$Cl$_2$N$_2$PRu: C, 62.58; H, 8.07; N, 3.56. Found: C, 62.61; H, 7.89; N, 3.34.

Examples 2–65

Synthesis of Linear Functional Polymers

The synthesis of linear functional polymers (and also of certain monomers required for these polymer syntheses) is described in Examples 2–65. Table 1 summarizes composition, molecular weight, thermal and modulus data for some of these materials, denoted linear functional polyethylenes 1–31, and comparative polymer A. The synthesis of each of these materials is described in detail immediately following Table 1 in Examples 2–65 and C1, along with the synthesis and characterization of linear functional polyalkenamers 1-U to 30-U.

TABLE 1

Composition and characterization data for linear functional polyethylenes 1–31 and comparative material A.

| Polymer | Composition (mol % polar, vinyl basis)[a] | DRI M$_w$[b] | DRI M$_n$[b] | LS M$_w$[c] | LS M$_n$[c] | T$_m$ max (° C.)/ crystallinity | T$_c$ max (° C.)/ crystallinity | T$_g$ onset (° C.)[d] tan Δ | T$_g$ onset (° C.)[d] E' | St. mod. (25° C., MPa), mode[d] |
|---|---|---|---|---|---|---|---|---|---|---|
| 1 | 1.6 VOH, 0.3 ketene | 185,620 | 80,970 | — | — | 128.8 (0.584) | 106.7 (0.596) | −25.8 | −10.1 | 687 (B) |
| 2 | 1.1 VOH, 0.8 ketene | 106,340 | 47,490 | — | — | 127.8 (0.587) | 105.2 (0.556) | −7.3 | −6.9 | 552 (B) |
| 3 | 3.2 VOH, 0.3 ketene | 142,070 | 64,990 | — | — | 125.3 (0.543) | 104.4 (0.502) | −13.5 | −2.7 | 650 (B) |
| 4 | 2.2 VOH, 1.2 ketene | 183,990 | 80,120 | — | — | 126.5 (0.539) | 105.2 (0.570) | −14.8 | −12.2 | 677 (B) |
| 5 | 4.6 VOH, 0.7 ketene | 222,390 | 95,400 | — | — | 123.7 (0.437) | 106.2 (0.492) | −7.0 | 0.7 | 565 (B) |
| 6 | 1.9 VOH, 0.1 ketene | 367,280 | 179,970 | — | — | 127.4 (0.462) | 109.5 (0.445) | — | 15.4 | 666 (T) |
| 7 | 3.6 VOH | 297,040 | 123,630 | — | — | 125.1 (0.448) | 107.8 (0.434) | — | 18.3 | 672 (T) |
| 8 | 6.0 VOH, 0.1 ketene | 379,460 | 184,760 | — | — | 120.5 (0.389) | 106.0 (0.346) | — | 19.8 | 684 (T) |
| 22 | 2.1 VOH, 0.1 ketene | 17,060 | 14,060 | 17,100 | 14,000 | 128.5 (0.705) | 114.0 (0.673) | −80.0, 4.0 | — | 1418 (B) |
| 24 | 2.1 VOH, 0.2 ketene | 5,470 | 2,680 | 6,510 | 5,640 | 126.9 (0.830) | 111.8 (0.808) | — | — | — |
| 23 | 3.7 VOH, 1.0 ketene | 5,350 | 2,530 | 5,530 | 4,950 | 123.1 (0.770) | 108.9 (0.747) | — | — | — |

TABLE 1-continued

Composition and characterization data for linear functional polyethylenes 1–31 and comparative material A.

| Polymer | Composition (mol % polar, vinyl basis)[a] | DRI $M_w$[b] | DRI $M_n$[b] | LS $M_w$[c] | LS $M_n$[c] | $T_m$ max (° C.)/ crystallinity | $T_c$ max (° C.)/ crystallinity | $T_g$ onset (° C.)[d] tan Δ | $T_g$ onset (° C.)[d] E' | St. mod. (25° C., MPa), mode[d] |
|---|---|---|---|---|---|---|---|---|---|---|
| 25 | 5.0 VOH, 0.1 ketene | 9,260 | 2,770 | 6,960 | 5,790 | 121.8 (0.676) | 105.8 (0.641) | — | — | — |
| 21 | 5.8 VOH, 0.3 ketene | 2,590 | 1,440 | — | — | 115.4 (0.659)[e] | 103.6 (0.643) | — | — | — |
| 15 | 1.9 MA | 198,860 | 91,450 | — | — | 111.8 (0.378)[e] | 97.7 (0.387) | −35.2 | −30.2 | 340 (B) |
| 16 | 3.6 MA | 202,910 | 91,500 | — | — | 100.5 (0.322)[e] | 84.0 (0.318) | −43.6 | −33.0 | 75.8 (B) |
| 17 | 5.6 MA | 201,980 | 87,950 | — | — | 85.4 (0.265)[e] | 72.7 (0.261) | −44.2 | −38.7[h] | 52.2 (B)[h] |
| 9 | 1.9 VAC | 265,330 | 117,740 | — | — | 109.8 (0.373) | 96.3 (0.361) | −36.8 | −29.6[h] | 204 (B)[h] |
| 10 | 3.3 VAC | 220,230 | 94,030 | — | — | 97.9 (0.319)[e] | 84.7 (0.341) | −43.0 | −34.9 | 111 (B) |
| 11 | 4.6 VAC | 202,940 | 67,080 | — | — | 89.6 (0.284)[e] | 78.0 (0.312) | −40.7 | −34.5 | 92.1 (B) |
| 27 | 1.8 VAC, 0.3 VOH | 15,380 | 5,400 | 14,800 | 11,800 | 117.8 (0.532) | 106.5 (0.526) | −8.2 | — | 451 (B) |
| 26 | 6.1 VAC, 0.1 VOH | 9,280 | 4,450 | 8,810 | 6,100 | 73.2 (0.199)[e] | 59.6 (0.287)[f] | — | — | — |
| 18 | 1.5 AA, 0.4 ketene, 0.7 VOH | 53,810[j] | 12,330[j] | — | — | 114.9 (0.408) | 102.1 (0.460) | — | 22.5 | 831 (T) |
| 19 | 3.4 AA | 38,460[gj] | 20,750[gj] | — | — | 103.3 (0.312) | 89.5 (0.339) | — | 19.6 | 463 (T) |
| 20 | 8.3 AA | insol. | insol. | — | — | 89.0 (0.219)[e] | 72.5 (0.196) | — | 3.5 | 142 (T) |
| 28 | 2.5 AA | 8,350 | 2,790 | — | — | 117.7 (0.707) | 105.1 (0.721) | — | 2.5 | 1341 (T) |
| 29 | 4.6 AA | 7,650 | 2,570 | — | — | 108.8 (0.549)[e] | 97.1 (0.499) | — | 20.1 | 939 (T) |
| 30 | 6.4 AA, 2.0 VOH | 1,700[i] | 880[i] | — | — | 97.5 (0.409)[e] | 87.2 (0.399) | — | — | — |
| 31 | 2.3 AA, Na salt | 7,290 | 2,750 | — | — | 116.4 (0.403) | 101.7 (0.422) | — | — | — |
| 12 | 1.8 tBA | 196,990 | 93,050 | — | — | 109.4 (0.344)[e] | 94.9 (0.392) | — | −27.2 | 221 (T) |
| 13 | 3.5 tBA | 176,600 | 81,070 | — | — | 96.6 (0.251)[e] | 82.3 (0.288) | — | −28.9 | 87.9 (T) |
| 14 | 5.3 tBA | 126,720 | 58,830 | — | — | 81.6 (0.246)[e] | 69.0 (0.227) | — | −32.9 | 49.1 (T) |
| A | Polyethylene | 151,370 | 67,660 | — | — | 130.8 (0.564) | 106.1 (0.517) | — | 16.9 | 967 (T) |

VOH = vinyl alcohol;
VAC = vinyl acetate;
MA = methyl acrylate;
AA = acrylic acid;
tBA = t-butyl acrylate;
ketene = $H_2C=C=O$;
insol. = insoluble.
[a]By NMR.
[b]DRI, 135° C., in trichlorobenzene, versus polyethylene calibration curve.
[c]Light scattering, 135° C., in trichlorobenzene, analyzed as analogous wt % EVAC.
[d]By DMTA; B = 3-point bend deformation; T = tensile deformation. Glass transitions were determined in the same mode as modulus data.
[e]Broad transition or low-temperature shoulder to melt.
[f]Two maxima; crystallinity value affected by run truncation at 25° C.
[g]Low solubility.
[h]Tensile mode values: 9: $T_g$ onset, −28.5 (E') ° C.; 25° C. storage modulus, 251 MPa; 17: $T_g$ onset, −38.7 (E') ° C.; 25° C. storage modulus, 70.3 MPa.
[i]Bimodal.
[j]High-MW portion of overlapping bimodal MWD.

Example 2

Synthesis of Polymer 1-U

Cyclooctene (19.15 g of 95% purity material, 165 mmol) was mixed with 1.81 g cyclooct-4-en-1-ol (14.3 mmol) under atmospheric conditions to form a solution, of which 10 mL (8.48 g) was added to a dry, argon-purged 500 mL three-neck round-bottom flask fitted with an argon inlet, high-viscosity mechanical stirrer, and septum. o-Dichlorobenzene (130 mL) was added to give an 0.5 M solution of the cyclooctene monomers, stirring was initiated, and argon was bubbled through the resultant solution for 0.5 hour, after which it was heated under argon to 60° C. using an oil bath. A solution of $RuCl_2(PCy_3)(SIMes)CHCH_3$ (36 mg, 0.046 mmol, 1700:1 monomer:catalyst ratio) in 1 mL o-dichlorobenzene was added via syringe and the polymerization was stirred at 60° C. under argon for 4 days. Subsequently, a quantity of BHT equivalent to 0.05–0.1 wt % of the theoretical polymer yield was added to the solution as a solid. A small quantity (~0.5 mL) of solution was removed by pipette and added to 50 mL stirred methanol at room temperature to precipitate the polymer product 1-U, which was isolated by filtration and dried under vacuum overnight at room temperature (0.47 g, 5.5%, white solid). IR (film on NaCl): 2987, 2923, 2851, 1464, 1436, 965, 723 cm$^{-1}$ (O—H stretch not assigned due to weakness). $^1$H NMR (300 MHz, benzene-$d_6$): δ 5.3–5.5 (b, CH=CH, cis and trans), 3.3–3.6 (b, CHOH), 1.8–2.4 (b, $CH_2CH=CH$), 1.1–1.7 (m, $CH_2$) ppm. $^{13}$C NMR (75 MHz, benzene-$d_6$): δ 131.1 (with other peaks, CH=CH trans), 130.6 (with other peaks, CH=CH cis), 71.6 (CHOH), 38.0 ($CH_2CHOH$), 27.5–32.9 (many peaks, $CH_2$ including allylic), 26.0 ($CH_2CH_2CHOH$) ppm. Cis: trans=~1:4 ($^{13}$C NMR). The composition of the polymer ($^1$H NMR) on a vinyl basis, ignoring the presence of olefin units, was 1.7 mol % vinyl alcohol and 98.3 mol % ethylene. DSC $T_m$: onset −45.3° C., max 29.0° C., $\Delta H_f$ 46.8 J/g (very broad). The end groups $R_2$ and $R_3$ are H or $CH_3$.

Example 3

Synthesis of Polymer 1

After removal of the aliquot containing 1-U in Example 2, the remainder of the polymerization solution was poured into a glass sleeve for a 450 mL stainless steel mechanically stirred Parr reactor. o-Dichlorobenzene (100 mL) was layered onto the polymer solution. The reactor was assembled and sealed, and three cycles of pressurization to 400 psig $H_2$ followed by release were performed to expel air. The reactor was then pressurized to 370 psig $H_2$ and heated to 130° C. Stirring was commenced when the temperature reached 100° C. After 24 hours, the solution was cooled and the pressure released. The glass sleeve was removed and a magnetic stirbar was added. The mixture was heated to between 130° C.–180° C. to re-dissolve the polymer, which was then precipitated into 700 mL of methanol in a blender for crushing. The white crushed powder was collected by filtration, rapidly stirred twice for five minutes in 300 mL boiling methanol, and dried under high vacuum at room temperature overnight to give 6.33 g (74%) of polymer 1 as a white solid. IR (film on NaCl): 3410 (O—H stretch), 2918, 2850, 1718 (C=O), 1473, 1463, 910, 730, 720 cm$^{-1}$. $^1$NMR (500 MHz, ODCB-d$_4$, 120° C.): δ 3.50–3.66 (b, CHOH), 2.25–2.36 (t, $CH_2C=O$), 0.95–1.75 (m, $CH_2$) ppm. $^{13}$C NMR (75 MHz, TCE-d$_2$, Cr(acac)$_3$ (15 mg/mL), 120° C.): δ 210.8 (C=O), 72.4 (CHOH), 43.1 ($CH_2C=O$), 38.1 ($CH_2CHOH$), 30.0 ($CH_2$), 26.0 ($CH_2CH_2CHOH$), 24.4 ($CH_2CH_2C=O$) ppm. No alkyl branching was observed. In addition to the main polymer, a small oligomeric component was observed at $M_w$ 2,220; $M_n$ 1,070; $M_w/M_n$ 2.1. The end groups $R_2$ and $R_3$ are H or $CH_3$.

Example 4

Synthesis of Polymer 2-U

Following the procedure described in Example 2, cyclooctene (19.15 g of 95% purity material, 165 mmol) was mixed with cyclooct-4-en-1-ol (1.81 g, 14.3 mmol) to form a solution, of which an 10 mL portion (8.48 g) was taken for polymerization and added to a solution of $RuCl_2(PCy_3)$ (SIMes)CHCH=C(CH$_3$)$_2$ (57 mg, 0.073 mmol, ~1000:1 monomer:catalyst) in 135 mL o-dichlorobenzene, which had been degassed by bubbling argon through a syringe needle for 25 minutes. After a reaction period of 6 days at 60° C., removal and workup of a small aliquot of solution gave 0.42 g (5%) of polymer 2-U as a white solid. BHT was not added. GPC (DRI, 135° C. in 1,2,4-trichlorobenzene vs. polyethylene): $M_w$ 51,630; $M_n$ 4,690; $M_w/M_n$ 11.0 (overlapping bimodal distribution). The end groups $R_2$ and $R_3$ are H or CH=C(CH$_3$)$_2$.

Example 5

Synthesis of Polymer 2

After removal of the aliquot containing polymer 2-U in Example 4, the remainder of the polymerization solution was hydrogenated following the procedure given in Example 3 to give 3.79 g (44.8%) of polymer 2. BHT was added to the methanol used for polymer precipitation. The IR and NMR spectra of the polymer were similar to material 1. In addition to the main polymer, a small oligomeric component was observed at $M_w$ 1,470; $M_n$ 810; $M_w/M_n$ 1.8. The end groups $R_2$ and $R_3$ are H or $CH_2CH(CH_3)_2$.

Example 6

Synthesis of Polymer 3-U

Following the procedure described in Example 2, cyclooctene (17.3 g of 95% purity material, 149 mmol) was mixed with cyclooct-4-en-1-ol (3.58 g, 28.4 mmol) to form a solution, of which an 10 mL (~9.0 g) portion was taken for polymerization and added to a solution of $RuCl_2(PCy_3)$ (SIMes)CHCH=C(CH$_3$)$_2$ (57 mg, 0.073 mmol, ~1000:1 monomer:catalyst) in 135 mL o-dichlorobenzene. After a reaction period of 6 days at 60° C., removal and workup of a small aliquot of solution gave 0.65 g (7.7%) of polymer 3-U as a rubbery, amorphous solid. BHT was not added. The end groups $R_2$ and $R_3$ are H or CH=C(CH$_3$)$_2$.

Example 7

Synthesis of Polymer 3

After removal of the aliquot containing 3-U in Example 6, the remainder of the polymerization solution was hydrogenated following the procedure given in Example 3 to give 4.96 g (58.6%) of polymer 3. BHT was added to the methanol used for polymer precipitation. The IR and NMR spectra of the polymer were similar to material 1. In addition to the main polymer, a small oligomeric component was observed at $M_w$ 2,010; $M_n$ 950; $M_w/M_n$ 2.1. The end groups $R_2$ and $R_3$ are H or $CH_2CH(CH_3)_2$.

Example 8

Synthesis of Polymer 4-U

Following the procedure described in Example 2, cyclooctene (17.3 g of 95% purity material, 149 mmol) was mixed with cyclooct-4-en-1-ol (3.58 g, 28.4 mmol) to form a solution, of which an 10 mL (~9.0 g) portion was taken for polymerization and added to a solution of $RuCl_2(PCy_3)$ (SIMes)CHCH$_3$ (65 mg, 0.082 mmol, ~900:1 monomer:catalyst) in 135 mL o-dichlorobenzene. After a reaction period of 1 day at 60° C., removal and workup of a small aliquot of solution gave 0.60 g (7.1%) of polymer 4-U as a white solid. The NMR spectra and end groups for the polymer are similar to material 1-U. The composition of the polymer ($^1$H NMR) on a vinyl basis, ignoring the presence of olefin units, was 3.6 mol % vinyl alcohol and 96.4 mol % ethylene.

Example 9

Synthesis of Polymer 4

After removal of the aliquot containing 4-U in Example 8, the remainder of the polymerization solution was hydrogenated following the procedure given in Example 3 to give 6.35 g (75%) of polymer 4. The IR and NMR spectra and end groups for the polymer are similar to material 1. In addition to the main polymer, a small oligomeric component was observed at $M_w$ 2,280; $M_n$ 1,120; $M_w/M_n$ 2.0.

Example 10

Synthesis of Polymer 5-U

Following the procedure described in Example 2, cyclooctene (14.7 g corrected for purity, 133 mmol) was mixed with cyclooct-4-en-1-ol (5.31 g, 42.1 mmol) to form a solution, of which an 15 mL (~14.3 g) portion was added to a solution of $RuCl_2(PCy_3)$(SIMes)CHCH$_3$ (34.2 mg, 39.4 µmol, ~3160:1 monomer:catalyst) in 135 mL o-dichlorobenzene. After a reaction period of 1 day at 60° C., removal and workup of a small aliquot of solution gave 1.03 g (~7.2%) of polymer 5-U as white fibers. DSC $T_c$: max 35.7° C. GPC (DRI, 45° C. in THF vs. polystyrene): $M_w$ 97,000; $M_n$ 54,000; $M_w/M_n$ 1.8. GPC-LS (2-angle, 45° C. in THF vs. polystyrene): $M_w$ 209,870; $M_n$ 67,700; $M_w/M_n$ 3.1. The end groups $R_2$ and $R_3$ are H or $CH_3$.

Example 11

Synthesis of Polymer 5

After removal of the aliquot containing 5-U in Example 10, the remainder of the polymerization solution was hydrogenated following the procedure given in Example 3 to give 8.36 g (58.6%) of polymer 5. The IR and NMR spectra and end groups for the polymer are similar to material 1. In addition to the main polymer, a small oligomeric tail was observed at $M_w$ 2,270; $M_n$ 1,110; $M_w/M_n$ 2.0.

Example 12

Synthesis of Polymer 6-U

Following the procedure described in Example 2, cyclooctene (6.06 g corrected for purity, 55.0 mol) was mixed with cyclooct-4-en-1-ol (0.60 g, 4.8 mol) to form a solution, which was added to 46.4 mL o-dichlorobenzene. A solution of $RuCl_2(PCy_3)(SIMes)CHCH_3$ (24.2 mg, 30.8 μmol, 1940:1 monomer:catalyst ratio) in o-dichlorobenzene (0.5 mL) was added. After a reaction period of 3 hours at room temperature, removal and workup of a small aliquot of solution gave 0.79 g (13%) of polymer 6-U as a white solid. The IR and NMR spectra and end groups of the polymer are similar to material 1-U. DSC $T_m$: onset 24.1° C., max 55.8° C., $\Delta H_f$ 91.2 J/g (broad). GPC (DRI, 45° C. in THF vs. polystyrene): $M_w$ 109,000; $M_n$ 186,000; $M_w/M_n$ 1.7. GPC-LS (2-angle, 45° C. in THF vs. polystyrene): $M_w$ 100,000; $M_n$ 150,000; $M_w/M_n$ 1.5.

Example 13

Synthesis of Polymer 6

After removal of the aliquot containing 6-U in Example 12, the remainder of the polymerization solution was quenched by addition of 0.5 mL ethyl vinyl ether and 0.1 mL pyridine, and diluted with 100 mL of o-dichlorobenzene while stirring. A color change from pale orange to bright yellow occurred over several minutes. The solution was then precipitated into 700 mL methanol in a blender, the polymer was crushed by blending, and the white polymer was collected by filtration, washed twice in 300 mL clean methanol, and dried overnight under high vacuum at room temperature. The polymer was then combined with 60 g (0.32 mol) p-toluenesulfonyl hydrazide ($TsNHNH_2$) in a large (3 L) round bottom flask fitted with a reflux condenser and stirbar. Xylenes were added in sufficient quantity to make a 2–6% (w/v) polymer solution based on theoretical yield of polymer. This mixture was then degassed by three freeze-pump-thaw cycles and the contents were stirred for 4 hours at reflux while stirring. The hot mixture was then slowly poured into excess MeOH ($\geq$10× by volume). The solid white polymer 6 was collected by filtration, washed twice with 300 mL boiling methanol, and dried under high vacuum overnight at room temperature (5.01 g, 75.2%). The IR and NMR spectra and end groups for the polymer are similar to material 1. In addition to the main polymer, a small oligomeric tail was observed at $M_w$ 9,090; $M_n$ 2,640; $M_w/M_n$ 3.4. For this polymer, e and f are derived from cyclooct-4-en-1-ol and equal 3 and 4, respectively; d derives from cyclooctene and equals 8. The run length distribution is therefore:

$r_{HH}=(3+3)+8z;$ $r_{HT}=(3+4)+8z;$ and $r_{TT}=(4+4)+8z;$ therefore $r_{total}=(6+8z), (7+8z), (8+8z).$

Example 14

Synthesis of Polymer 7-U

Following the procedure described in Example 2, cyclooctene (6.52 g corrected for purity, 59.2 mmol) was mixed with cyclooct-4-en-1-ol (1.84 g, 14.6 mmol) to form a solution, which was added to 100 mL o-dichlorobenzene. A solution of $RuCl_2(PCy_3)(SIMes)CHCH_3$ (14.4 mg, 18.3 μmol, 4030:1 monomer:catalyst) in o-dichlorobenzene (0.5 mL) was added. After a reaction period of 2 hours at room temperature, removal and workup of a small aliquot of solution gave 1.33 g (16%) of polymer 7-U as a white solid. DSC $T_c$: max 47.3° C. The end groups $R_2$ and $R_3$ are H or $CH_3$.

Example 15

Synthesis of Polymer 7

After removal of the aliquot containing 7-U in Example 14, the remainder of the polymerization solution was hydrogenated following the procedure given in Example 13 to give 4.302 g (51.4%) of polymer 7. The IR and NMR spectra of the polymer were similar to material 1 except that ketone resonances were present only in trace quantities (<0.01 mol %). In addition to the main polymer, a small oligomeric tail was observed at $M_w$ 3,170; $M_n$ 1,540; $M_w/M_n$ 2.1. The end groups and run length distribution of the polymer are identical to that for material 6.

Example 16

Synthesis of Polymer 8-U

Following the procedure described in Example 2, cyclooctene (5.71 g corrected for purity, 51.8 mmol) was mixed with cyclooct-4-en-1-ol (2.00 g, 15.8 mmol) to form a solution, which was added to 50.5 mL o-dichlorobenzene. A solution of $RuCl_2(PCy_3)(SIMes)CHCH_3$ (13.2 mg, 16.8 μmol, 4020:1 monomer:catalyst) in o-dichlorobenzene (0.5 mL) was added. After a reaction period of 4 hours at room temperature, removal and workup of a small aliquot of solution gave 0.01 g (0.1%) of polymer 8-U as a white solid. The end groups $R_2$ and $R_3$ are H or $CH_3$.

Example 17

Synthesis of Polymer 8

After removal of the aliquot containing 8-U in Example 16, the remainder of the polymerization solution was hydrogenated following the procedure given in Example 13 to give 3.18 g (41%) of polymer 8. The IR and NMR spectra of the polymer were similar to material 1. In addition to the main polymer, a small oligomeric tail was observed at $M_w$ 7,220; $M_n$ 2,440; $M_w/M_n$ 3.0. The end groups and run length distribution of the polymer are identical to that for material 6.

Example 18

Synthesis of Polymer 9-U

Following the procedure described in Example 2, cyclooctene (20.18 g of 95% purity material, 174 mmol) was mixed with cyclooct-4-enyl acetate (2.67 g, 15.9 mmol) to form a solution, of which a 15 mL (12.9 g) portion was taken for polymerization and added to 100 mL o-dichlorobenzene. A solution of $RuCl_2(PCy_3)(SIMes)CHCH_3$ (33.7 mg, 42.8 µmol, 2620:1 monomer:catalyst) in o-dichlorobenzene (0.5 mL) was added. After a reaction period of 2 hours at 60° C., removal and workup of a small aliquot of solution gave 1.15 g (9%) of polymer 9-U as a white solid. IR (film on NaCl): 3004, 2925, 2853, 1741 (C=O group of acetate), 1467, 1439, 1367, 1151, 967, 849, 724 $cm^{-1}$. $^1H$ NMR (300 MHz, benzene-$d_6$): δ5.2–5.8 (CH=CH, cis and trans), 5.0–5.2 (b, $CHO_2CCH_3$), 1.9–2.5 ($CH_2CH=CH$), 1.8–1.9 (s, $O_2CCH_3$), 0.9–2.0 (m, $CH_2$) ppm. $^{13}C$ NMR (75 MHz, ODCB-$d_4$): δ171.0 (C=O group of acetate), 131.1 (with other peaks, CH=CH trans), 130.6 (with other peaks, CH=CH cis), 73.8 (with other peaks, $CHO_2CCH_3$), 35.0 and 34.5 ($CH_2CHO_2CCH_3$), 33.5–29.4 (many peaks including allylic), 28.1 (with other peaks, $CH_2CH_2CHO_2CCH_3$), 21.3 ($O_2CCH_3$) ppm. Cis: trans=~1:4 ($^{13}C$ NMR). The composition of the polymer ($^1H$ NMR) on a vinyl basis, ignoring the presence of olefin units, was 2.6 mol % vinyl acetate and 97.4 mol % ethylene. DSC $T_m$: onset 5.1° C., max 53.2° C., $\Delta H_f$ 21.3 J/g (broad). GPC (DRI, 45° C. in THF vs. polystyrene): $M_w$ 293,900; $M_n$ 154,700; $M_w/M_n$ 1.9. GPC-LS (2-angle, 45° C. in THF vs. polystyrene): $M_w$ 132,100; $M_n$ 82,600; $M_w/M_n$ 1.6. The end groups $R_2$ and $R_3$ are H or $CH_3$.

Example 19

Synthesis of Polymer 9

After removal of the aliquot containing 9-U in Example 18, the remainder of the polymerization solution was hydrogenated following the procedure given in Example 3 to give 8.75 g (69%) of polymer 9. IR (film on NaCl): 2918, 2850, 1741 (C=O), 1473, 1463, 1370, 1241 1020, 730, 720 $cm^{-1}$. $^1H$ NMR (500 MHz, ODCB-$d_4$, 120° C.): δ 4.7–5.3 (b, $CHO_2CCH_3$), 1.90–2.06 (s, $O_2CCH_3$), 0.95–1.75 (m, $CH_2$) ppm. $^{13}C$ NMR (75 MHz, TCE-$d_2$, Cr(acac)$_3$ (15 mg/mL), 120° C.): δ 170.7 (C=O), 34.6 ($CH_2CHO_2CCH_3$), 30.0 ($CH_2$), 25.7 ($CH_2CH_2CHO_2CCH_3$), 21.4 ($O_2CCH_3$) ppm ($CHO_2CCH_3$ hidden under solvent peak at 74.8–74.1 ppm). No alkyl branching was observed. In addition to the main polymer, a small oligomeric tail was observed at $M_w$ 2,270; $M_n$ 1,100; $M_w/M_n$ 2.1. The end groups $R_2$ and $R_3$ are H or $CH_3$.

Example 20

Synthesis of Polymer 10

Following the procedure described in Example 2, cyclooctene (17.36 g of 95% purity material, 150 mmol) was mixed with cyclooct-4-enyl acetate (5.05 g, 30.0 mmol) to form a solution, of which a 15 mL portion (12.9 g) was taken for polymerization and added to 100 mL o-dichlorobenzene. A solution of $RuCl_2(PCy_3)(SIMes)CHCH_3$ (37 mg, 47 µmol, 2300:1 monomer:catalyst) in o-dichlorobenzene (1.0 mL) was added. After a reaction period of 20 minutes at 60° C., the entire solution was hydrogenated following the procedure given in Example 3 to give 8.99 g (70%) of polymer 10. The IR and NMR spectra and end groups for the polymer are similar to material 9. In addition to the main polymer, a small oligomeric tail was observed at $M_w$ 2,380; $M_n$ 1,150; $M_w/M_n$ 2.1.

Example 21

Synthesis of Polymer 11

Following the procedure described in Example 2, cyclooctene (13.98 g of 95% purity material, 121 mmol) was mixed with cyclooct-4-enyl acetate (6.42 g, 38.2 mmol) to form a solution, of which a 15 mL portion (~12.9 g) was taken for polymerization and added to 100 mL o-dichlorobenzene. A solution of $RuCl_2(PCy_3)(SIMes)CHCH_3$ (36 mg, 45 µmol, 2300:1 monomer:catalyst) in o-dichlorobenzene (1.0 mL) was added. After a reaction period of 20 minutes at 60° C., the entire solution was hydrogenated following the procedure given in Example 3 to give 7.08 g (55%) of polymer 11. The IR and NMR spectra and end groups for the polymer are similar to material 9. In addition to the main polymer, a small oligomeric tail was observed at $M_w$ 2,250; $M_n$ 1,310; $M_w/M_n$ 1.7.

Example 22

Synthesis of t-butyl cyclooct-4-ene Carboxylate

A glass sleeve for a 450 mL stainless steel, mechanically stirred Parr reactor was charged with $PdCl_2$ (0.85 g, 4.8 mmol), $PPh_3$ (5.03 g, 19.2 mmol), toluene (55 mL, reagent grade), cyclooctadiene (100 g, 92 mmol), and t-butanol (55 mL), and the reactor was assembled and sealed. The reactor was then pressurized with carbon monoxide (600 psi), stirred, and the pressure released. This procedure was repeated three times to purge the system of oxygen. The reactor was then heated to 90° C. and stirred overnight. The reactor was then repressurized with carbon monoxide and allowed to react for an additional 24 hours. The reactor was vented, the glass sleeve was removed, and solvent was removed from the reaction mixture under vacuum. The residual liquid was filtered through a plug of silica and chromatographed on silica (1:4 ethyl acetate:pentane) to give t-butyl cyclooct-4-ene carboxylate as a clear liquid (96 g, 45%). $^1H$ NMR (500 MHz, benzene-$d_6$): δ 5.5–5.6 (m, 2H), 2.37–2.44 (m, 1H), 2.10–2.24 (m, 2H), 1.80–2.00 (m, 4H), 1.59–1.68 (m, 1H), 1.48–1.57 (m, 2H), 1.38 (s, 9H), 1.19–1.29 (m, 1H) ppm. $^{13}C$ NMR (75 MHz, benzene-$d_6$): δ 176.8, 130.9, 130.3, 79.4, 45.0, 32.6, 30.2, 28.5, 28.5, 26.5, 24.9 ppm. IR (film on NaCl): 3015, 2977, 2931, 2859, 1727, 1469, 1452, 1392, 1367, 1351, 1332, 1310, 1279, 1257, 1235, 1204, 1151, 1121, 1019, 1007, 848, 740, 710 $cm^{-1}$. HRMS-EI: Theoretical: 210.1620; Found: 210.1615. Analysis calculated for $C_{13}H_{22}O_2$: C, 74.24; H, 10.54. Found: C, 74.45; H, 11.05.

Example 23

Synthesis of Polymer 12

Following the procedure described in Example 2, cyclooctene (19.15 g of 95% purity material, 165 mmol) was mixed with t-butyl cyclooct-4-ene carboxylate (2.93 g, 14.3 mmol) to form a solution, of which a 15 mL (12.7 g) portion was taken for polymerization and added to 100 mL o-dichlorobenzene. A solution of $RuCl_2(PCy_3)(SIMes)CHCH_3$ (37 mg, 47 µmol, 2300:1 monomer:catalyst) in o-dichlorobenzene (1.0 mL) was added. After a reaction period of 2 hours at 60° C., the entire solution was hydrogenated following the procedure given in Example 3 to give 7.92 g (62%) of polymer 12. IR (film on NaCl): 2918, 2850, 1729 (C=O), 1473, 1463, 1366, 1150, 730, 720 cm$^{-1}$. $^1$H NMR (500 MHz, ODCB-d$_4$, 120° C.): δ 2.2–2.5 (b, CHCO$_2$C(CH$_3$)$_3$), 0.95–1.9 (m, CH$_2$), 1.47 (s C(CH$_3$)$_3$) ppm. $^{13}$C NMR (125 MHz, TCE-d$_2$, Cr(acac)$_3$ (15 mg/mL), 120° C.): δ 175.8 (C=O), 79.9 (CO$_2$C(CH$_3$)$_3$), 47.0 (CHCO$_2$C(CH$_3$)$_3$), 32.9 (CH$_2$CHCO$_2$C(CH$_3$)$_3$), 30.0 (CH$_2$), 28.7 (C(CH$_3$)$_3$), 27.7 (CH$_2$CH$_2$CHCO$_2$C(CH$_3$)$_3$) ppm. No alkyl branching was observed. In addition to the main polymer, a small oligomeric tail was observed at M$_w$ 2,450; M$_n$ 1,150; M$_w$/M$_n$ 2.1. The end groups R$_2$ and R$_3$ are H or CH$_3$.

Example 24

Synthesis of Polymer 13

Following the procedure described in Example 2, cyclooctene (17.54 g of 95% purity material, 16.66 g, 151 mmol) was mixed with t-butyl cyclooct-4-ene carboxylate (6.37 g, 30.3 mmol) to form a solution, of which a 15 mL (12.3 g) portion was taken for polymerization and added to 100 mL o-dichlorobenzene. A solution of RuCl$_2$(PCy$_3$) (SIMes)CHCH$_3$ (36 mg, 45 µmol, 2200:1 monomer:catalyst) in o-dichlorobenzene (1.0 mL) was added. After a reaction period of 20 minutes at 60° C., the entire solution was hydrogenated following the procedure given in Example 3 to give 7.09 g (57.6%) of polymer 13. The IR and NMR spectra and end groups for the polymer are similar to material 12. In addition to the main polymer, a small oligomeric component was observed at M$_w$ 2,250; M$_n$ 1,170; M$_w$/M$_n$ 1.9.

Example 25

Synthesis of Polymer 14-U

Following the procedure described in Example 2, cyclooctene (16.07 g of 95% purity material, 138.6 mmol) was mixed with t-butyl cyclooct-4-ene carboxylate (9.48 g, 45.1 mmol) to form a solution, of which a 16 mL (14.27 g) portion was taken for polymerization and added to 100 mL o-dichlorobenzene. A solution of RuCl$_2$(PCy$_3$)(SIMes)CHCH$_3$ (33.7 mg, 42.8 µmol, 2500:1 monomer:catalyst) in o-dichlorobenzene (1.0 mL) was added. After a reaction period of 2 hours at 60° C., removal and workup of a small aliquot of solution gave 1.43 g (10%) of polymer 14-U as a white solid. IR (film on NaCl): 3004, 2977, 2925, 2853, 1729 (C=O), 1455, 1367, 1148, 967, 849, 724 cm$^{-1}$. $^1$H NMR (300 MHz, benzene-d$_6$): δ 5.3–5.6 (b, CH=CH, cis and trans), 2.3–2.5 (b, CHCO$_2$C(CH$_3$)$_3$), 1.9–2.3 (b, CH$_2$CH=CH), 1.2–2.0 (m, CH$_2$), 1.4 (s, C(CH$_3$)$_3$) ppm. $^{13}$C NMR (75 MHz, ODCB-d$_4$): δ 184.0 (C=O), 130.9 (with other peaks, CH=CH trans), 130.2 (with other peaks, CH=CH cis), 79.7 (CO$_2$C(CH$_3$)$_3$), 46.3 (with other peaks, CHCO$_2$C(CH$_3$)$_3$), 33.4 (with other peaks, CH$_2$CHCO$_2$C (CH$_3$)$_3$), 29.0–31.0 (CH$_2$ including allylic), 28.0 (with other peaks, CH$_2$CH$_2$CHCO$_2$C(CH$_3$)$_3$) ppm. Cis: trans=~1:4 ($^{13}$C NMR). The composition of the polymer ($^1$H NMR) on a vinyl basis, ignoring the presence of olefin units, was 6.7 mol % t-butyl acrylate and 93.3 mol % ethylene. DSC T$_m$: onset −55.2° C., max −1.5° C., ΔH$_f$ 27.3 J/g; T$_g$ −70.0° C. (midpoint). GPC (DRI, 45° C. in THF vs. polystyrene): M$_w$ 195,000; M$_n$ 51,200; M$_w$/M$_n$ 3.8. GPC-LS (2-angle, 45° C. in THF vs. polystyrene): M$_w$ 84,000; M$_n$ 35,000; M$_w$/M$_n$ 2.4. The end groups R$_2$ and R$_3$ are H or CH$_3$.

Example 26

Synthesis of Polymer 14

After removal of the aliquot containing 14-U in Example 25, the remainder of the polymerization solution was hydrogenated following the procedure given in Example 3 to give 5.01 g (35%) of polymer 14. The IR and NMR spectra and end groups for the polymer are similar to material 12. In addition to the main polymer, a small oligomeric component was observed at M$_w$ 2,460; M$_n$ 1,420; M$_w$/M$_n$ 1.7.

Example 27

Synthesis of Methyl cyclooct-4-ene carboxylate/methyl cyclooct-3-ene carboxylate/methyl cyclooct-2-ene Carboxylate Isomer Mixture Using the procedure described in Example 22, methanol (substituted for t-butanol in equivalent molar amount) was reacted with cyclooctadiene and carbon monoxide for 4 hours in the presence of PdCl$_2$ and PPh$_3$ using toluene as a solvent (McLain, S. J., et al., *Polym. Mat. Sci. Eng.*, 1997, 76, 246). Uptake of CO was observed to be more rapid than in Example 22; the reactor was recharged to 600 psig with CO when pressure dropped below 300 psi. The crude material was passed through a plug of silica and fractionally distilled at 20 torr. Unreacted cyclooctadiene was collected at 30–40° C., followed by the desired cyclooctene methyl ester product at 105–108° C. (36.7 g, 23.6%) (clear colorless liquid). The collected product was found to be a mixture of 63.3 mol % methyl cyclooct-4-ene carboxylate, 34.5 mol % methyl cyclooct-3-ene carboxylate, and 2.2 mol % methyl cyclooct-2-ene carboxylate by $^1$H NMR. $^1$H NMR (300 MHz, CDCl$_3$): δ 5.6–5.8 (m, 2H), 3.70, 3.67, 3.65 (2-, 3-, and 4-ene isomers, respectively, 3H in 1:15.4:28.3 ratio), 2.29–2.56, (m, 2H), 1.95–2.29 (m, 3H), 1.32–1.95 (m, 6H) ppm. $^{13}$C NMR (75 MHz, CDCl$_3$): δ 178.0, 176.2, 132.0, 130.4, 129.4, 127.3, 51.5, 51.4, 44.9, 43.1, 31.5, 29.4, 29.1, 28.1, 27.8, 27.1, 25.8, 24.4, 24.0 ppm. IR (film on NaCl): 3017, 2932, 2859, 1736, 1467, 1449, 1392, 1334, 1165, 747, 714 cm$^{-1}$. Analysis calculated for C$_{10}$H$_{16}$O$_2$: C, 71.39; H, 9.59. Found: C, 71.36; H, 9.64. HRMS-FAB: Theoretical: 168.1150; Found: 168.1151.

Example 28

Synthesis of Polymer 15-U

Following the procedure described in Example 2, cyclooctene (19.15 g of 95% purity material, 165 mmol) was mixed with the methyl cyclooctene carboxylate isomer mixture prepared in Example 27 (2.41 g, 14.3 mmol) to form a solution, of which a 10 mL (8.58 g) portion was taken for polymerization and added to 90 mL o-dichlorobenzene. A solution of RuCl$_2$(PCy$_3$)(SIMes)CHCH$_3$ (25 mg, 32 µmol, 2200:1 monomer:catalyst) in o-dichlorobenzene (1.0 mL) was added. After a reaction period of 2 hours at 60° C., removal and workup of a small aliquot of solution gave 1.43 g (17%) of polymer 15-U as a white powder. IR (film on NaCl): 3001, 2988, 2924, 2853, 1739 (C=O), 1461, 1456, 1160, 1164, 966, 724 cm$^{-1}$. $^1$H NMR (300 MHz, benzene-d$_6$): δ 5.3–5.7 (b, CH=CH, cis and trans), 3.3–3.5 (several s, CO$_2$CH$_3$), 2.3–2.6 (b, CHCO$_2$Me), 1.9–2.3 (b, CH$_2$CH=CH), 1.2–2.3 (m, CH$_2$) ppm. $^{13}$C NMR (75 MHz, ODCB-d$_4$): δ 175.9 (C=O), 130.5 (with other peaks, CH=CH trans), 130.0 (with other peaks, CH=CH cis), 50.7

($CO_2CH_3$), 45.0 and 46.0 ($CHCO_2CH_3$), 32.9 (with other peaks, $CH_2CHCO_2CH_3$), 29.0–31.0 (many peaks, $CH_2$ including allylic), 27.5 (with other peaks, $CH_2CH_2CHCO_2CH_3$) ppm. Cis: trans=~1:4 ($^{13}CNMR$). The composition of the polymer ($^1H$ NMR) on a vinyl basis, ignoring the presence of olefin units, was 2.0 mol % methyl acrylate and 98.0 mol % ethylene. DSC $T_m$: onset 5.2° C., max 44.9° C., $\Delta H_f$ 67.3 J/g; $T_g$: −78.2° C. (midpoint). GPC (DRI, 45° C. in THF vs. polystyrene): $M_w$ 248,600; $M_n$ 108,100; $M_w/M_n$ 2.3. GPC-LS (2-angle, 45° C. in THF vs. polystyrene): $M_w$ 97,920; $M_n$ 61,200; $M_w/M_n$ 1.6. The end groups $R_2$ and $R_3$ are H or $CH_3$. Model NMR kinetic measurements (45° C.) indicate that methyl cyclooct-4-ene carboxylate is incorporated into the product polymer at a rate greater than methyl cyclooct-3-ene carboxylate, and that methyl cyclooct-2-ene carboxylate is not incorporated.

Example 29

Synthesis of Polymer 15

After removal of the aliquot containing 15-U in Example 28, the remainder of the polymerization solution was hydrogenated following the procedure given in Example 3 to give 5.55 g (64.7%) of polymer 15. IR (film on NaCl): 2918, 2850, 1738 (C=O), 1473, 1463, 1194, 1164, 730, 720 cm$^{-1}$. $^1H$ NMR (500 MHz, ODCB-$d_4$, 120° C.): δ 3.5–3.9 (s, $CO_2CH_3$), 2.3–2.5 (m, $CHCO_2Me$), 1.6–1.8 and 1.4–1.6 (m, $CH_2CHCO_2Me$), 1.5–1.1 (m, $CH_2$) ppm. $^{13}C$ NMR (75 MHz, ODCB-$d_4$, Cr(acac)$_3$ (15 mg/mL), 120° C.): δ 177.0 (C=O), 50.7 ($CO_2CH_3$), 45.9 ($CHCO_2CH_3$), 32.6 ($CH_2CHCO_2CH_3$), 27.7 ($CH_2CH_2CHCO_2CH_3$), 29.9 ($CH_2$) ppm. No alkyl branching was observed. In addition to the main polymer, a small oligomeric component was observed at $M_w$ 2,440; $M_n$ 1,040; $M_w/M_n$ 2.4. The end groups $R_2$ and $R_3$ are H or $CH_3$.

Example 30

Synthesis of Polymer 16-U

Following the procedure described in Example 2, cyclooctene (16.31 g of 95% purity material, 140.6 mmol) was mixed with the methyl cyclooctene carboxylate isomer mixture prepared in Example 27 (4.51 g, 26.8 mmol) to form a solution, of which a 15.0 mL (13.3 g) portion was taken for polymerization and added to 130 mL o-dichlorobenzene. A solution of RuCl$_2$(PCy$_3$)(SIMes)CHCH$_3$ (37 mg, 47 μmol, 2300:1 monomer:catalyst) in o-dichlorobenzene (1.0 mL) was added. After a reaction period of 2 hours at 60° C., removal and workup of a small aliquot of solution gave 0.74 g (5.6%) of polymer 16-U as a white solid. The end groups $R_2$ and $R_3$ are H or $CH_3$.

Example 31

Synthesis of Polymer 16

After removal of the aliquot containing 16-U in Example 30, the remainder of the polymerization solution was hydrogenated following the procedure given in Example 3 to give 8.54 g (64.3%) of polymer 16. The IR and NMR spectra and end groups for the polymer are similar to material 15. In addition to the main polymer, a small oligomeric component was observed at $M_w$ 2,210; $M_n$ 1,040; $M_w/M_n$ 2.1.

Example 32

Synthesis of Polymer 17-U

Following the procedure described in Example 2, cyclooctene (15.3 g of 95% purity material, 139 mmol) was mixed with the methyl cyclooctene carboxylate isomer mixture prepared in Example 27 (7.53 g, 43.7 mmol) to form a solution, of which a 15 mL (13.6 g) portion was taken for polymerization and added to 110 mL o-dichlorobenzene. A solution of RuCl$_2$(PCy$_3$)(SIMes)CHCH$_3$ (34 mg, 43 μmol, 2500:1 monomer:catalyst) in o-dichlorobenzene (1.0 mL) was added. After a reaction period of 2 hours at 60° C., removal and workup of a small aliquot of solution gave 1.66 g (12.2%) of polymer 17-U as a white solid. The composition of the polymer ($^1H$ NMR) on a vinyl basis, ignoring the presence of olefin units, was 6.2 mol % methyl acrylate and 93.8 mol % ethylene. GPC-LS (2-angle, 45° C. in THF vs. polystyrene): $M_w$ 140,300; $M_n$ 61,000; $M_w/M_n$ 2.3. The end groups $R_2$ and $R_3$ are H or $CH_3$.

Example 33

Synthesis of Polymer 17

After removal of the aliquot containing 17-U in Example 32, the remainder of the polymerization solution was hydrogenated following the procedure given in Example 3 to give 7.90 g (58.3%) of polymer 17. The IR and NMR spectra and end groups for the polymer are similar to material 15. In addition to the main polymer, a small oligomeric component was observed at $M_w$ 2,150; $M_n$ 1,060; $M_w/M_n$ 2.0.

Example 34

Synthesis of Methyl cyclooct-4-ene Carboxylate

A 50 mL, 3-neck round bottom flask was charged with cyclooct-4-ene carboxylic acid (0.517 g, 3.35 mmol, prepared as described below in Example 35) and 30 mL reagent-grade acetone and vigorously stirred for several minutes. K$_2$CO$_3$ (1.15 g, 8.32 mmol) was then added, followed by an excess of methyl iodide (4 mL). A reflux condenser (water temperature 5° C.) was then fitted to the flask and the reaction was gently refluxed overnight. The mixture was filtered, the filtrate was concentrated using a rotary evaporator, and the residue was purified by flash chromatography on silica (1:9 ethyl acetate:hexanes mobile phase) to give methyl cyclooct-4-ene carboxylate as a single isomer (0.560 g, 99%). A copolymer of methyl cyclooct-4-ene carboxylate and cyclooctene, prepared similarly to polymer 15 at room temperature, would have the following features: The end groups $R_2$ and $R_3$ would be H or $CH_3$. For this polymer, e and f would be derived from methyl cyclooct-4-ene carboxylate and would equal 3 and 4, respectively; d would derive from cyclooctene and would equal 8. The run lengths would therefore be:

$r_{HH}=(3+3)+8z;$ $r_{HT}=(3+4)+8z;$ and $r_{TT}=(4+4)+8z;$ therefore $r_{total}=(6+8z), (7+8z), (8+8z).$

Example 35

Synthesis of cyclooct-4-ene Carboxylic Acid

A 100 mL round bottom flask was charged with t-butyl cyclooct-4-ene carboxylate (1.0 g, 4.8 mmol) and trifluoroacetic acid (2 mL) and stirred at room temperature for two days. A 4:1 ethanol:water mixture (10 mL) was then added and the pH of the resulting mixture was adjusted to ~4.0 with aqueous saturated $NaHCO_3$. The mixture was then extracted with 4×25 mL portions of ethyl ether and the ether phases were combined and concentrated. The liquid was then purified by flash chromatography on silica (3:7 ethyl acetate: hexanes mobile phase) to afford cyclooct-4-ene carboxylic acid (0.051 g, 69%). The material was crudely dried immediately before polymerization by dissolving the material in benzene and carrying out azeotropic distillation using a rotary evaporator (three cycles). IR (film on NaCl): 3017, 2932, 2859, 1736 (C=O), 1467, 1449, 1392, 1334, 1165, 747, 714 cm$^{-1}$ (O—H stretch not assigned due to weakness). $^1$H NMR (300 MHz, $CDCl_3$): δ 11.6 (br, 1H), 5.6–5.8 (m, 2H), 2.30–2.54, (m, 2H), 2.02–2.24 (m, 4H), 1.84–1.96 (m, 1H), 1.50–1.82 (m, 3H), 1.32–1.48 (m, 1H). $^{13}$C NMR (75 MHz, $CDCl_3$): δ 184.34, 130.45, 129.34, 43.10, 31.28, 29.10, 27.65, 25.75, 23.92 ppm. HRMS-FAB for $C_8H_{14}O_2$: Theoretical: 126.1045; Found: 126.1048.

Example 36

Synthesis of Polymer 18-U

Following the procedure described in Example 2, cyclooctene (5.317 g of 95% purity material, 45.8 mmol) was mixed with cyclooct-4-ene carboxylic acid (0.647 g, 4.20 mmol) to form a solution, to which 55 mL o-dichlorobenzene was added. A solution of $RuCl_2(PCy_3)(SIMes)CHCH_3$ (19.7 mg, 0.0249 mmol, 2010:1 monomer:catalyst) in o-dichlorobenzene (1.0 mL) was added. After a reaction period of 2 hours at 60° C., removal and workup of a small aliquot of solution gave 0.12 g (2%) of polymer 18-U as a white solid. IR (film on NaCl): 2925, 2850, 1701 (C=O), 1468, 1458, 1258, 1068, 967, 715 cm$^{-1}$ (O—H stretch not assigned due to weakness). $^1$H NMR (300 MHz, ODCB-$d_4$): δ 5.3–5.6 (b, CH=CH, cis and trans), 2.3–2.6 (b, $CHCO_2H$), 1.9–2.3 (b, $CH_2CH=CH$), 1.2–1.9 (m, $CH_2$) ppm (OH peak not observed). $^{13}$C NMR (75 MHz, ODCB-$d_4$): δ 184.0 (C=O), 130.9 (with other peaks, CH=CH trans), 130.5 (with other peaks, CH=CH cis), 45.6 ($CHCO_2H$), 33.4 (with other peaks, $CH_2CHCO_2H$), 29.0–31.0 (many peaks, $CH_2$ including allylic), 28.0 (with other peaks, $CH_2CH_2CHCO_2H$) ppm. Cis: trans=~1:4 ($^{13}$C NMR). DSC $T_m$: max 51.0° C. The end groups $R_2$ and $R_3$ are H or $CH_3$.

Example 37

Synthesis of Polymer 18

After removal of the aliquot containing 18-U in Example 36, the remainder of the polymerization solution was hydrogenated following the procedure given in Example 3 to give 2.45 g (43%) of polymer 18. IR (film on NaCl): 2918, 2850, 1706 (C=O), 1473, 1463, 1370, 1241 1020, 730, 720 cm$^{-1}$ (O—H stretch not assigned due to weakness). $^1$H NMR (500 MHz, 1,2-ODCB-$d_4$, 120° C.): δ 3.6 (b, CHOH), 2.4–2.6 (b, $CHCO_2H$), 2.2–2.4 (t, $CH_2C$=O), 1.05–2.0 (m, $CH_2$) ppm. $^{13}$C NMR (75 MHz, TCE-$d_2$, 120° C.): δ 170.7 (C=O), 72.4 (CHOH, if present), 45.2 ($CHCO_2H$), 43.1 ($CH_2C$=O), 38.1 ($CH_2CHOH$), 32.6 ($CH_2CHCO_2H$), 30.0 ($CH_2$), 27.7 ($CH_2CH_2CHCO_2H$), 26.0 ($CH_2CH_2CHOH$), 24.4 ($CH_2CH_2C$=O) ppm. No alkyl branching was observed. In addition to the main polymer, a tail was observed at $M_w$ 1,030; $M_n$ 840; $M_w/M_n$ 1.2 to form an overlapping bimodal distribution. The end groups $R_2$ and $R_3$ are H or $CH_3$.

Example 38

Synthesis of Polymer 19-U

Following the procedure described in Example 2, cyclooctene (5.60 g of 95% purity material, 48.3 mmol) was mixed with cyclooct-4-ene carboxylic acid (0.647 g, 4.20 mmol) to form a solution, which was added to 55 mL o-dichlorobenzene. A solution of $RuCl_2(PCy_3)(SIMes)CHCH_3$ (16.5 mg, 0.0209 mmol, 2500:1 monomer:catalyst) in o-dichlorobenzene (1.0 mL) was added. After a reaction period of 3 hours at room temperature, removal and workup of a small aliquot of solution gave 3.79 g (60.6%) of polymer 19-U as a white solid. DSC $T_m$: onset −38.4° C., max 8.9° C., $\Delta H_f$ 27.5 J/g; $T_g$ −61.9° C. (midpoint). The end groups $R_2$ and $R_3$ are H or $CH_3$.

Example 39

Synthesis of Polymer 19

Polymer 19-U was hydrogenated following the procedure given in Example 13 to give 3.78 g (60.5%) of polymer 19. The IR and NMR spectra of the polymer were similar to material 18 except that resonances for alcohol and ketone groups were not seen. In addition to the main polymer, a second portion (appearing as major component, probably due to low polymer solubility) was observed at $M_w$ 1,820; $M_n$ 850; $M_w/M_n$ 2.2 to form an overlapping bimodal distribution. The end groups $R_2$ and $R_3$ are H or $CH_3$. For this polymer, e and f are derived from cyclooct-4-ene carboxylic acid and equal 3 and 4, respectively; d derives from cyclooctene and equals 8. The run length distribution is therefore:

$$r_{HH}=(3+3)+8z;$$

$$r_{HT}=(3+4)+8z; \text{ and}$$

$$r_{TT}=(4+4)+8z; \text{ therefore}$$

$$r_{total}=(6+8z), (7+8z), (8+8z).$$

Example 40

Synthesis of Polymer 20-U

Following the procedure described in Example 2, cyclooctene (3.21 g of 95% purity material, 27.7 mmol) was mixed with cyclooct-4-ene carboxylic acid (1.35 g, 8.75 mmol) and added to 35 mL o-dichlorobenzene. A solution of $RuCl_2(PCy_3)(SIMes)CHCH_3$ (14.4 mg, 0.0183 mmol, 2000:1 monomer:catalyst) in o-dichlorobenzene (1.0 mL) added. After a reaction period of 2 hours at 60° C., removal and work-up of a small aliquot of solution gave 0.12 g (2.6%) of polymer 20-U as a white solid. The IR and NMR spectra and end groups for the polymer are similar to material 19-U.

Example 41

Synthesis of Polymer 20

After removal of the aliquot containing 20-U in Example 40, the remainder of the polymerization solution was hydrogenated following the procedure given in Example 3 to give 2.23 g (48.9%) of polymer 20. $^{13}$C NMR (solid state Bloch decay, 50 MHz): δ 183.8 (C=O), 47.9 and 44.9 (CHCO$_2$H), 33.3 and 30.9 (overlapping, CH$_2$), 14.8 (CH$_3$ end groups) ppm. The end groups R$_2$ and R$_3$ are H or CH$_3$.

Example 42

Synthesis of docosa-1,21-dien-11-ol

Magnesium turnings (2.32, 95.4 mmol, 1.1 eq) were added to a 500 mL three-neck round-bottom flask equipped with a Teflon™ stir bar, addition funnel, condenser, and an argon inlet. The apparatus was flame-dried under vacuum while stirring the magnesium turnings vigorously. 11-Bromo-1-undecene (18.8 mL, 85.8 mmol, 1 eq) was charged to the addition funnel. THF was added to both the addition funnel (55 mL) and the Mg turnings (5 mL), and the bromide was added dropwise over a 10 minute period. The mixture was vigorously stirred at a gentle reflux for 2 hours, cooled to room temperature, and transferred via cannula to a Schlenk tube containing a slurry of CeCl$_3$ (18.0 g, 73.0 mmol, 0.85 eq. based on titration of Grignard solution) in THF at 0° C. The CeCl$_3$ had been previously dried under vacuum overnight at 140° C., and was stirred at 0° C. in THF for 2 h prior to addition of the Grignard reagent. This mixture was stirred for 2.5 h, during which a yellow solution was formed. Undecylenic aldehyde (15.2 mL, 12.3 g, 73.0 mmol, 0.85 eq) was added, causing immediate loss of the yellow color. This solution was stirred for 2 hours, followed by addition of 200 mL 3N HCl. This mixture was stirred for 1 hour, then transferred to a separatory funnel containing 200 mL diethyl ether. The organic layer was washed with 2×50 mL 3N HCl, and volatiles were removed to give a white powder which was recrystallized twice from 100 mL hexanes at 0° C. to afford white, needle-like microcrystalline docosa-1,21-dien-11-ol (21.7 g, 85%). The compound may be alternately purified by reverse phase HPLC using ethyl acetate and methanol as mobile phase. $^1$H NMR (300 MHz, CDCl$_3$): δ 5.80 (m, 2H), 4.93 (m, 4H), 3.55 (br, 1H), 2.03 (q, 4H), 1.20–1.50 (m, 30H) ppm. $^{13}$C NMR (75 MHz, CDCl$_3$): δ 139.45, 139.43, 114.34, 114.32, 72.22, 37.72, 37.71, 34.04, 34.03, 29.93, 29.92, 29.84, 29.80, 29.78, 29.71, 29.67, 29.37, 29.35, 29.16, 29.15, 25.88 ppm. Analysis calculated for C$_{22}$H$_{42}$O: C, 81.92; H, 13.12. Found: C, 81.95; H, 13.26. HRMS-FAB: Theoretical: 323.3314; Found: 305.3208 [M−H$_2$O+H]$^+$.

Example 43

Synthesis of Polymer 21-U

Solid docosa-1,21-dien-11-ol (8.173 g, 25.3 mmol) was placed in a 50 mL Schlenk tube and degassed under high vacuum (~5×10 4 torr) overnight at 55° C. The tube was placed under argon, the temperature raised to 60° C. to melt the diene, and 5.84 g (42.2 mmol, 7.79 mL) 1,9-decadiene was added by syringe. The warm solution was shaken to mix the two liquid components. Separately, in the drybox, a 500 mL, 3-necked 24/40 round-bottom flask was charged with 74.7 mg (0.0908 mmol, 743:1 monomer:catalyst) RuCl$_2$(PCy$_3$)$_2$CHPh and fitted with two rubber septa and a vacuum adapter. The flask was placed under argon on a Schlenk line. The center joint septum was replaced with an oven-dried polished glass stirring shaft fitted with a semicircular Teflon™ blade (trimmed to fit the curvature of the flask) and a glass bearing. The stirring shaft was connected to an Arrow 350 high-torque, low-speed mechanical stirrer using a flexible connector, and stirring was initiated. The liquid diene mixture was added to the flask via cannula to give a purplish-brown solution, and the contents of the flask were heated to 68–70° C. using an oil bath. After three hours under argon, the polymerization was placed under dynamic high vacuum, and outgassing of ethylene was observed. The polymerization was stirred at 68–70° C. for a total of 11 days under dynamic vacuum during the day and under argon at night. Subsequently, the viscous purple-brown mixture was cooled to room temperature and exposed to air. Ethyl vinyl ether (10 ml) was added to deactivate the Ru catalyst, followed by a 10 minute stirring period, after which the mixture was once again subjected to vacuum to remove the ethyl vinyl ether. The mixture was opened to air and cooled to 0° C. in an ice bath to encourage solidification of the polymer. Toluene (100 mL) was added, and the mixture was stirred over night at room temperature to dissolve the polymer. Subsequently, ~2 g of 150 mesh neutral alumina was added to the polymer solution to absorb residual catalyst, and the solution was filtered. After concentration of the filtrate using a rotary evaporator, an excess of 1 N HCl in MeOH was added to precipitate polymer 21-U, which was collected by filtration as an off-white powder and dried in a vacuum oven overnight at 60° C. (9.826 g, 81%). IR (NaCl film): 3333 (br, O—H), 3007 (w), 2920 (vs), 2850 (s), 1465 (m), 1436 (w), 1367 (vw), 1350 (w), 1122 (w), 1070 (w), 1022 (w), 964 (m), 892 (vw), 861 (vw), 722 (w) cm$^{-1}$. The NMR spectra of the polymer were similar to material 1-U. The composition of the polymer ($^1$H NMR) on a vinyl basis ignoring the presence of olefin units, was 6.1 mol % vinyl alcohol and 93.9 mol % ethylene. T$_m$: three broad transitions; onset 33.5° C., max 41.4° C., 57.6° C., and 68.7° C.; ΔH$_f$ 81.4 J/g. GPC (DRI, 135° C. in 1,2,4-trichlorobenzene vs. polyethylene): M$_w$ 2,256; M$_n$ 1,210; M$_w$/M$_n$ 1.9 (small low-M$_n$ shoulder). GPC (DRI, 25° C. in THF vs. polystyrene): M$_w$ 6,820; M$_n$ 3,820; M$_w$/M$_n$ 1.8. GPC-LS (135° C. in 1,2,4-trichlorobenzene, EVAC parameters): M$_w$ 2,520; M$_n$ 2,280; M$_w$/M$_n$ 1.1. The end groups R$_2$ and R$_3$ are both H.

Example 44

Synthesis of Polymer 21

Polymer 21-U (9.0 g, 50.2 mmol olefin groups) was placed in a 300 mL glass Parr reactor liner with 150 mL xylenes. A stirbar was added, and the liner was placed in an oil bath and heated to 120° C. to dissolve the polymer. Subsequently, 60.0 mg (64.8 μmol) Wilkinson's catalyst, (Ph$_3$P)$_3$RhCl, was added to the liner as a solid. The stirbar was removed and the glass liner was placed in a 300 cc Hasteloy C Parr reactor which was sealed, heated to 120° C. using a heating mantle, and pressurized to a constant 500 psig H$_2$. The contents of the reactor were mechanically stirred under these conditions for 7 days, after which the reactor was vented to room temperature and cooled. The glass liner was removed, a stirbar was added, the liner was reheated to 120° C. in an oil bath to re-dissolve the polymer, and its contents were added to 1 L of acidified methanol (1N HCl) at 40° C. BHT was not added. The precipitated polymer was collected by filtration and reprecipitated from 120° C. xylenes into 40° C. acidified methanol. Polymer 21 was collected by filtration, rinsed with clean methanol, and dried in a vacuum oven overnight at 40° C. (fine white powder, 8.0 g, 88%, theo. yield 9.10 g). The IR and NMR spectra of the polymer were similar to material 1, except that polymer end groups were visible in the $^1$H NMR spectrum at 0.84–0.92 (t, CH$_3$) ppm and in the $^{13}$C NMR spectrum at 32.2 (CH$_2$CH$_2$CH$_3$), 22.9 (CH$_2$CH$_3$), and 14.1 (CH$_3$) ppm. No alkyl branching was observed. The end groups R$_2$ and R$_3$ are both H. For this polymer, e and f are derived from docosa-1,21-dien-11-ol and equal 9 and 10, respectively; d derives from 1,9-decadiene and equals 8. The run length distribution is therefore:

$r_{HH}$=(9+9)+8z;

$r_{HT}$=(9+10)+8z; and $r_{TT}$=(10+10)+8z; therefore $r_{total}$=(18+8z), (19+8z), (20+8z).

Example 45

Synthesis of Polymer 22-U

A dry argon-purged 500 mL three-neck round-bottom flask fitted with an argon inlet, a gas outlet connected to a mineral oil bubbler, and a high-viscosity mechanical stirrer was charged with RuCl$_2$(PCy$_3$)$_2$CHPh (52.1 mg, 0.0633 mmol, 2800:1 monomer:catalyst). Separately, a mixture of 1,9-decadiene (22.2 g, 161 mmol) and docosa-1,21-dien-11-ol (5.2 g, 16.1 mmol, degassed as a melt at 55° C. overnight under vacuum) was prepared in a Schlenk flask and degassed by three consecutive freeze-pump-thaw cycles. The monomer solution was then added to the reaction flask via syringe. The resulting mixture was then heated to 60° C.; rapid bubbling of ethylene was observed and after several hours the viscous mixture solidified. The temperature was raised slightly to 70° C., and vacuum was slowly applied to prevent splatter of the polymer on the upper walls of the flask. Once full vacuum was achieved, the reaction was stirred under vacuum for 4 days, during which it was subjected to argon flow rather than vacuum during the nights. An additional 25 mg aliquot of catalyst was added each day for a total of 151 mg. A sample was removed, dissolved in hot toluene, and precipitated into room temperature methanol to give polymer 22-U, which was collected by filtration and dried under high vacuum (126 mg, 0.5%, white powder). Some mineral oil (used to lubricate the stirring shaft) was observed in the polymer sample due to leakage from the stirring shaft into the polymerization flask. The end groups R$_2$ and R$_3$ are both H.

Example 46

Synthesis of Polymer 22

After removal of the aliquot of 22-U in Example 45, the remaining polymerization mixture was dissolved in 150 mL reagent grade xylenes at 60° C. and transferred to a glass-lined 450 mL stainless steel Parr reactor containing 15 g chromatographic silica. This stirred mixture was hydrogenated at 90° C. and 500 psig H$_2$ for 7 days (the reactor was pressurized to 500 psig H$_2$ and released three times before the final H$_2$ charge). Subsequently, the reactor was vented and the contents of the glass sleeve were re-heated to boil, and filtered through a coarse glass frit funnel preheated with boiling xylenes to remove the brown silica-Ru catalyst residue. The filtrate was heated to boil and precipitated into 700 mL acidified (1N HCl) isopropyl alcohol at room temperature. The white powder was collected by filtration and reprecipitated from hot xylenes into 700 mL acidified (1N HCl) methanol, and washed twice by stirring in 250 mL boiling methanol. NMR analysis showed residual olefin. The polymer was again dissolved in 150 mL xylenes with 100 mg RhCl(PPh$_3$)$_3$ and hydrogenated at 120° C. and 500 psig H$_2$ for 3 days, and precipitated into 700 mL acidified (1N HCl) methanol at 40° C. BHT was not added. Residual mineral oil was removed by the precipitation steps. Polymer 22 was obtained as a white powder (11.0 g, 47.3%). The IR and NMR spectra, end groups, and run length distribution of the polymer are similar to material 21.

Example 47

Synthesis of Polymer 23-U

Using the procedure described in Example 45, a mixture of 1,9-decadiene (12.32 g, 89.11 mmol) and docosa-1,21-dien-11-ol (8.29 g, 25.0 mmol) were polymerized using RuCl$_2$(PCy$_3$)$_2$CHPh (50 mg, 61 μmol). The polymerization was carried out for a total of 7 days at 60° C. and a sample of polymer 23-U was purified and isolated as described in Example 45 (250 mg, 1.4%, white powder). The composition of the polymer ($^1$H NMR) on a vinyl basis, ignoring the presence of olefin units, was 3.7 mol % vinyl alcohol and 96.3 mol % ethylene. GPC (DRI, 45° C. in THF vs. polystyrene): M$_w$ 36,600; M$_n$ 22,900; M$_w$/M$_n$ 1.6. The end groups R$_2$ and R$_3$ are both H.

Example 48

Synthesis of Polymer 23

A portion of the polymerization mixture of 23-U (Example 47) was dissolved in 150 mL reagent grade xylenes and hydrogenated in a glass-lined 450 mL stainless steel Parr reactor containing 10 g chromatographic silica at 130° C. and 500 psig H$_2$ for 5 days, using a procedure similar to that described in Example 46. Polymer 23 was precipitated into 700 mL acidified (1N HCl) methanol, washed twice by stirring in 250 mL boiling methanol, and air dried to give a white powder (1.2 g, 5.8%). The IR and NMR spectra, end groups, and run length distribution for the polymer are similar to material 21.

Example 49

Synthesis of Polymer 24

Using the procedure described in Example 45, a mixture of 1,9-decadiene (16.22 g, 117.3 mmol) and docosa-1,21-dien-11-ol (3.78 g, 11.7 mmol) were polymerized using RuCl$_2$(PCy$_3$)$_2$CHPh (50 mg, 61 μmol). The polymerization was carried out for a total of 5 days at 60° C. The polymer was dissolved in 50 mL toluene and precipitated into methanol at room temperature. Subsequently, using the procedure described in Example 48, the polymer was hydrogenated in a glass-lined 450 mL stainless steel Parr reactor, using 100 mg (0.108 mmol) (Ph$_3$P)$_3$RhCl in 150 mL xylenes at 130° C. and 500 psig H$_2$ for 3 days. Polymer 24 was obtained as a white powder after air drying (13.7 g, 66%). The IR and NMR spectra, end groups, and run length distribution for the polymer are similar to material 21.

Example 50

Synthesis of Polymer 25-U

Using the procedure described in Example 45, a mixture of 1,9-decadiene (12.3 g, 96.0 mmol) and docosa-1,21-dien-11-ol (7.67 g, 23.8 mmol) were polymerized using RuCl$_2$(PCy$_3$)$_2$CHPh (50 mg, 61 μmol). The polymerization was carried out for a total of 3 days at 60° C. The polymerization mixture was dissolved in toluene and precipitated into methanol to give polymer 25-U as a white powder (14 g, 70%). The end groups R$_2$ and R$_3$ are H.

Example 51

Synthesis of Polymer 25

Using the procedure described in Example 48, polymer 25-U was hydrogenated in a glass-lined 450 mL stainless steel Parr reactor, using 100 mg (0.11 mmol) (Ph$_3$P)$_3$RhCl in 150 mL xylenes at 130° C. and 500 psig H$_2$ for 3 days and precipitated twice into 700 mL acidified (1N HCl) methanol at 40° C. Polymer 25 was obtained as a white powder (5.5 g, 28%). The IR and NMR spectra, end groups, and run length distribution for the polymer are similar to material 21.

Example 52

Synthesis of Acetic Acid 1-(dec-9-enyl)-dodec-11-enyl Ester

Docosa-1,21-dien-11-ol (3.40 g, 10.1 mmol, 1 eq) and 4-dimethylaminopyridine (DMAP, 0.061 g, 1.50 mmol, 0.05 eq) were added to an oven-dried 100 mL three-neck round-bottom flask equipped with a magnetic stirbar and a reflux condenser/argon inlet. The solids were placed under vacuum for 30 minutes, and 50 mL of THF and 1.0 mL (11.04 mmol) of acetic anhydride were added via syringe. The resulting mixture was refluxed for 18 hours and transferred to a separatory funnel containing 100 mL hexanes. This solution was extracted with 50 mL 1 N aqueous HCl, 50 mL of aqueous saturated NaHCO$_3$, and 50 mL of water, dried over MgSO$_4$, and concentrated to afford a light yellow oil (2.97 g, 78%). Flash chromatography on silica (gradient elution 1:9 to 7:3 chloroform: hexanes) afforded acetic acid 1-(dec-9-enyl)-dodec-11-enyl ester as a colorless oil. The compound may be alternately purified by reverse phase HPLC using ethyl acetate and methanol as mobile phase. $^1$H NMR (300 MHz, CDCl$_3$): δ 5.78 (m, 2H), 4.94 (m, 4H), 4.86 (quintet, 1H), 2.04 (m, 7H, methyl (s, 3H) and allylic protons (q, 4H)), 1.52 (m, 4H), 1.37 and 1.26 (m, br, 28H) ppm. $^{13}$C NMR (75 MHz, CDCl$_3$): δ 170.92, 139.21, 114.08, 74.41, 34.10, 33.79, 29.51, 29.49, 29.44, 29.10, 28.91, 25.28, 21.28 ppm.

Example 53

Synthesis of Polymer 26-U

Following the procedure described in Example 43, acetic acid 1-(dec-9-enyl)-dodec-11-enyl ester (7.275 g, 20.0 mmol, degassed at 40° C. under vacuum overnight) and 1,9-decadiene (4.60 g, 33.3 mmol, 6.13 mL) were copolymerized at 68–70° C. using 75.0 mg (0.0911 mmol, 1075:1 monomer:catalyst) RuCl$_2$(PCy$_3$)$_2$CHPh (weighed in the drybox and transferred to the 3-necked flask maintaining inert conditions). Considerable frothing was observed upon catalyst addition and no viscosity increase was seen for the greenish-black solution after several hours. A second solid 75.0 g (0.0911 mmol) aliquot of RuCl$_2$(PCy$_3$)$_2$CHPh was added to the mixture, causing a color change to red-brown and an increase in viscosity. After a 16 hour period, a third 50.8 mg (0.0617 mmol) aliquot of catalyst was added. The polymerization was maintained under argon for a total of 9 days at 68–70° C. under argon (high vacuum was not applied due to a leak in the stirrer shaft bearing), during which the mixture darkened in color. The polymerization was quenched and treated as described in Example 43; solidification of the polymer was not observed upon cooling to 0° C. CH$_2$Cl$_2$ (150 mL) was then added at room temperature to dissolve the polymer. Neutral alumina (150 mesh, 2.06 g) was added to absorb residual catalyst, and the gluey solution was vacuum filtered. After concentration of the filtrate using a rotary evaporator, an excess of 1 N HCl in MeOH was added to precipitate polymer 26-U as a brown, toffee-like material. It was collected by filtration and dried in a vacuum oven overnight at 60° C. (8.725 g, 84%, theo. yield 10.38 g). IR (NaCl film): 3002 (w), 2924 (vs), 2853 (s), 1739 (s), 1464 (m), 1438 (w), 1370 (w), 1242 (s), 1021 (w), 966 (m), 722 (w) cm$^{-1}$. The NMR spectra of the polymer were similar to material 9-U except that minor resonances corresponding to hydrolized alcohol units, as in 1-U, were also observed. The composition of the polymer ($^1$H NMR) on a vinyl basis ignoring the presence of olefin units, was 6.6 mol % vinyl acetate and 93.4 mol % ethylene. DSC T$_m$: onset −29.4° C.; max −17.1° C.; ΔH$_f$ 30.2 J/g. GPC (DRI, 135° C. in 1,2,4-trichlorobenzene vs. polyethylene): M$_w$ 7,820; M$_n$ 3,790; M$_w$/M$_n$ 2.1. GPC (DRI, 25° C. in THF vs. polystyrene): M$_w$ 25,300; M$_n$ 15,350; M$_w$/M$_n$ 1.6. GPC-LS (135° C. in 1,2,4-trichlorobenzene, EVAC parameters): M$_w$ 6,990; M$_n$ 4,770; M$_w$/M$_n$ 1.5. The end groups R$_2$ and R$_3$ are H.

Example 54

Synthesis of Polymer 26

An 8 g portion of the isolated alkenamer copolymer 26-U (Example 53, 41.0 mmol olefin groups) was hydrogenated by a procedure identical to that described in Example 44. The amounts of reagents used were 150 mL xylenes and 53.4 mg (57.7 μmol) Wilkinson's catalyst. Polymer 26 was isolated as brown crumbs (7.1 g, 88%, theo. yield 8.09 g). The IR and NMR spectra of the polymer were similar to material 9 except that minor resonances corresponding to hydrolized alcohol units, as in 1, were also observed, and polymer end groups were seen in the $^1$H NMR spectrum at 0.84–0.92 (t, CH$_3$) ppm and in the $^{13}$C NMR spectrum at 32.2 (CH$_2$CH$_2$CH$_3$), 22.9 (CH$_2$CH$_3$), and 14.1 (CH$_3$) ppm. No alkyl branching was observed. The end groups R$_2$ and R$_3$ are H. For this polymer, e and f are derived from acetic acid 1-(dec-9-enyl)-dodec-11-enyl ester and equal 9 and 10, respectively; d derives from 1,9-decadiene and equals 8. The run length distribution is therefore:

$r_{HH} = (9+9)+8z;$ $r_{HT} = (9+10)+8z;$ and $r_{TT} = (10+10)+8z;$ therefore $r_{total} = (18+8z), (19+8z), (20+8z).$

Example 55

Synthesis of Polymer 27-U

Using the procedure described in Example 45, a mixture of 1,9-decadiene (15.8 g, 123 mmol) and acetic acid 1-(dec-9-enyl)-dodec-11-enyl ester (4.17 g, 11.4 mmol) were polymerized using 50 mg (61 µmol) $RuCl_2(PCy_3)_2CHPh$. The polymerization was carried out for a total of 5 days at 55° C. (subjected to argon flow rather than vacuum during the nights). A sample was removed and precipitated into room temperature methanol to give polymer 27-U, which was collected by filtration and dried under high vacuum (110 mg, 0.6%, white powder). The IR and NMR spectra and end groups for the polymer are similar to material 26-U. The composition of the polymer ($^1$H NMR) on a vinyl basis, ignoring the presence of olefin units, was 2.3 mol % vinyl acetate and 97.7 mol % ethylene. GPC (DRI, 135° C. in 1,2,4-trichlorobenzene vs. polyethylene): $M_w$ 7,440; $M_n$ 2,050; $M_w/M_n$ 3.6. GPC (DRI, 45° C. in THF vs. polystyrene): $M_w$ 42,200; $M_n$ 35,700; $M_w/M_n$ 1.7. GPC-LS (135° C. in 1,2,4-trichlorobenzene, EVAC parameters): $M_w$ 10,300; $M_n$ 8,260; $M_w/M_n$ 1.2.

Example 56

Synthesis of Polymer 27

The polymerization mixture of 27-U (Example 55) was dissolved in 150 mL reagent grade toluene and added to a 450 ml glass liner containing 10 g chromatographic silica, and hydrogenated in a stainless steel Parr bomb at 90° C. and 500 psig $H_2$ for 7 days using the procedure described in Example 48. NMR analysis showed residual olefin unsaturation. The white powder was then re-hydrogenated in a glass-lined 450 mL stainless steel Parr reactor, using 100 mg (0.11 mmol) $(Ph_3P)_3RhCl$ in 150 mL xylene at 130° C. and 500 psig $H_2$ for 5 days, and precipitated into acidified methanol (1N HCl) at 40° C. Polymer 27 was obtained as a white powder (12.35 g, 61.8%). The IR and NMR spectra, end groups, and run length distribution for the polymer are similar to material 26.

Example 57

Synthesis of Methyl 2-(dec-9-enyl)-tridec-12-enoate 2-(Dec-9-enyl)-tridec-12-enoic acid (63 mg, 0.18 mmol, Example 67) was added to a 100 mL three-neck round-bottom flask fitted with a reflux condenser (cooled with ice cold water) followed by 15 mL of reagent-grade acetone. The resulting solution was vigorously stirred and 0.062 g $K_2CO_3$ (0.45 mmol, 2.5 eq.) was added in one portion and the mixture was stirred for 5 minutes at room temperature. An excess of methyl iodide (~2.0 mL) was then added and the mixture was refluxed under argon for 24 hours, after which TLC analysis (5:95 ethyl acetate:hexanes) indicated complete reaction. The mixture was acidified to pH 5 with 3N aqueous HCl and extracted with $CH_2Cl_2$. This solution was dried over $MgSO_4$ and a small amount of $Na_2S_2O_3$ (to destroy iodine). The solvent was then evaporated to afford methyl 2-(dec-9-enyl)-tridec-12-enoate (64 mg, quantitative yield) as a clear oil. $^1$H NMR (300 MHz, $CDCl_3$): δ 5.80 (m, 2H), 4.93 (m, 4H), 3.65 (s, 1H), 2.35 (m, 1H), 2.03 (q, 4H), 1.58 (m, 2H) 1.42, 1.35, and 1.27 (m, 28H) ppm. $^{13}$C NMR (75 MHz, $CDCl_3$): δ 177.04, 139.17, 139.15, 114.08, 114.06, 51.23, 45.68, 33.78 (2 C, unresolved), 32.48, 29.51, 29.50, 29.48 (2 C, unresolved), 29.42 (2 C, unresolved), 29.37 (2 C, unresolved), 29.09, 29.06, 28.90, 28.88, 27.44 (2 C, unresolved) ppm. Analysis calculated for $C_{24}H_{44}O_2$: C, 79.06; H, 12.16. Found: C, 78.83; H, 12.16. HRMS-FAB: Theoretical: 365.3420; Found: 365.3399 [M]+. A copolymer of methyl 2-(dec-9-enyl)-tridec-12-enoate and 1,9-decadiene, prepared similarly to polymer 21, would have the following features: The end groups $R_2$ and $R_3$ would be H. For this polymer, e and f would be derived from methyl 2-(dec-9-enyl)-tridec-12-enoate and would equal 9 and 10, respectively; d would derive from 1,9-decadiene and would equal 8. The run length distribution would therefore be:

$r_{HH}=(9+0)+8z;$ $r_{HT}=(9+10)+8z;$ and $r_{TT}=(10+10)+8z;$ therefore $r_{total}=(18+8z), (19+8z), (20+8z).$

Example 58

Synthesis of 2-(4-pentenyl)-6-heptenoic Acid

Diethyl malonate (25 g, 156 mmol) was dissolved in 150 mL dry THF in a 3 necked round bottom flask, and NaH (18.74 g of 60% dispersion in mineral oil, 469 mmol, 3.0 eq.) was added portionwise. The suspension was magnetically stirred for 30 minutes. Subsequently, 58.1 g 5-bromo-1-pentene (390 mmol, 2.5 eq.) was added in one portion via syringe. The yellow suspension was heated at reflux overnight and cooled to room temperature. Aqueous 1 M HCl was added until the pH of the mixture was ≦7. The THF was removed via rotary evaporation and diethyl ether (300 mL) was added. The mixture was extracted with 2×150 mL aqueous 1 M HCl and 2×150 mL brine. The organic layer was then dried over $MgSO_4$, filtered, and concentrated to give a yellow-brown oil, diethyl di-(4-pentenyl)malonate. This oil was placed in a 500 mL round-bottomed flask and 100 mL ethanol was added, followed by a large excess (30 g, ~5 eq.) of NaOH, some of which did not dissolve. $H_2O$ (5 mL) was added and the resulting mixture was stirred at reflux overnight. Subsequently, the entire mixture was poured into a large beaker, cooled to 0° C. using an ice water bath, and stirred (additional $H_2O$ may be added to dissolve any residual solids interfering with stirring). Concentrated aqueous HCl was added portionwise until the pH of the mixture was ≦7; solids were formed upon acidification. Diethyl ether (300 mL) was added to the mixture at room temperature, and the aqueous layer was extracted with 2×150 mL diethyl ether. The combined organic layers were extracted with 4×150 mL 1 M aqueous NaOH. The combined aqueous fractions from the extractions were then transferred to a beaker and acidified with concentrated aqueous HCl until the pH of the mixture was ≦7. Diethyl ether (200 mL) was added. The aqueous layer was extracted with 3×100 mL diethyl ether, and all of the combined organic layers were dried over $MgSO_4$ and filtered. Volatiles were removed to give 2,2-di-(4-pentenyl)malonic acid as a yellow-brown oil. Subsequently, 2,2-di-(4-pentenyl)malonic acid (60 g, 250 mmol) was placed in a large round-bottomed flask equipped with a reflux condenser and heated with vigorous magnetic stirring to 200° C.–210° C. using an oil bath. Gas evolution was observed upon reflux. After a 1 hour period, decarboxylation (evidenced by vigorous frothing) was complete and the mixture was cooled to room temperature and purified by flash chromatography on silica using 15% ethyl acetate:hexanes as mobile phase to give 2-(4-pentenyl)-6- heptenoic acid (23 g, 79%). $^1$H NMR (CDCl$_3$): δ 11.2–12.2 (br, 1H), 5.6–6.0 (m, 2H), 4.8–5.0 (m, 4H), 2.2–2.4 (m, 1H), 1.9–2.1 (m, 4H), 1.8–1.9 (m, 2H), 1.2–1.8 (m, 6H) ppm.

Example 59

Synthesis of Polymer 28-U

In the drybox, 1.657 g (8.44 mmol) 2-(4-pentenyl)-6-heptenoic acid and 11.061 g cyclooctene (95.65% purity material, 95.9 mmol) were placed in a 100 mL graduated cylinder and diluted to exactly 52 mL with dry CH$_2$Cl$_2$ (2 M monomer solution). The solution was transferred to a 100 mL Schlenk storage tube, which was sealed, removed from the drybox, and subjected to several freeze-pump-thaw cycles. In the drybox, the monomer solution was then transferred to a 250 mL Schlenk flask containing a stirbar and 179 mg (0.210 mmol, 497:1 monomer:catalyst) RuCl$_2$(PCy$_3$)(SIMes)CHPh to give a red-brown solution. The flask was fitted with a reflux condenser topped with a vacuum adapter and placed under argon via the vacuum adapter. The contents of the flask were heated to 55° C. and stirred under argon for 5 days, during which a darkening of the brown color and increase in viscosity were observed. Subsequently, the cooling water was shut off from the condenser, the oil bath temperature was reduced to 40° C., and the CH$_2$Cl$_2$ solvent was removed under high vacuum. Dry toluene (50 mL) was added to the flask via cannula to redissolve the polymer product, followed by a solution of 179 mg (0.210 mmol) RuCl$_2$(PCy$_3$)(SIMes)CHPh in 20 mL dry toluene (added via syringe). This solution was stirred for an additional 72 hours under argon. The contents of the flask were then cooled to room temperature, and 1 mL pyridine and 1 mL ethyl vinyl ether were added to quench polymerization. After 10 minutes of stirring, a large excess of MeOH was added to precipitate polymer 28-U as a spongy material, which was isolated by decantation and dried under high vacuum at 55° C. (10.0 g, 83%, theo. yield 11.99 g), at which temperature it was observed to melt. The polymer was cooled, redissolved in minimal toluene at room temperature and reprecipitated into MeOH precooled to −78° C. to give pinkish, rubbery flakes of polymer 28-U. IR (NaCl film): 3003 (w), 2985 (w), 2923 (vs), 2852 (s), 1706 (m, C=O), 1461 (m), 1436 (m), 1387 (w), 1340 (w), 1289 (w), 1237 (w), 1083 (vw), 966 (m), 723 (w) cm$^{-1}$. The $^1$H and $^{13}$C NMR were similar to material 19-U except that polymer end groups were seen in the $^1$H NMR spectrum at 0.8–1.0 (t, CH$_3$) ppm. The composition of the polymer (H NMR) on a vinyl basis, ignoring the presence of olefin units, was 1.5 mol % acrylic acid and 98.5 mol % ethylene. DSC T$_m$: onset 8.4° C., max 25.6° C., ΔH$_f$ 54.2 J/g. GPC (DRI, 135° C. in 1,2,4-trichlorobenzene vs. polyethylene): M$_w$ 6,020; M$_n$ 2,650; M$_w$/M$_n$ 2.3. GPC (DRI, RT in THF vs. polystyrene): M$_w$ 27,970; M$_n$ 16,580; M$_w$/M$_n$ 1.7. The end groups R$_2$ and R$_3$ are H or C$_6$H$_5$.

Example 60

Synthesis of Polymer 28

A 9 g portion of polymer 28-U (Example 59, 78.3 mmol olefin groups) was hydrogenated by a procedure identical to that described in Example 44. The amounts of reagents used were 150 mL xylenes and 60.0 mg (64.8 mmol) Rh(PPh$_3$)$_3$Cl. The polymer was initially dissolved in xylenes at 130° C. Polymer 28 was isolated as a light grey powder (8.1 g, 88%, theo. yield 9.156 g). The IR and NMR spectra of the polymer were similar to material 19 except that polymer end groups were seen in the $^1$H NMR spectrum at 0.7–1.05 ppm (t, CH$_3$) and in the $^{13}$C NMR spectrum at 32.2 (CH$_2$CH$_2$CH$_3$), 22.9 (CH$_2$CH$_3$), and 14.1 (CH$_3$) ppm. No alkyl branching was observed. The end groups R$_2$ and R$_3$ are H or C$_6$H$_5$.

Example 61

Synthesis of Polymer 29-U

In the drybox, 2.504 g (12.76 mmol) 2-(4-pentenyl)-6-heptenoic acid and 7.532 g cyclooctene (95.65%, 65.3 mmol) were placed in a 100 mL graduated cylinder and diluted to exactly 39 mL with dry CH$_2$Cl$_2$ (2 M monomer solution). The solution was polymerized for 5 days at 55° C. in a manner similar to that described in Example 59, using a 100 mL Schlenk flask and 133 mg (0.157 mmol, 497:1 monomer:catalyst) RuCl$_2$(PCy$_3$)(SIMes)CHPh. Subsequently, dry toluene (40 mL) was added to the flask via cannula to redissolve the polymer product, followed by a solution of 133 mg (0.0.157 mmol) RuCl$_2$(PCy$_3$)(SIMes)CHPh in 15 mL dry toluene (added via syringe). This solution was stirred for an additional 48 hours under argon. The contents of the flask were then cooled to room temperature, and 1 mL pyridine and 1 mL ethyl vinyl ether were added to quench polymerization. After 10 minutes of stirring, a large excess of MeOH precooled to −70° C. was added to precipitate polymer 29-U as a brown oil (7.4 g, 79%, theo. yield 9.346 g). The IR and NMR spectra and end groups for the material are similar to material 28-U. The composition of the polymer ($^1$H NMR) on a vinyl basis, ignoring the presence of olefin units, was 3.5 mol % acrylic acid and 96.5 mol % ethylene. DSC T$_m$: onset 6.0° C., max 16.8° C., ΔH$_f$ 33.2 J/g (low-temperature shoulder to melt). GPC (DRI, 135° C. in 1,2,4-trichlorobenzene vs. polyethylene): M$_w$ 5,850; M$_n$ 2,330; M$_w$/M$_n$ 2.5. GPC (DRI, 25° C. in THF vs. polystyrene): M$_w$ 36,070; M$_n$ 22,860; M$_w$/M$_n$ 1.6.

Example 62

Synthesis of Polymer 29

A 7 g portion of polymer 29-U (Example 61, 58.5 mmol olefin groups) was hydrogenated by a procedure identical to that described in Example 44. The amounts of reagents used were 150 mL xylenes and 46.7 mg (50.5 mmol) Wilkinson's catalyst. The hydrogenated polymer was isolated as a light grey powder (6.1 g, 86%, theo. yield 7.12 g) which was redissolved in o-dichlorobenzene at 120° C. and precipitated into an excess of MeOH containing 500 ppm BHT to give polymer 29. The IR and NMR spectra and end groups for the polymer are similar to material 28.

Example 63

Synthesis of 2-(5-hexenyl)-7-octenoic Acid

Using a procedure identical to that described in Example 58 for the synthesis of di(4-pentenyl)malonic acid, diethyl malonate (25 g, 156 mmol) was dissolved in 150 mL dry THF in a 3 necked round bottom flask, and was reacted with NaH (18.74 g of 60% dispersion in mineral oil, 469 mmol, 3.0 eq.) and 6-bromo-1-hexene (63.6 g, 390 mmol, 2.5 eq.) and saponified/neutralized. The resultant yellow-brown oil, 2,2-di-(5-hexenyl)malonic acid, was placed in an oversized round-bottomed flask equipped with a reflux condenser, and heated with vigorous magnetic stirring to 200–210° C. using an oil bath. Gas evolution was observed upon reflux. After a 1 hour period, decarboxylation (evidenced by vigorous frothing) was complete. The mixture was cooled to room temperature and fractionally distilled at 115–118° C./0.1 torr, then further purified by flash chromatography using 15% ethyl acetate:hexanes as mobile phase to give 2-(5-hexenyl)-7-octenoic acid (9.5 g, 13.6%). $^1$H NMR (CDCl$_3$): δ 11.2–12.2 (br, 1H), 5.6–6.0 (m, 2H), 4.8–5.0 (m, 4H), 2.2–2.4 (m, H), 1.9–2.1 (m, 4H), 1.8–1.9 (m, 2H), 1.2–1.8 (m, 10H) ppm.

Example 64

Synthesis of Polymer 30

2-(5-Hexenyl)-7-octenoic acid (0.155 g, 0.691 mmol) and cyclooctene (0.845 g, 7.67 mmol of 95% purity material) were mixed together in a 10 mL round bottom flask. An 0.14 g portion of this mixture was then added to a 25 mL three-necked round bottom flask fitted with a reflux condenser and containing a stirbar, followed by a solution of RuCl$_2$(PCy$_3$)(SIMes)CHPh (2.1 mg, 2.5 μmol, 470:1 monomer:catalyst) in 0.12 mL o-dichlorobenzene (ODCB). The contents of the flask were heated to 55° C. under argon with stirring. After several minutes, another 0.3 mL of ODCB was added to aid stirring of the viscous mixture. After 2 days, 1 drop of pyridine and 1 drop of ethyl vinyl ether were added to quench polymeric alkylidenes. The solution was then added to 50 mL methanol to precipitate the polymer as a rubbery material, which was isolated by filtration and dried under high vacuum at 55° C. The entire polymer sample was then hydrogenated by a procedure similar to that described in Example 44. The amounts of reagents used were 50 mL xylenes and 10 mg (11 μmol) Wilkinson's catalyst. The hydrogenated polymer was isolated as a white solid (74 mg, 53%). The IR and NMR spectra of the polymer were similar to material 28 except that resonances for vinyl alcohol groups (similar to those present in polymer 18) were seen. No alkyl branching was observed. The end groups R$_2$ and R$_3$ are H or C$_6$H$_5$.

Example 65

Synthesis of Polymer 31

Polymer 28 (Example 60, 4.0 g, 3.4 mmol acrylic acid units) was dissolved in 160 mL stirred o-dichlorobenzene in a 500 mL round-bottomed 24/40 flask at 95° C. A solution of 8.0 g (0.2 mol) NaOH in 40 mL distilled H$_2$O was added to the polymer solution, and the resultant emulsion-like mixture stirred for 72 hours at 95° C. Subsequently, a large excess of MeOH was added causing precipitation of the ionomer, which was collected by filtration, rinsed with additional clean MeOH, and dried in a vacuum oven overnight at 100° C. (5.1 g of a light grey powder, >100%, theo. yield 4.09 g). This material was powdered, stirred in MeOH overnight, collected by filtration, and redried in a vacuum oven for 48 h at 80–95° C., but a larger than quantitative yield of polymer 31 (4.6 g) was still obtained, indicating some residual MeOH, moisture, or NaOH. IR (film on NaCl): 2918, 2849, 1539 (C=O), 1473, 1463, 1104 cm$^{-1}$. $^1$H NMR (500 MHz, TCE-d$_2$) was unchanged from that of free acid precursor 28. $^{13}$C NMR (75 MHz, TCE-d$_2$, Cr(acac)$_3$ (15 mg/mL), 120° C.) was also unchanged except for shifting and broadening of the C=O resonance (180–177 ppm). No residual acid groups were detected. The end groups R$_2$ and R$_3$ are H or C$_6$H$_5$.

Comparative Example C1

Synthesis of Polyoctenamer A-U

Following the procedure described in Example 2, cyclooctene (7.0 ml corrected for purity, 6.0 g, 54 mmol) was added to 51 mL o-dichlorobenzene. A solution of RuCl$_2$(PCy$_3$)(SIMes)CHCH$_3$ (21 mg, 27 μmol, 2000:1 monomer:catalyst) in o-dichlorobenzene (0.2 mL) was added. After a reaction period of 15 minutes at 60° C., removal and workup of a small aliquot of solution gave 0.65 g (11%) of polymer A-U as white fibers. $^1$H NMR (299.631 MHz, CDCl$_3$): δ 1.32 (br, 8H), 1.98 (br, 4H), 5.38 (br, 2H) ppm. $^{13}$C NMR (75 MHz, CDCl$_3$): δ 130.31 (trans), 129.85 (cis), 32.61, 29.76, 29.65, 29.19, 29.09, 29.05 ppm. The end groups R$_2$ and R$_3$ are H or CH$_3$.

Comparative Example C2

Synthesis of Polyethylene A

After removal of the small aliquot containing polymer product A-U in Comparative Example C1, the remainder of the polymerization solution was hydrogenated following the procedure given in Example 3 to give 3.44 g (57%) of polymer A. $^1$H NMR (300 MHz, TCE-d$_2$, 120° C.): δ 1.29 (m, CH$_2$), 0.8–0.9 (t, CH$_3$) ppm. $^{13}$C NMR (125 MHz, TCE-d$_2$, Cr(acac)$_3$ (15 mg/mL), 120° C.): δ 30.0 (CH$_2$) ppm (CH$_3$ not seen). No alkyl branching was observed. In addition to the main polymer, a small oligomeric component was observed at M$_w$ 2,110; M$_n$ 980; M$_w$/M$_n$ 2.2. The end groups R$_2$ and R$_3$ are H or CH$_3$.

Comparative Example C3

Synthesis of Polyoctenamer B-U

In the drybox, 1,9-decadiene (1.0 g, 7.2 mmol) was placed in a 50 mL round-bottom flask with a stirbar and 6.1 mg (0.72 μmol, 0.1 mol %) of RuCl$_2$(SIMes)(PCy$_3$)CHPh were added. A vacuum adapter was fitted to the flask, and the flask was then removed from the box and attached to a vacuum line. The pressure was gradually decreased to full vacuum while heating the stirred mixture to 70° C. Ethylene generation and viscosity buildup were observed. After 4 days, 5 drops of ethyl vinyl ether, 5 drops pyridine and 1 mg BHT were added to the solid polymer, and toluene (5–10 mL) was added until dissolution was complete (the polymer was heated to 50° C. to promote dissolution). The polyoctenamer was precipitated into room-temperature methanol to give 0.91 g (91%) of polymer B-U as a white fibrous material. NMR spectra of the polymer were similar to A-U. The end groups R$_2$ and R$_3$ are both H.

Example 66

Synthesis of RuCl$_2$(PPh$_3$)(SIMes)CHCH=C(CH$_3$)$_2$

RuCl$_2$(PCy$_3$)(SIMes)CHCH=C(CH$_3$)$_2$ (176 mg, 0.224 mmol) was combined with 0.5 mL pyridine in an open vial in air, causing an immediate color change to dark green, and stirred for five minutes. The stir bar was then removed and 10 mL pentane was layered over the pyridine solution. The vial was capped and placed in a freezer overnight causing green crystals to form. The solution was decanted off of the solid, which was then washed four times with 2 mL room temperature pentane and dried overnight in vacuo to yield 120 mg (76% yield) of a green solid which was not characterized but assumed to be $RuCl_2(py)_2(SIMes)CHCH=C(CH_3)_2$. This solid was placed in a 25 mL pear-shaped flask with 8 mL of benzene and degassed by bubbling argon through the solution for 25 minutes with stirring. $PPh_3$ (61 mg, 0.23 mmol, 1.4 eq.) was then added as a solid in one portion, which caused a color change to brown. The solution was stirred at room temperature for 10 minutes, frozen, and freeze dried overnight under high vacuum to give a brown solid. This solid was washed with 2 mL of 0° C. methanol and two portions of 2 mL of pentane, and dried under high vacuum overnight to give 39 mg of $RuCl_2(PPh_3)(SIMes)CHCH=C(CH_3)_2$ (28.3%, brown solid). $^1H$ NMR (299.631 MHz, $CDCl_3$): δ 18.71 (d, Ru=CH, $J_{HH}$=11 Hz, 1H), 6.7–7.3 (m, $P(C_6H_5)_3$, Ru=CHCH, and aryl H, 20H with solvent (19 expected)), 3.98 (m, $NCH_2CH_2N$, 4H), 2.58, 2.38, 2.21 (s, mesityl $CH_3$, 6, 9, and 3H, respectively), 1.05, 0.81 (Ru=CHCHC$(CH_3)_2$, 3 and 3H) ppm. $^{13}C$ NMR (75.357 MHz, $CDCl_3$): δ 295.78 (d, $J_{CP}$=8 Hz), 219.51 (d, $J_{CP}$=88 Hz), 146.04, 146.02, 138.74, 137.94, 137.53, 137.20, 137.07, 134.72, 134.17, 134.03, 133.89, 131.32, 130.79, 129.69, 129.16, 129.06, 129.03, 127.73, 127.50, 127.38, 51.36, 51.09, 26.96, 21.26, 21.05, 19.91, 19.79, 18.67 ppm. $^{31}P$ NMR (121.292 MHz, $CDCl_3$): δ 37.1 ppm.

Example 67

Synthesis of 2-(dec-9-enyl)-tridec-12-enoic Acid

Lithium diisopropyl amide (LDA, 2.0 M solution in THF/hexane/ethyl benzene, stabilized with magnesium bis(diisopropylamide), 52 mL, 0.10 mol, 2.2 eq) was added via cannula to a 500 mL three-neck round-bottom flask equipped with a stirbar, condenser, argon inlet, low-temperature thermometer, and addition funnel, and cooled to ~–20° C. with a dry ice-isopropanol bath. Some precipitation was observed upon cooling. Dodec-11-enoic acid (9.23 g, 0.0466 mol) was dissolved in 60 mL THF and added slowly to the stirred LDA mixture at a rate that kept the temperature below –15° C. The yellow solution was heated to 50° C. for 2.25 hr, and then cooled to room temperature. At about 20–25° C., the solution became so viscous that stirring was impossible. 1,3-Dimethyl-3,4,5,6-tetrahydro-2(1H)-pyrimidinone (DMPU, 22.5 mL, 23.9 g, 0.186 mol, 4.0 eq) was added via syringe and the solution was stirred for 30 min, which reduced the viscosity and caused a color change to bright orange-red. This solution was cooled to 15° C., and 11-bromo-undecene (11.25 mL, 11.95 g, 0.05125 mol, 1.10 eq) was added in one portion via syringe, causing a color change to bright yellow and gradual precipitation of a white solid. This mixture was stirred overnight, and 200 mL of 3 N aqueous HCl was added, causing some fuming and heat liberation. Diethyl ether (200 mL) was added and the contents were stirred for 1 hr and transferred to a 1 L separatory funnel. The aqueous layer was washed with 2×100 mL diethyl ether. The combined organic layers were then washed with 3×100 mL 3N aqueous HCl and 50 mL of brine, and dried with $MgSO_4$. Following filtration, solvent was evaporated to afford 19.98 g (>100%) of a yellow oil. The crude product was purified by flash chromatography (15% ethyl acetate in hexanes). The material was then dissolved in a small amount of hexanes (approximately 12 mL per g of material) and cooled in a freezer overnight, which caused formation of large dendritic crystals. A second cooling/precipitation step produces analytically pure 2-(dec-9-enyl)-tridec--12-enoic acid (11.44 g, 70%). Melting point (stage) 27–28° C. $^1H$ NMR (300 MHz, $CDCl_3$): δ 11.35 (br, 1H), 5.80 (m, 2H), 4.93 (m, 4H), 2.35 (m, 1H), 2.03 (q, 4H), 1.62 (m, 2H), 1.42 and 1.27 (m, 28H) ppm. $^{13}C$ NMR (75 MHz, $CDCl_3$): δ 183.14, 139.20, 139.18, 114.10, 114.08, 45.54, 33.80, 33.79, 32.13, 29.54, 29.52, 29.45, 29.42, 29.40, 29.38, 29.12, 29.10, 29.08, 28.92, 28.91, 28.90, 27.34 ppm. Analysis calculated for $C_{23}H_{42}O_2$: C, 78.80; H, 12.08. Found: C, 78.81, H, 12.23. HRMS-FAB: Theoretical: 351.3263; Found: 351.3223 [M]+, 333.3186 [M–$H_2O$]+.

Examples 68–75

Small-scale Synthesis of Acid-functionalized Alkenamers

Table 2 presents polymerization conditions and molecular weight data for a series linear functional polyethylenes (Examples 68–75). The theoretical composition of these polymers on a vinyl basis (based on molar ratios of comonomers), ignoring the presence of olefin units, is 2.2 mol % acrylic acid and 97.8 mol % ethylene. The general procedure for polymerizations (Example 68) was as follows, with any appropriate changes made to solvent, catalyst, and reaction times for the other Examples: A dry, argon-purged 50 mL three-necked round-bottom flask was fitted with a glass stopper, reflux condenser, and argon inlet, and was charged with $RuCl_2(PCy_3)(SIMes)CHPh$ (2.2 mg, 2.6 μmol). 2-(Dec-9-enyl)-tridec-12-enoic acid (3.51 g, 10 mmol) and cyclooctene (11.7 mL corrected for purity, 9.92 g, 90 mmol) were combined and enough $CH_2Cl_2$ was added to make a solution of 100 mL. This solution was freeze-pump-thawed three times and 2.6 mL were injected into the stirred reaction flask containing the catalyst (1000:1 monomer:catalyst). The solution became viscous within minutes, was heated to reflux, and was allowed to stir for 1 day, after which the $CH_2Cl_2$ was evaporated and the solid residue was taken up into 5 mL of reagent grade THF and precipitated into 100 mL $H_2O$. The polymer was collected by filtration (10 mg, 2.9%, white powder). The end groups $R_2$ and $R_3$ for the polymers prepared in Examples 68–72 and 74–75 are H or $C_6H_5$. The end groups for the polymer prepared in Example 73 are H or $CH_2CH(CH_3)_2$.

TABLE 2

Small-scale synthesis of linear acid-functionalized alkenamers (~2.2 mol % acrylic acid).

| Ex. | Solvent | Mono. conc. | Mono:cat. | Catalyst[a] | Rxn. time | $M_w$[b] | $M_n$[b] | $M_w/M_n$[b] |
|---|---|---|---|---|---|---|---|---|
| 68 | $CH_2Cl_2$ | 1.0 | 1000:1 | Ru-1 | 1 day | 88,450[c] | 50,770[c] | 1.7[c] |
| 69 | $CH_2Cl_2$ | 1.0 | 10,000:1 | Ru-1 | 1 day | 9,090 | 4,200 | 2.2 |

TABLE 2-continued

Small-scale synthesis of linear acid-functionalized alkenamers (~2.2 mol % acrylic acid).

| Ex. | Solvent | Mono. conc. | Mono:cat. | Catalyst[a] | Rxn. time | $M_w$[b] | $M_n$[b] | $M_w/M_n$[b] |
|---|---|---|---|---|---|---|---|---|
| 70 | $CH_2Cl_2$ | 1.0 | 1000:1 | Ru-1 | 3 days | 107,610 | 64,790 | 1.7 |
| 71 | THF | 1.0 | 1000:1 | Ru-1 | 7 days | 15,390 | 8,540 | 1.8 |
| 72 | $CH_2Cl_2$ | 0.5 | 1000:1 | Ru-1 | 3 days | 83,930 | 43,490 | 1.9 |
| 73 | $CH_2Cl_2$ | 0.5 | 1000:1 | Ru-2 | 2 days | 26,770 | 14,030 | 1.9 |
| 74 | $CH_2Cl_2$ | 1.0 | 1000:1 | Ru-3 | 8 days | 124,880[d] | 68,880[d] | 1.8[d] |
| 75 | $CH_2Cl_2$ | 1.0 | 500:1 | Ru-3 | 1 day | 59,830 | 28,110 | 2.1 |

[a]Ru-1 = $RuCl_2(PCy_3)(SIMes)CHPh$; Ru-2 = $RuCl_2(PPh_3)(SIMes)CHCH{=}C(CH_3)_2$; Ru-3 = $RuCl_2(PCy_3)(IPrH_2)CHPh$.
[b]DRI, 45° C. in THF vs. polystyrene.
[c]GPC (DRI, 135° in 1,2,4-trichlorobenzene vs. polyethylene): $M_w$ 17,240; $M_n$ 8,340; $M_w/M_n$ 2.1.
[d]GPC (DRI, 135° in 1,2,4-trichlorobenzene vs. polyethylene): $M_w$ 22,210; $M_n$ 9,950; $M_w/M_n$ 2.2.

Examples 76–78

Synthesis of Acetate-functionalized Alkenamers

Table 3 presents polymerization conditions and molecular weight data for a series linear functional polyethylenes (Examples 76–78). The theoretical composition of these polymers on a vinyl basis (based on molar ratios of comonomers), ignoring the presence of olefin units, is equivalent to that of a polyolefin copolymer formed from a feed containing 2.2 mol % vinyl acetate and 97.8 mol % ethylene. The general procedure for polymerizations (Example 76) was as follows, with any appropriate changes made to amount of catalyst and reaction times for the other Examples: A dry, argon purged 500 ml three-neck round-bottom flask fitted with glass stoppers and a condenser/argon inlet was charged with acetic acid 1-(dec-9-enyl)-dodec-11-enyl ester (4.174 g, 0.01145 mol) and cyclooctene (14.9 ml corrected for purity, 12.6 g, 0.1145 mol) and enough $CH_2Cl_2$ to make a solution of 125 mL. This solution was freeze-pump-thawed three times and heated to reflux. A solution of $RuCl_2(PCy_3)(SIMes)CHPh$ (107 mg, 126 μmol, 1000:1) in 1 mL $CH_2Cl_2$ was injected via syringe. The solution became viscous within minutes and was allowed to stir for 4 days, after which the $CH_2Cl_2$ was evaporated. A small aliquot of polymer 32-U (yield not recorded) was removed for characterization (Table 3). The end groups $R_2$ and $R_3$ for the polymers prepared in Examples 76–78 are H or $C_6H_5$. Examples 77 and 78 were carried out similarly, except at a scale of 1/10 of this procedure.

Table 3. Synthesis of linear acetate-functionalized alkenamers (~2.2 mol % vinyl acetate).

Example 79

Synthesis of Polymer 32

After removal of the small aliquot containing polymer product 32-U (Example 76), the remainder of the solid polymer residue was dissolved in 150 mL xylenes and hydrogenated using the same procedure described in Example 44 to give a white powder (yield and spectra not recorded). The end groups $R_2$ and $R_3$ are H or $C_6H_5$.

Comparative Example C4

Compositional Analysis and Characterization of Comparative Branched Functional Polyethylenes C–DD Table 4 presents composition, molecular weight, thermal, and modulus data for a number of free-radically prepared functional polyethylenes containing alkyl branches. These polymers were characterized similarly to linear functional polyethylenes 1–31 for comparative purposes. Polymers F–DD are commercial materials. The synthesis of polymers C–E is described in Comparative Examples $C_5$–$C_7$.

TABLE 3

Synthesis of linear acetate-functionalized alkenamers (~2.2 mol % vinyl acetate).

| Ex. | Solvent | Mono. conc. | Mono:cat. | Catalyst[a] | Rxn. time | $M_w$[b] | $M_n$[b] | $M_w/M_n$[b] |
|---|---|---|---|---|---|---|---|---|
| 76 | $CH_2Cl_2$ | 1.0 | 1000:1 | Ru-1 | 4 days | 14,200 | 7,900 | 1.8 |
| 77 | $CH_2Cl_2$ | 2.0 | 500:1 | Ru-1 | 2 days | 41,360 | 21,750 | 1.9 |
| 78 | $CH_2Cl_2$ | 2.0 | 500:1 | Ru-1 | 2 days[c] | 46,700 | 22,500 | 2.0 |

[a]RU-1 = $RuCl_2(PCy_3)(SIMes)CHPh$.
[b]DRI, 45° C. in THF vs. polystyrene.
[c]One day in solvent and one day under vacuum.

TABLE 4

Composition, branching, and characterization data for comparative branched functional polyethylenes C-DD.

| Polymer | Comp. (mol % polar vinyl)[a] | Me/$C_2^+$ Branches/ 1000 C[b] | DRI $M_w$[c] | DRI $M_n$[c] | LS $M_w$[d] | LS $M_n$[d] | $T_m$ max (° C.)/ crystallinity | $T_c$ max (° C.)/ crystallinity | $T_g$ onset (° C.)[e] tan Δ | E' | St. mod. (25° C., MPa) & mode[e] |
|---|---|---|---|---|---|---|---|---|---|---|---|
| E | 2.4 VOH | 0.0:12.6 | 101,130 | 17,100 | 221,000 | 30,600 | 107.0 (0.470) | 94.2 (0.415) | −33.6 | — | 361 (B) |
| D | 3.8 VOH, 0.1 ketene | 0.0:18.7 | 87,700 | 16,950 | 167,000 | 31,900 | 107.6 (0.487) | 92.2 (0.414) | −81.0, −39.0 | — | 182 (B) |
| C | 5.8 VOH | 0.0:10.4 | 27,090 | 10,430 | 34,200 | 20,400 | 107.9 (0.405) | 92.0 (0.394) | −72.2, −13.9 | — | 209 (B) |
| F | 1.7 VAC, 0.1 VOH | 0.0:12.4 | 80,810 | 19,760 | 194,000 | 45,200 | 102.9 (0.313) | 87.4 (0.323) | −47.2 | — | 82.5 (B) |
| G | 1.9 VAC | 0.0:16.3 | 80,070 | 19,930 | 201,000 | 41,700 | 102.5 (0.286) | 85.8 (0.285) | — | — | — |
| H | 2.1 VAC | 0.0:16.9 | 103,670 | 25,240 | 288,000 | 72,000 | 101.4 (0.315) | 86.9 (0.328) | −44.3 | — | 78.1 (B) |
| I | 3.0 VAC | 0.0:13.8 | 109,770 | 18,930 | 304,000 | 36,900 | 96.2 (0.278) | 79.2 (0.297) | −47.1 | — | 56.7 (B) |
| J | 3.0 VAC | 1.3:9.0 | 79,580 | 18,420 | 138,000 | 48,400 | 98.8 (0.262) | 83.4 (0.308) | −45.1 | — | 64.6 (B) |
| K | 4.0 VAC | 0.0:18.4 | 95,060 | 16,740 | 282,000 | 35,700 | 92.2 (0.227) | 74.5 (0.242) | −47.4 | — | 32.5 (B) |
| L | 5.3 VAC | 1.5:9.5 | 72,910 | 18,270 | 127,000 | 32,220 | 88.6 (0.163) | 66.9 (0.187) | −46.1 | — | 28.1 (B) |
| M | 6.3 VAC | 0.0:10.9 | 63,190 | 21,090 | 277,000 | 46,200 | 84.9 (0.152) | 63.7 (0.159) | −45.5 | — | 26.6 (B) |
| N | 2.0 MA | 5.0:15.8 | 75,710 | 14,200 | 181,000 | 31,900 | 100.8 (0.311) | 85.1 (0.326) | — | — | — |
| O | 4.9 MA | 1.1:13.0 | 132,180 | 23,300 | 367,000 | 50,500 | 88.3 (0.184) | 72.2 (0.135) | −46.4 | −38.3 | 22.2 (B) |
| P | 7.8 MA | 0.6:14.0 | 67,910 | 16,900 | 149,000 | 41,500 | 75.1 (0.078) | 54.7 (0.084) | −41.1 | −36.0 | 14.9 (B) |
| Q | 2.2 MA | 7.2:12.7 | 84,820 | 17,470 | — | — | 101.1 (0.287) | 85.5 (0.309) | −43.5 | −36.0 | 140 (B) |
| R | 3.3 MA | 0.0:13.3 | 99,720 | 22,290 | — | — | 99.7 (0.263) | 82.6 (0.278) | — | — | — |
| S | 5.7 MA | 1.2:12.9 | 131,070 | 21,350 | — | — | 86.4 (0.165) | 69.6 (0.175) | −42.7 | −37.3 | 26.6 (B) |
| T | 11.4 MA | 0.0:15.7 | 112,750 | 20,490 | — | — | 64.6 (0.035) | 42.1 (0.043)[h] | −41.0 | −37.2 | 12.0 (B) |
| U | 2.4 AA[g] | 2.0:14.3 | 16,730 | 10,500 | 94,900[i] | 29,500[i] | 102.5 (0.312) | 82.9 (0.317) | — | — | — |
| V | 3.7 AA[g] | 0.7:21.9 | 47,500 | 5,810 | 57,000[i] | 28,800[i] | 96.0 (0.234) | 72.7 (0.243) | — | — | — |
| W | 6.4 AA[g] | 0.0:24.4 | 4,390 | 2,250 | 15,500[i] | 17,100[i] | 89.2 (0.141) | 60.1 (0.167) | — | — | — |
| X | 1.9 AA | 3.2:37.4 | 4,780 | 2,080 | — | — | 97.5 (0.284) | 83.7 (0.270) | — | −5.4 | 344 (T) |
| Y | 3.3 AA | 0.6:33.4 | 3,230 | 1,400 | — | — | 95.1 (0.195)[f] | 76.7 (0.185) | — | −5.0 | 196 (T) |
| Z | 3.8 AA | 1.4:22.3 | 23,500 | 3,640 | — | — | 95.3 (0.231) | 74.2 (0.244) | — | — | — |
| AA | 3.3 AA | 0.7:19.0 | 47,380 | 4,330 | — | — | 98.3 (0.255) | 77.3 (0.261) | — | 4.7[j] | 193[j] (T) |
| BB | 5.5 AA | 1.3:41.0 | 1,640 | 710 | — | — | 83.4 (0.099) | 67.2 (0.100) | — | −12.6 | 38.8 (T) |
| CC | 1.8 AA, Na salt | 0.0:28.7 | 4,770 | 1,670 | — | — | 98.3 (0.285) | 71.9 (0.274) | — | — | — |
| DD | 1.1 AA, Zn salt | 0.0:29.3 | 5,040 | 2,060 | — | — | 97.9 (0.288) | 80.5 (0.276) | — | — | — |

VOH = vinyl alcohol;
VAC = vinyl acetate;
MA = methyl acrylate;
AA = acrylic acid;
tBA = t-butyl acrylate;
ketene = $H_2C=C=O$.
All $T_m$s except those for EVOHs were broad or exhibited low-temperature shoulders to the main melt transition.
[a]By NMR.
[b]Per 1000 total carbons, $^{13}C$ NMR.
[c]DRI, 135° C., in trichlorobenzene, versus polyethylene calibration curve.
[d]Light scattering, 135° C., in trichlorobenzene, analyzed as analogous wt % EVAC (EVOH, EVAC samples) or EMA (EMA, EAA samples).
[e]By DMTA; B = 3-point bend deformation; T = tensile deformation. Glass transitions were determined in the same mode as modulus data.
[f]Two maxima, 92.0 and 98.1° C.
[g]Nominal values given by supplier; samples only 60% soluble for compositional analysis ($^{13}C$ NMR compositions obtained: 2.0%, 2.9%, and 5.0% AA, respectively).
[h]Crystallinity value affected by run truncation at 25° C.
[i]Low solubility (calculated at detection/injected mass <0.80).
[j]3-Point bend mode values: $T_g$ onset, −10.7° C. (tan Δ)/5.7° C. (E'); 25° C. storage modulus, 158 MPa.

Comparative Example C5

Synthesis of Polymer C

A 1 L, 3-necked, 24/40 round-bottomed flask was charged with 500 mL toluene and a stirbar, and was fitted with a reflux condenser and two septa. A 20.0 g quantity of commercial free-radical vinyl acetate ethylene copolymer M (6.3 mol % vinyl acetate, 39.8 mmol vinyl acetate units) was added and contents of the flask were heated to 80° C. using an oil bath with stirring to dissolve the polymer. Separately, 4 g (71.2 mmol) of pelletized KOH was dissolved in a mixture of MeOH (200 mL) and deionized $H_2O$ (10 mL). This mixture was added to the stirred polymer solution in 10 mL aliquots over a 1 hour period. Addition of each aliquot resulted in formation of some white precipitate in the solution, which disappeared over time; the next aliquot was not added until this precipitate had disappeared or dissolved to the maximum amount allowed. After complete addition of the base solution, the polymer solution was cloudy with appreciable white precipitate. The temperature was raised to 100° C. and allowed to stir overnight. Subsequently, the heterogeneous mixture was added to 1 L of MeOH, causing precipitation of the hydrolized polymer as white crumbs. The polymer was collected by filtration, rinsed with additional clean methanol and distilled water (at which point a small amount of precipitate was observed in the filtrate), and dried in a vacuum oven at 60° C. for 72 h to give comparative free-radical alcohol polymer C as a white powder (15.80 g, 86%, theo. yield 18.33 g). IR (film on NaCl): 3632 (w), 3601 (w), 3383 (m, br, O—H), 2914 (vs), 2852 (vs), 2667 (w), 1472 (s), 1464 (s), 1370 (w), 1249 (w), 1130 (w), 1070 (w), 1020 (w), 729 (m), 720 (m) cm$^{-1}$. $^1$H NMR (300 MHz, TCE-d$_2$): similar to material 21 except for additional CH(OH) resonances at 3.98–3.78 ppm (multiplet). $^{13}$C NMR (75 MHz, TCE-d$_2$): similar to material 21 except for additional resonances corresponding to branches.

Comparative Example C6

Synthesis of Polymer D

A procedure similar to that described in Comparative Example C5 was carried out using 500 mL toluene, 2.53 g (45.1 mmol) KOH in 100 mL MeOH/7 mL H$_2$O, and 20.0 g of commercial free-radical vinyl acetate ethylene copolymer K (4.0 mol % vinyl acetate, 26.3 mmol vinyl acetate units). Less cloudiness and polymer precipitation were seen than for the procedure in Comparative Example C5. A yield of 14.72 g of comparative free-radical alcohol polymer D was obtained (78%, theo. yield 18.90 g), which was further purified by reprecipitation from 90° C. toluene into MeOH and drying in a vacuum oven overnight at 80° C. (white fibers, 14.1 g, 75%). The IR spectrum of the polymer was similar to material C. The $^1$H and $^{13}$C NMR spectra of the polymer were similar to material C except that resonances corresponding to ketone structures were also seen (similar to polymer 1).

Comparative Example C7

Synthesis of Polymer E

A procedure similar to that described in Comparative Example C5 was carried out using 500 mL toluene, 2.64 g (47.1 mmol) KOH in 150 mL MeOH/10 mL H$_2$O, and 20.0 g of commercial free-radical vinyl acetate ethylene copolymer 1 (3.0 mol % vinyl acetate, 20.1 mmol vinyl acetate units). The polymer solution was heated directly to 90° C. and maintained at this temperature throughout the reaction. A yield of 18.29 g of comparative free-radical alcohol polymer E was obtained (white powder, 97%, theo. yield 19.12 g). The IR and NMR spectra of the polymer were similar to material C.

Example 80

Comparison of g' for Linear and Branched Functional Polyethylenes

Table 5 compares g' values for a selection of linear functional polymers to g' values for branched comparative commercial materials of similar composition. The g' values were calculated using the Mark-Houwink parameters for polyethylene, and are thus only approximate since Mark-Houwink parameters may vary with polymer composition. However, a relative comparison of calculated g's between polymers having similar composition (and thus having similar Mark-Houwink parameters) can be used to indicate differences in branching. Consistent with the linear structures observed for 22, 24, 26, and 27 by NMR, these materials have g' values closer to 1.0, indicating a more linear structure, than the comparative commercial materials E, H, and M which contain between 10–17 C$_2$+branches per 1000 carbons by NMR.

TABLE 5

Comparison of g' for linear and branched functional polyethylenes having similar composition.

| Linear polymer, mol % polar vinyl | g'$^a$ | Branched comparative polymer, mol % polar vinyl | g'$^a$ |
|---|---|---|---|
| 22, 2.1 VOH, 0.1 ketene | 1.09 | E, 2.4 VOH | 0.40 |
| 24, 2.1 VOH, 0.2 ketene | 0.82 | | |
| 27, 1.8 VAC, 0.3 VOH | 1.01 | H, 2.1 VAC | 0.44 |
| 26, 6.1 VAC, 0.1 VOH | 0.90 | M, 6.3 VAC | 0.53 |

VOH = vinyl alcohol;
VAC = vinyl acetate;
ketene = H$_2$C=C=O.
$^a$Light scattering, 135° C. in 1,2,4-trichlorobenzene, using Mark-Houwink parameters for polyethylene.

Example 81

Comparison of Melt Transition Temperature for Linear and Branched Alcohol-functionalized Polyethylenes FIG. 1 gives a comparison of maximum melt transition temperature (T$_m$ max) versus composition at low alcohol contents (<~7 mol % vinyl alcohol) for linear alcohol-functionalized polyethylenes 1–8 and free-radically prepared comparative polymers C–E, which contain alkyl branches. At similar compositions, linear polymers 1–8 possess higher melting points than branched polymers C–E.

Example 82

Figure 2:
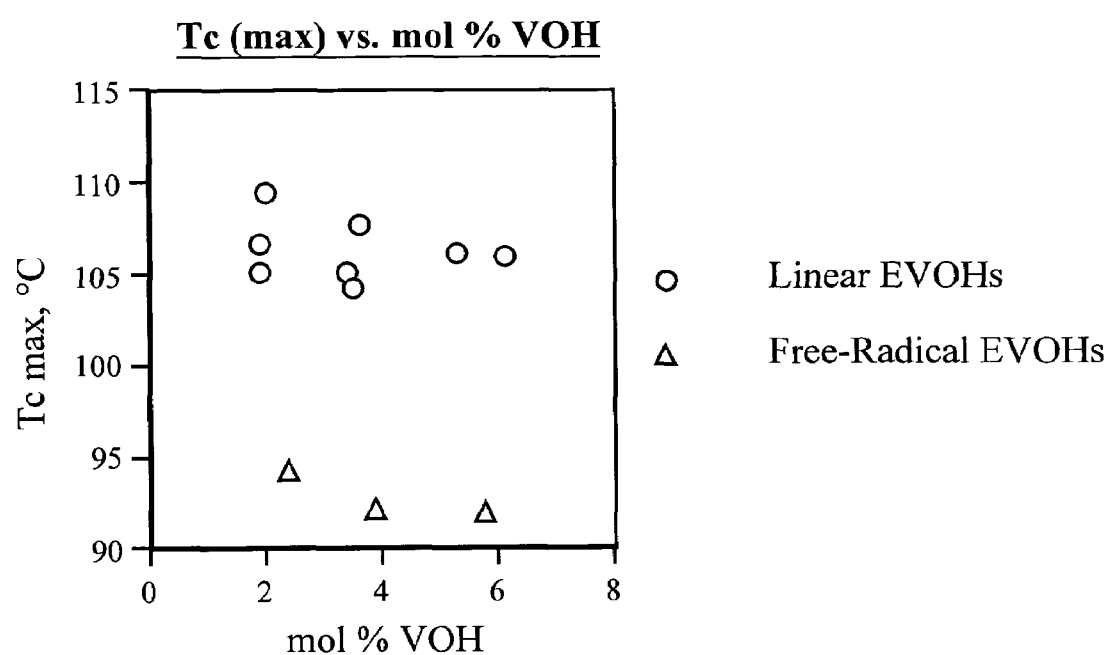
FIG. 2 shows a comparison of maximum crystallization temperature ($T_c$ max) for linear and branched alcohol-functionalized polyethylenes at low alcohol contents (<~7 mol % vinyl alcohol).

Comparison of Crystallization Temperature for Linear and Branched Alcohol-functionalized Polyethylenes FIG. 2 gives a comparison of maximum crystallization temperature (T$_c$ max) versus composition at low alcohol contents (<~7 mol % vinyl alcohol) for linear alcohol-functionalized polyethylenes 1–8 and free-radically prepared comparative polymers C–E, which contain alkyl branches. At similar compositions, linear polymers 1–8 possess higher crystallization points than branched polymers C–E.

Example 83

Figure 3:
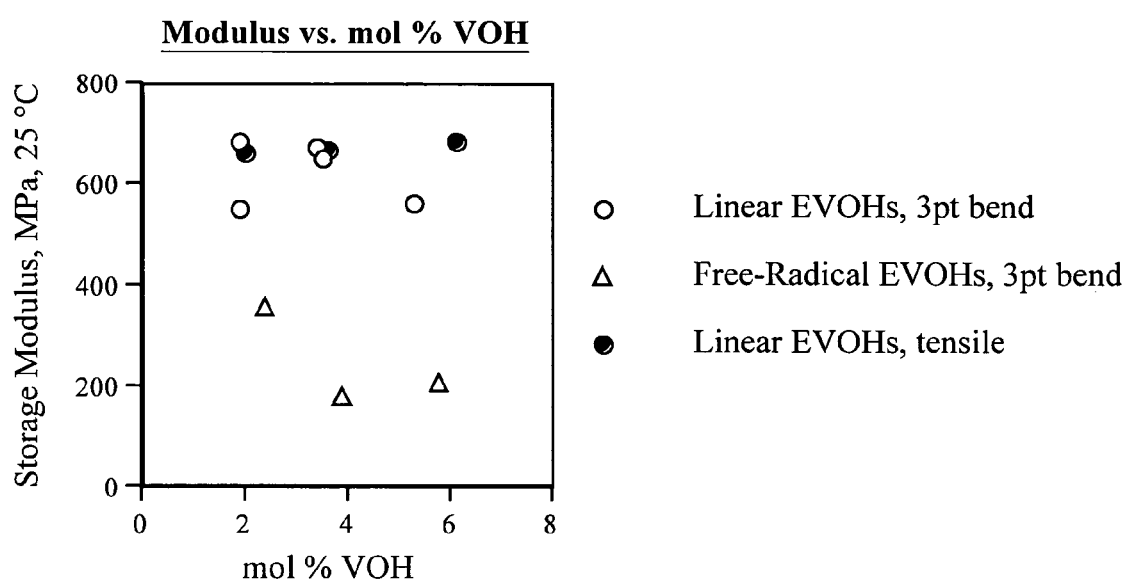
FIG. 3 displays a comparison of the storage modulus (MPa, 25° C.) for linear and branched alcohol-functionalized polyethylenes at low alcohol contents (<~7 mol % vinyl alcohol).

Comparison of Storage Modulus for Linear and Branched Alcohol-functionalized Polyethylenes FIG. 3 gives a comparison of room temperature dynamic storage modulus (E') versus composition at low alcohol contents (<~7 mol % vinyl alcohol) for linear alcohol-functionalized polyethylenes 1–8 and free-radically prepared comparative polymers C–E, which contain alkyl branches. At similar compositions, linear polymers 1–8 possess a higher storage modulus than branched polymers C–E.

The invention having been thus described, it will be apparent that the same may be varied in many ways without departing from the spirit and scope of the invention, as defined by the following claims.

What is claimed is:

1. A linear functional polymer comprising randomly repeating units A, B and D, wherein:

A represents —CH$_2$—;

B represents

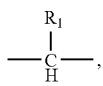

wherein R$_1$ represents a polar functional group; and

D represents

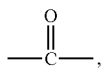

wherein there are at least four A units separating each B unit, each D unit, and each B and D unit, further wherein when the total number of B units, y, is an integer greater than or equal to 1; and the total number of D units, h, is an integer greater than or equal to 0, then the total number of A units, x, is an integer sufficient that the molar fraction of the B and D units in the polymer is represented by a value j defined by the equation:

$$j = \frac{y+h}{x+y+h} \leq 0.032; \text{ and}$$

wherein each occurrence of a B or D unit is separated by a run length, r, representing the number of A units, wherein each r conforms to an equation selected from the group consisting of:

$r=(e+e)+zd;$ $r=(e+f)+zd;$ and $r=(f+f)+zd,$ wherein z is any integer greater than or equal to 0; e and f are predetermined integers greater than or equal to 2; and d is a predetermined integer greater than or equal to 4, wherein the predetermined integers e and f are derived from a first comonomer

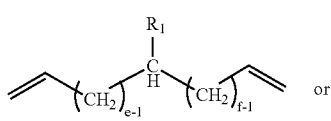

and the predetermined integer d is derived from a second comonomer

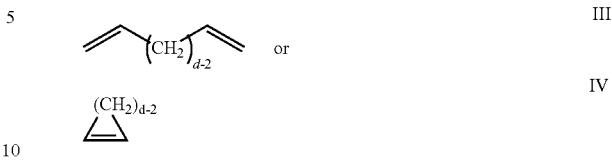

wherein values of r conforming to all three equations are present in the linear functional polymer, and wherein at least one value of r corresponds to a z value of 1 or greater.

2. The linear functional polymer of claim 1 wherein the value j is less than or equal to 0.03.

3. The linear functional polymer of claim 1 wherein the value j is less than or equal to 0.025.

4. The linear functional polymer of claim 1 further comprising end groups R$_2$ and R$_3$ each being independently directly attached to two A units, wherein R$_2$ and R$_3$ are independently selected from the group consisting of hydrogen, C$_1$–C$_{20}$ linear alkyl, C$_1$–C$_{20}$ branched alkyl, C$_1$–C$_{20}$ cycloalkyl, aryl and phenyl.

5. The linear functional polymer of claim 1 wherein the end groups R$_2$ and R$_3$ are each independently selected from methyl and hydrogen.

6. The linear functional polymer of claim 1 wherein R$_1$ comprises a nitrogen- or oxygen-containing functionality having 8 or fewer non-hydrogen atoms and no olefinic unsaturation.

7. The linear functional polymer of claim 6 wherein R$_1$ is selected from the group consisting of hydroxy; alkyl ethers having 7 or fewer carbon atoms; acetate; carboxylic acid; sodium carboxylate; alkyl esters having 6 or fewer carbon atoms; nitrile; OSiMe$_3$; CO$_2$SiMe$_3$; sulfonate; alkyl amine having 7 or fewer carbon atoms, amides having 6 or fewer carbon atoms; aldehyde; alkyl ketones having 7 or fewer carbon atoms, and mixtures of any of the foregoing groups.

8. The linear functional polymer of claim 6 wherein R$_1$ is OH.

9. The linear functional polymer of claim 6 wherein R$_1$ is acetate.

10. The linear functional polymer of claim 6 wherein R$_1$ is CO$_2$Me.

11. The linear functional polymer of claim 6 wherein R$_1$ is CO$_2$C(CH$_3$)$_3$.

12. The linear functional polymer of claim 6 wherein R$_1$ is CO$_2$H.

13. The linear functional polymer of claim 6 wherein R$_1$ is CO$_2$Na.

14. The linear functional polymer of claim 1 wherein h is 0 and the linear functional polymer further comprises a randomly repeating unit E, wherein:

E represents —CH═CH—, wherein there is at least one E unit separating each B unit, at least one A unit separating each E unit, and at least one A unit separating each B and E unit, further wherein when the total number of E units, m, is an integer greater than or equal to 2, then the total number of A units, x, is an integer sufficient that the molar fraction of the B units in the polymer is represented by a value q defined by the equation:

$$q = \frac{y}{x+y+2m} \le 0.032$$

wherein each E unit contributes two A units for purposes of calculating r.

15. The linear functional polymer of claim 14 wherein the value q is less than or equal to 0.03.

16. The linear functional polymer of claim 14 wherein the value q is less than or equal to 0.025.

17. The linear functional polymer of claim 14 further comprising end groups $R_2$ and $R_3$ each being independently directly attached to an E unit, wherein $R_2$ and $R_3$ are independently selected from the group consisting of hydrogen, $C_1$–$C_{20}$ linear alkyl, $C_1$–$C_{20}$ branched alkyl, $C_1$–$C_{20}$ cycloalkyl, aryl, phenyl and $C_1$–$C_{20}$ alkenyl.

18. A linear functional polymer comprising randomly repeating units A, B and D, wherein:

A represents —$CH_2$—;

B represents $$-\underset{H}{\underset{|}{\overset{R_1}{\overset{|}{C}}}}-,$$

wherein $R_1$ represents a polar functional group selected from the group consisting of alkyl ethers having 7 or fewer carbon atoms; carboxylic acid; sodium carboxylate; alkyl esters having 6 or fewer carbon atoms; nitrile; $OSiMe_3$; $CO_2SiMe_3$; sulfonate; alkyl amine having 7 or fewer carbon atoms, amides having 6 or fewer carbon atoms; aldehyde; alkyl ketones having 7 or fewer carbon atoms, and mixtures of any of the foregoing groups; and D represents $$-\underset{}{\overset{O}{\overset{\|}{C}}}-,$$

wherein there are at least four A units separating each B unit, each D unit, and each B and D unit, further wherein when the total number of B units, y, is an integer greater than or equal to 1; and the total number of D units, A, is an integer greater than or equal to 0, then the total number of A units, x, is an integer sufficient that the molar fraction of the B and D units in the polymer is represented by a value j defined by the equation:

$$j = \frac{y+h}{x+y+h} \le 0.032;\text{ and}$$

wherein each occurrence of a B or D unit is separated by a run length, r, representing the number of A units, wherein each r conforms to an equation selected from the group consisting of:

$r=(e+e)+zd;$ $r=(e+f)+zd;$ and $r=(f+f)+zd,$ wherein z is any integer greater than or equal to 0; e and f are predetermined integers greater than or equal to 2; and d is a predetermined integer greater than or equal to 4, wherein the predetermined integers e and f are derived from a first comonomer

I

II and the predetermined integer d is derived from a second comonomer

III

IV wherein values of r conforming to all three equations are present in the linear functional polymer, and wherein at least one value of r corresponding to a z value of 1 or greater.

19. The linear functional polymer of claim 18 wherein the value j is less than or equal to 0.03.

20. The linear functional polymer of claim 18 wherein the value j is less than or equal to 0.025.

21. The liner functional polymer of claim 18 further comprising end groups $R_2$ and $R_3$ each being independently directly attached to two A units, wherein $R_2$ and $R_3$ are independently selected from the group consisting of hydrogen, $C_1$–$C_{20}$ linear alkyl, $C_1$–$C_{20}$ branched alkyl, $C_1$–$C_{20}$ cycloalkyl, aryl and phenyl.

22. The linear functional polymer of claim 18 wherein the end groups $R_2$ and $R_3$ are each independently selected from methyl and hydrogen.

23. The linear functional polymer of claim 18 wherein $R_1$ is $CO_2Me$.

24. The linear functional polymer of claim 18 wherein $R_1$ is $CO_2C(CH_3)_3$.

25. The linear functional polymer of claim 18 wherein $R_1$ is $CO_2H$.

26. The linear functional polymer of claim 18 wherein $R_1$ is $CO_2Na$.

27. The linear functional polymer of claim 18 wherein h is 0 and the linear functional polymer further comprises a randomly repeating unit E, wherein:

E represents —CH=CH—, wherein there is at least one E unit separating each B unit, at least one A unit separating each E unit, and at least one A unit separating each B and E unit, further wherein when the total number of E units, in, is an integer greater than or equal to 2, then the total number of A units, x, is an integer sufficient that the molar fraction of the B units in the polymer is represented by a value q defined by the equation:

$$q = \frac{y}{x+y+2m} \le 0.032.$$

28. The linear functional polymer of claim 27 wherein the value q is less than or equal to 0.03.

29. The linear functional polymer of claim 27 wherein the value q is less than or equal to 0.025.

30. The linear functional polymer of claim 27 further comprising end groups $R_2$ and $R_3$ each being independently directly attached to an E unit, wherein $R_2$ and $R_3$ are independently selected from the group consisting of hydrogen, $C_1$–$C_{20}$ linear alkyl, $C_1$–$C_{20}$ branched alkyl, $C_1$–$C_{20}$ cycloalkyl, aryl, phenyl and $C_1$–$C_{20}$ alkenyl.

* * * * *